US011277656B2

(12) United States Patent
Liston et al.

(10) Patent No.: US 11,277,656 B2
(45) Date of Patent: *Mar. 15, 2022

(54) METHODS AND SYSTEMS FOR PROVIDING RELEVANT SEASON SERIES RECORDING FUNCTIONALITY

(71) Applicant: ROVI Guides, Inc., San Jose, CA (US)

(72) Inventors: Alexander William Liston, Menlo Park, CA (US); Kenichiro Tanaka, Menlo Park, CA (US)

(73) Assignee: ROVI Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,306

(22) Filed: Feb. 3, 2021

(65) Prior Publication Data

US 2021/0185383 A1 Jun. 17, 2021

Related U.S. Application Data

(63) Continuation of application No. 16/807,425, filed on Mar. 3, 2020, now Pat. No. 10,945,022, which is a (Continued)

(51) Int. Cl.
*H04N 21/431* (2011.01)
*H04N 21/8405* (2011.01)
(Continued)

(52) U.S. Cl.
CPC ....... *H04N 21/4312* (2013.01); *G06F 3/0482* (2013.01); *G06F 9/4451* (2013.01);
(Continued)

(58) Field of Classification Search
CPC .......... H04N 21/4532; H04N 5/44543; H04N 21/4312; H04N 21/431; H04N 21/4334;
(Continued)

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

WO 2015013209 A1 1/2015

OTHER PUBLICATIONS

PCT Partial International Search Report for International Application No. PCT/US2018/050853, dated Dec. 7, 2018 (13 pages).

*Primary Examiner* — Thai Q Tran
*Assistant Examiner* — Jose M Mesa
(74) *Attorney, Agent, or Firm* — Haley Guiliano LLP

(57) ABSTRACT

Systems and methods are provided herein for scheduling a season recording. A series is provided to a user device, the series having a plurality of sequential seasons, and each season having a plurality of episodes. A request for recording the series is received from the user. In response, a last episode of the series watched by the user is identified. A relevant season of the plurality of seasons is then determined, such that the relevant season precedes another season of the plurality of seasons and includes the last episode watched by the user. Then, episodes of the relevant season that follow the last episode watched by the user are scheduled for recording, such that episodes of a season that precedes the relevant season are not scheduled for recording.

22 Claims, 27 Drawing Sheets

Related U.S. Application Data continuation of application No. 15/857,183, filed on Dec. 28, 2017, now Pat. No. 10,623,802.

(60) Provisional application No. 62/558,328, filed on Sep. 13, 2017, provisional application No. 62/441,897, filed on Jan. 3, 2017.

(51) Int. Cl.

| | | |
|---|---|---|
| *H04N 21/441* | (2011.01) | |
| *H04N 21/47* | (2011.01) | |
| *H04N 21/458* | (2011.01) | |
| *G06F 3/0482* | (2013.01) | |
| *G06F 21/00* | (2013.01) | |
| *G06F 21/10* | (2013.01) | |
| *G06F 9/451* | (2018.01) | |
| *H04N 21/45* | (2011.01) | |
| *H04N 21/466* | (2011.01) | |
| *H04N 21/475* | (2011.01) | |
| *H04N 21/482* | (2011.01) | |
| *G06F 21/62* | (2013.01) | |
| *H04N 21/442* | (2011.01) | |
| *G06F 9/445* | (2018.01) | |
| *H04N 21/422* | (2011.01) | |
| *H04N 21/433* | (2011.01) | |
| *H04N 21/472* | (2011.01) | |
| *H04N 21/858* | (2011.01) | |
| *G06F 3/04817* | (2022.01) | |
| *G06F 3/04845* | (2022.01) | |

(52) U.S. Cl.
CPC .............. *G06F 9/451* (2018.02); *G06F 21/00* (2013.01); *G06F 21/10* (2013.01); *G06F 21/629* (2013.01); *H04N 21/4221* (2013.01); *H04N 21/42204* (2013.01); *H04N 21/431* (2013.01); *H04N 21/4334* (2013.01); *H04N 21/441* (2013.01); *H04N 21/44204* (2013.01); *H04N 21/44222* (2013.01); *H04N 21/458* (2013.01); *H04N 21/4532* (2013.01); *H04N 21/4667* (2013.01); *H04N 21/4668* (2013.01); *H04N 21/47* (2013.01); *H04N 21/4755* (2013.01); *H04N 21/47214* (2013.01); *H04N 21/4826* (2013.01); *H04N 21/8405* (2013.01); *H04N 21/8586* (2013.01); *G06F 3/04817* (2013.01); *G06F 3/04845* (2013.01)

(58) Field of Classification Search
CPC ....... H04N 21/44204; H04N 21/44222; H04N 21/4667; H04N 21/4668; H04N 21/47214; H04N 21/4755; H04N 21/4826; G06F 3/0482

See application file for complete search history.

(56) References Cited

U.S. PATENT DOCUMENTS

| | | |
|---|---|---|
| 7,082,254 B1 | 7/2006 | Rashkovskiy et al. |
| 7,165,098 B1 | 1/2007 | Boyer et al. |
| 7,375,673 B2 | 5/2008 | Spilo |
| 7,761,892 B2 | 7/2010 | Ellis et al. |
| 8,046,801 B2 | 10/2011 | Ellis et al. |
| 8,693,844 B2 | 4/2014 | Wei et al. |
| 8,760,265 B2 | 6/2014 | Krueger |
| 8,839,235 B2 | 9/2014 | Lee et al. |
| 9,195,721 B2 | 11/2015 | Soto Matamala et al. |
| 9,591,339 B1 | 3/2017 | Christie et al. |
| 9,712,856 B2 | 7/2017 | Wertheimer et al. |
| 10,623,802 B2 | 4/2020 | Liston et al. |
| 2002/0174430 A1 | 11/2002 | Ellis et al. |
| 2005/0251827 A1 | 11/2005 | Ellis et al. |
| 2006/0004834 A1 | 1/2006 | Pyhälammi et al. |
| 2006/0149751 A1 | 7/2006 | Jade et al. |
| 2007/0154163 A1 | 7/2007 | Cordray |
| 2007/0157249 A1* | 7/2007 | Cordray ............ H04N 21/4825 725/58 |
| 2008/0189654 A1 | 8/2008 | Thomas |
| 2010/0153885 A1 | 6/2010 | Yates |
| 2011/0246891 A1 | 10/2011 | Schubert et al. |
| 2013/0109357 A1 | 5/2013 | Ganatra et al. |
| 2013/0283317 A1 | 10/2013 | Guntupalli et al. |
| 2015/0134436 A1 | 5/2015 | Lambert |
| 2015/0281635 A1* | 10/2015 | Tang ................ H04N 5/76 386/295 |
| 2016/0066040 A1 | 3/2016 | Webster et al. |
| 2017/0003840 A1 | 1/2017 | Utsuki et al. |
| 2017/0055039 A1 | 2/2017 | Earle |
| 2017/0163701 A1 | 6/2017 | Ashkan et al. |
| 2017/0214975 A1 | 7/2017 | Schmidt et al. |
| 2018/0189076 A1 | 7/2018 | Liston et al. |
| 2018/0192117 A1 | 7/2018 | Liston et al. |
| 2020/0204855 A1 | 6/2020 | Liston et al. |

* cited by examiner

1000

1002
Determine, from the Account Status of the User, a Time, Wherein the Time is an Amount of Time Left Until a Subscription to the First Application for the User Expires 1004
Determine the Level of the User's Access the First Application Based on the Time 1006
Change the Appearance of the Menu Icon to Include an Indication of the Time

1102
In Response to Determining that the Account Status Indicates the First Level of Access to the Application, Generate a Menu Icon that Includes an Upgrade Input 1104
In Response to Detecting the User Interaction with the Upgrade Input, Adjust the Menu Icon Such the Appearance of the Menu Icon Indicates that the User Has the Second Level of Access to the First Application

FIG. 11

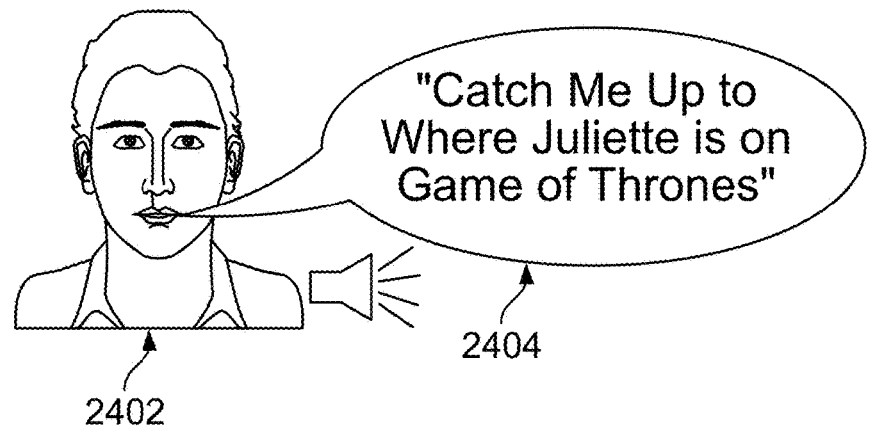
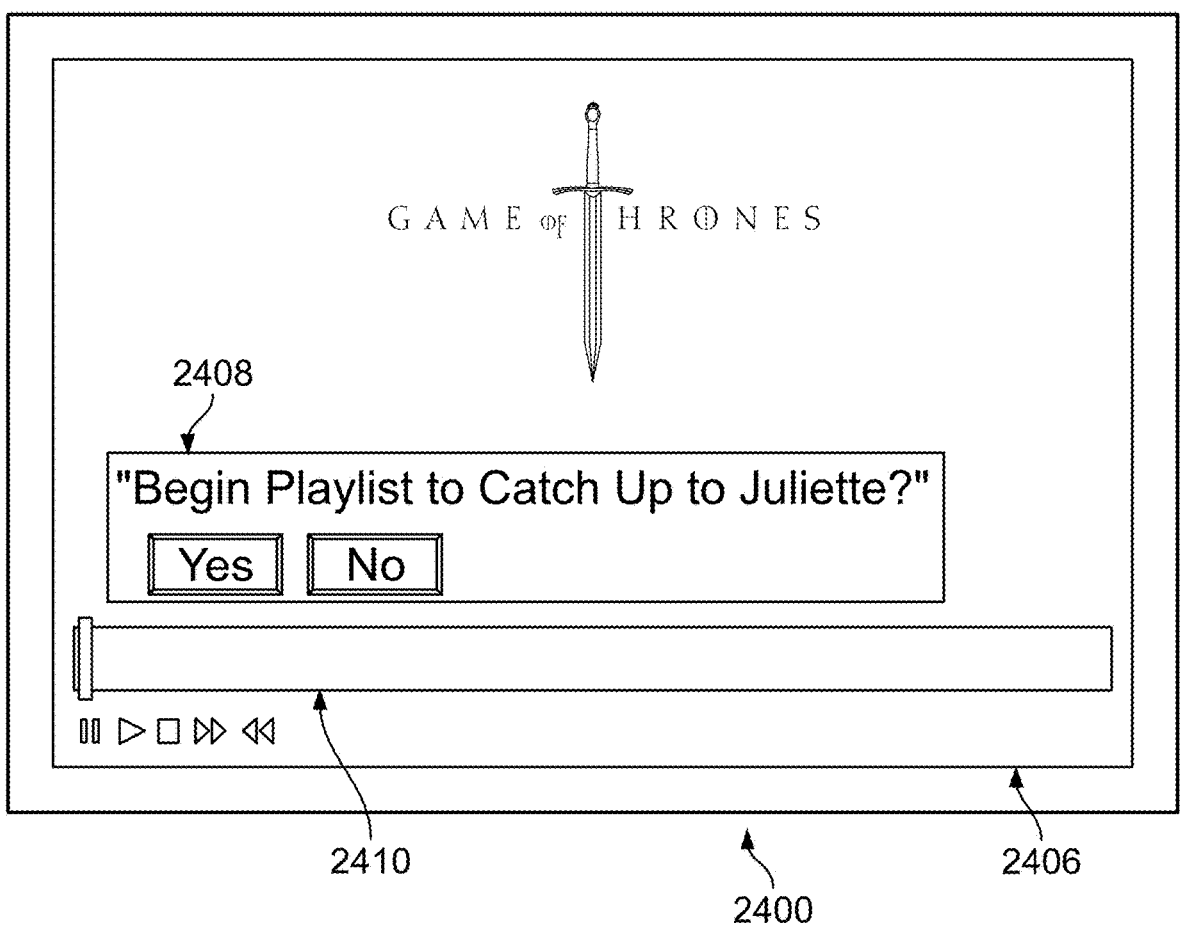
FIG. 24

TIVO GUIDE

Edge of Alaska
S1 E5 'Bear Attack' - Horses go missing after they're spooked by a grizzly bear. (CC,R, HD) Nature, Reality, First aired: 11/21/2014
Thu 8/24 3:00pm - 4:00pm  TV-14

| | | 3:30pm | 4:00pm | 4:30pm | 5:00pm |
|---|---|---|---|---|---|
| aska | 309 HD ANIMAL PLANET | ▽ Edge of Alaska | Edge of Alaska | Edge of Alaska | Edge of Alaska ▷ |
| ling | 310 HD TLC | ▽ My Big Fat American | My Big Fat American Gypsy Wedding | My Big Fat American Gypsy Wedding | Say Yes to the Dress ▷ | Say |
| wins | 311 HD | ▽ Evil Twins | A Stranger in My Home | A Stranger in My Home | A Stranger in My Home ▷ |
| lub | 380 HD STARZ | ▽ Fight Julie & Julia (2009) | | | |
| ntier | 388 HD | ▽ Alaska: The Last Front | Alaska: The Last Frontier | | Alaska: The Last Fronti ▷ |
| aska | 389 HD ANIMAL PLANET | ▽ Edge of Alaska | Edge of Alaska | Edge of Alaska | Edge of Alaska ▷ |
| ling | 390 HD TLC | ▽ My Big Fat American | My Big Fat American Gypsy Wedding | My Big Fat American Gypsy Wedding | Say Yes to the Dress ▷ | Say |
| wins | 391 HD | ▽ Evil Twins | A Stranger in My Home | A Stranger in My Home | A Stranger in My Home ▷ |
| Skee | 454 HD | ▽ Two Guys from Milwaukee (1946) | | The Desert Song (1943) ▷ |
| Phil | 660 HD CBS | ▽ Dr.Phil | Las Vegas Now Lifestyle Show | | 8 News Now at 5 | New | CBS |

A Options     C view (all)

METHODS AND SYSTEMS FOR PROVIDING RELEVANT SEASON SERIES RECORDING FUNCTIONALITY

CROSS-REFERENCE TO RELATED APPLICATION

This application is a continuation of U.S. patent application Ser. No. 16/807,425, filed Mar. 3, 2020, which is a continuation of U.S. patent application Ser. No. 15/857,183, filed Dec. 28, 2017, now U.S. Pat. No. 10,623,802, which priority to U.S. Provisional Application No. 62/558,328, filed on Sep. 13, 2017, and to U.S. Provisional Application No. 62/441,897, filed on Jan. 3, 2017, all of which are fully incorporated herein by reference in their entireties.

BACKGROUND

Modern media systems (e.g., smart TVs) provide a menu that may include menu icons that allow the user to launch an application by interacting with (e.g., by clicking on a) respective menu icons. Menu icons can sometimes provide additional information to the user, e.g., a menu icon can be changed to indicate that some kind of a sale or a promotion is going on. However, such menu icons fail to inform the user about the account status of the application associated with the respective menu icon. That is, the user has no way of knowing their account status (e.g., whether the user has a premium subscription or a free subscription) before actually launching the application. This deficiency can lead to an undesirable user experience where the user launches an application and cannot get the desired content, or a user may miss out on the desired content because they did not know they had access.

Additionally, menus of the modern media systems are often mismatched with a remote controller device that is being utilized by the user. Currently, users will often use third-party devices or software-based remote controllers with varying number of inputs (e.g., buttons, scroll wheels, touchpads, microphones, etc.). Consequently, menu interfaces provided by the media systems will often have user interface elements that have no corresponding input on the user's remote controller. Alternatively, or additionally, menu interfaces may also fail to utilize the inputs that are present on the remote controller.

Furthermore, modern media systems may have a capability that allows a user to set up a "season pass recording" of a series (e.g., TV series). Generally, the user will have an option to record either all seasons of the series or first-run episodes only. However, such systems generally disregard how far along in the series the user currently is. In particular, such systems lack an ability to record just the season that is most relevant to the user based on the last episode of the series that was actually watched by the user.

SUMMARY

To this end and others, systems and methods are provided that improve the media consumption experience for users by providing menu icons that indicate what level of access the user gave to an application associated with that menu icon. For example, the system may determine the account status of the user with respect to an application (e.g., if the user has a premium paid level of access or free access.) Then, the system may generate an appropriate icon based on the level of access. For example, if the user has a premium paid level of access, the icon may be highlighted in bright yellow, while if the user has a free level of access the icon may be presented in muted blue. Other ways to differentiate icons may also be used as further explained below. The generated menu icon is then presented to the user to provide access level information even before the application is launched.

To this end and others, systems and methods are provided that improve the media consumption experience for users by providing a menu interface that is optimized for the type of remote controller that is utilized by the user to control a user device. The system may detect functionality of a remote controller, e.g., by communicating with the remote controller or by receiving an input identifying the remote controller. The system may determine how each input of the remote controller is labeled and what functionality it has. The system may then select a user interface such that all of that interface's elements match the label and functionality of at least one input of the remote controller. The interface may then be displayed on the user equipment.

To this end and others, systems and methods are provided that improve the ability of a media guidance application to record a relevant season of a series. A system may provide some episodes of a series (e.g., TV series) to a user. The system may then receive a request from the user to record a relevant season of the series. The system may determine the relevant season by determining what season the last episode watched by the user belongs to. The system can then set up a recording of only those episodes that belong to the relevant season and come after the last episode watched by the user. This is particularly useful when the relevant season is not the last season of the series (e.g., season 4 of a series that has five seasons). In this scenario, storage space is saved by recording only episodes of the relevant season (e.g., season 4), but not episodes of irrelevant seasons (e.g., season 5).

In some embodiments, a media guidance application determines an account status of the user with respect to an application. For example, the media guidance application may access the user profile to determine whether the user has a first level of access to the application (e.g., free limited access) or second level of access to the application (e.g., premium paid access). For example, the user profile may indicate that the user has access to a first set of media content using the first level of access (e.g., free limited access that allows the user to watch a limited library of media content). In another example, the user profile may indicate that the user has access to a second set of media content that is larger than the first set using the second level of access to the application (e.g., premium access that allows the user to watch the full library of media content provided by the application).

In some embodiments, in response to determining that the account status indicates a first level of access to the application, the media guidance application may generate a menu icon indicative of the user having the first level of access to the application. For example, the first menu icon may be generated with a particular color, having a particular size, having a static effect, or including a particular text, such that these features are indicative of the user having the first level of access to the application. For example, the icon may have a muted color (e.g., light blue), be smaller in size, have the text "free" or "limited access," or lack an animation effect to indicate that the user has the first level of access (e.g., free level of access) to the application.

In some embodiments, the media guidance application may, in response to determining that the account status indicates a second level of access to the application, generate a menu icon indicative of the user having the second level of access to the application. In some embodiments, the menu icon incentive of the user having a second level of access may indicate that the user can access a second set of media content that is larger than the first set that can be accessed with the first level of access. For example, the menu icon may be generated with a particular color, have a particular size, have a static effect, or include a particular text, such that these features indicate that user has the second level of access to the application. For example, the icon may have a bright color (e.g., bright yellow), be larger in size, have the text "premium" or "all-access," or have an animation effect to indicate that the user has the second level of access (e.g., premium level access) to the application.

In some embodiments, the media guidance application may maintain a user profile, wherein the user profile includes, for a plurality of applications, a user account status indicative of the level of the user's access to a respective application. For example, if the user device includes applications such as Netflix, Amazon Video or HBO Go, the media guidance application may maintain a user profile that includes user account status for each of these applications. For example, the user profile may include information that the user has an up-to-date paid account with Netflix, a free level of access to Amazon Video, and two months of subscription time to HBO GO.

In some embodiments, the media guidance application may retrieve, from the user profile, an account status of the user in relation to a first application of the plurality of applications. For example, the media guidance application may, with respect to the Amazon Video application, retrieve the user's Amazon Video account status. For example, if the user has free access only, the media guidance application may retrieve the "free access" status. In another example, if the user has premium access (e.g., Prime account), the media guidance application may retriever the "premium" (e.g., "Prime") status.

In some embodiments, the media guidance application may determine, from the account status of the user, a level of the user's access to the first application. For example, if the account status indicates "free access" status to Amazon Video, the media guidance application may determine that the user only has first level of access (e.g., access to the "free access" media content collection) from the Amazon Video application. In another example, if the account status indicates a "premium" status to the Amazon Video application, the media guidance application may determine that the user has a second level of access (e.g., access to the full "Prime" media content collection) from the Amazon Video application.

In some embodiments, the first level of access provides the user with access to a first set of media content (e.g., several free movies or movie trailers only). In some embodiments, the second level of access provides access to a second set of media content that contains at least one media content not contained by the first set. For example, the second set may contain full versions of the movies in addition to the movie trailers of the first set. In some embodiments, the first set may be an empty set. That is, the first level of access may not allow the user to access any media content. In some embodiments, the first level of access may be indicative of the user having a free (e.g., unpaid) access to the application, while the second level of access may be indicative of the user having a paid (e.g., subscription-based) access to the application.

In some embodiments, the media guidance application may perform a different series of steps depending on the determined levels of access. In some embodiments, in response to determining that the user has a first level of access, the media guidance application may generate a menu icon, wherein the appearance of the menu icon indicates that the user has the first level of access to the first application. For example, the media guidance application may generate an icon for the Amazon Video application with a specific color (e.g., muted blue) that is indicative of "free access" account status. In some embodiments, the media guidance application may then generate for display the menu icon on a user device. For example, the Amazon Video menu icon may be generated for display on a TV screen among other icons representing launchable TV applications.

In some embodiments, in response to determining that the user has a second level of access, the media guidance application may generate a menu icon, wherein the appearance of the menu icon indicates that the user has the second level of access to the first application. For example, the media guidance application may generate an icon for Amazon Video application to a specific color (e.g., bright yellow) that is indicative of "premium access" account status. In some embodiments, the media guidance application may then generate for display the menu icon on a user device. For example, the Amazon Video menu icon may be generated for display on a TV screen among other icons representing launchable TV applications.

In some embodiments, the media guidance application may determine, from the account status of the user, a time, wherein the time is an amount of time left until a user's subscription to the first application expires. For example, the media guidance application may determine that the user has purchased a premium subscription to an application at a certain time. For example, the media guidance application may determine from the account status of the user that the user has purchased two-months of Amazon Prime subscription on Jan. 2, 2015.

In some embodiments, the media guidance application may then determine the level of the user's access to the first application based on the time. For example, the media guidance application may add the length of subscription to the date on which the subscription was purchased and compare it to the current date. For example, the media guidance application may add two months to the Jan. 2, 2015 date and compare the resulting date (Mar. 2, 2015) to the current date. In one example, if the current date is on or before Mar. 2, 2015, the media guidance application may determine that the user has the second level of access (e.g., premium access) to the Amazon Video application. Also in this example, if the current date is after Mar. 2, 2015, the media guidance application may determine that the user has the first level of access (e.g., free access) to the Amazon Video application.

In some embodiments, the media guidance application may generate the menu icon to include an indication of the time left until a subscription to the first application for the user expires. For example, if the user has purchased two-months of Amazon Prime subscription on Jan. 2, 2015, the media guidance application may add two months to the Jan. 2, 2015 date and subtract the current date from the resulting date (Mar. 2, 2015). For example, if the current date is Mar. 1, 2015, the media guidance application may calculate that two days are left until the subscription expires.

In some embodiments, the media guidance application may change the appearance of the menu icon to include an indication of the remaining time. For example, the media guidance application may modify the icon to include the text "2 days of premium subscription left!" or "Expires in 2 days."

In some embodiments, the media guidance application may change the appearance of the menu icon to indicate that the user has the first level of access to the first application by changing the appearance of the menu icon to include a first color. For example, the media guidance application may change the background color, filler color, or border color of the menu icon to be of particular color (e.g., muted blue.) In some embodiments, the color may be preselected, dynamically generated, or selected via a user prompt.

In some embodiments, changing the appearance of the menu icon to indicate that the user has the second level of access to the first application may include changing the appearance of the menu icon to include a second color different from the first color. For example, the media guidance application may change the background color, filler color, or border color of the menu icon to be particular color (e.g., bright yellow). For example, the media guidance application may change the background color, filler color, or border color of the menu icon to be particular color (e.g., muted blue).

In some embodiments, the color may be preselected, dynamically generated, or selected via a user prompt. In some embodiments, the media guidance application may, when the appearance of the menu icon indicates that the user has the first level of access to the first application, set the size of the menu icon to a first size. For example, the media guidance application may change the size of the menu icon to be smaller by 25%. In some embodiments, the size reduction may be preselected, dynamically generated, or selected via a user prompt.

In some embodiments, the media guidance application may, when the appearance of the menu icon indicates that the user has the second level of access to the first application, set the size of the menu icon to a second size, different from the first size. For example, the media guidance application may change the size of the menu icon to be larger by 25%. In some embodiments, the size increase may be preselected, dynamically generated, or selected via a user prompt.

In some embodiments, the media guidance application may, when the appearance of the menu icon indicates that the user has the first level of access to the first application, set the appearance of the menu icon to be static. For example, the media guidance application may create a static, unchanging menu icon.

In some embodiments, the media guidance application may, when the appearance of the menu icon indicates that the user has the second level of access to the first application, modify the appearance of the menu icon to include an animation. For example, the media guidance application may create an animated menu icon, with flashing elements, dynamically changing colors, moving shapes, or any combination thereof.

In some embodiments, the media guidance application may, when the appearance of the menu icon indicates that the user has the first level of access to the first application, change the appearance of the menu icon to include a first text. For example, the media guidance application may modify the menu icon to include the text "free subscription." In some embodiments, the text may be preselected, dynamically generated, or selected via a user prompt.

In some embodiments, the media guidance application may, when the appearance of the menu icon indicates that the user has the second level of access to the first application, change the appearance of the menu icon to include a second text different from the first text. For example, the media guidance application may modify the menu icon to include the text "premium subscription." In some embodiments, the text may be preselected, dynamically generated, or selected via a user prompt.

In some embodiments, the media guidance application may, when the appearance of the menu icon indicates that the user has the first level of access to the first application, change the appearance of the menu icon to include an indication that the user has access to the first set of media content. For example, the media guidance application may modify the menu icon to include the text "trailers only." In some embodiments, the text may be preselected, dynamically generated, or selected via a user prompt.

In some embodiments, the media guidance application may, when the appearance of the menu icon indicates that the user has the second level of access to the first application, change the appearance of the menu icon to include an indication that the user has access to the second set of media content. For example, the media guidance application may modify the menu icon to include the text "all-access!" In some embodiments, the text may be preselected, dynamically generated, or selected via a user prompt.

In some embodiments, the media guidance application may, in response to determining that the account status indicates the first level of access to the application, generate a menu icon that includes an upgrade input. For example, the menu icon may include a sub-icon with text "click to upgrade now!" In some embodiments, the media guidance application may, in response to detecting a user interaction with the upgrade input, adjust the menu icon such that the appearance of the menu icon indicates that the user has the second level of access to the first application. For example, if the user presses the "click to upgrade now!" sub-icon, the media guidance application may immediately modify the menu icon to indicate that the user has the second level of access to the first application. For example, the media guidance application may remove the sub-icon and modify the color of the menu icon.

In some embodiments, the media guidance application may detect functionality of a remote controller that is communicatively connected with a user equipment device. For example, the media guidance application may wirelessly receive the description of functionality of a remote controller directly the remote controller itself. In some embodiments, the media guidance application may receive an input from the user identifying the model of the remote controller. For example, the media guidance application may then query the functionality of a remote controller from a remote server based on the model of the remote controller.

In some embodiments, the media guidance application may determine a label and functionality of each input on the remote controller. For example, the media guidance application may look up this functionality in the functionality of the remote controller. For example, the media guidance application may determine that the remote controller has a single-click button labeled "power" and a circular touch-pad labeled "red."

In some embodiments, the media guidance application may select a user interface with at least one user interface element that matches the label and functionality of at least one input of the remote controller. In some embodiments, the media guidance application may select a user interface from a plurality of possible user interfaces based on matching a user-interface element to an input of the remote controller. For example, the media guidance application may select a user interface that has a circular volume control element labeled "red." In some embodiments, the media guidance application may select the user interface such that each interface element of that user interface matches the label and functionality of at least one input of the remote controller.

In some embodiments, the media guidance application may then display the selected user interface on the user equipment. For example, the media guidance application may display the user interface on the user's TV screen, tablet, smart phone, or any combination thereof.

In some embodiments, the media guidance application may detect a remote controller that is capable of interacting with a user interface on a user equipment that is remote from the remote controller. For example, the media guidance application may do so upon initial set-up of the user equipment, or when a user acquires a new remote controller. In some embodiments, the remote controller includes a plurality of inputs, such as buttons, scroll wheels, touch pads, microphones, other input elements, or any combination thereof.

In some embodiments, the media guidance application may determine characteristics of the remote controller. For example, the media guidance application may access a table that describes a label and input type for each input of the remote controller. Such table may be provided directly by the remote controller. In some embodiments, the media guidance application may acquire the table from a remote server based on a description. In some embodiments, the characteristics may include a description of every input of the plurality of inputs, wherein the description of each input comprises a type of input and a label of the input. In some embodiments, the remote controller is a physically separate device from the user equipment. For example, user equipment may include a TV screen, while a remote controller may be a separate battery-operated electronic device.

In some embodiments, the media guidance application may select, based on the characteristics of the remote controller, an optimal user interface to display on the user equipment. For example, the media guidance application may select the optimal user interface among pre-stored template user interfaces. In some embodiments, the media guidance application may also dynamically generate the optimal user interface.

In some embodiments, the media guidance application may select the optimal user interface by performing a series of steps. The series of steps may include storing a plurality of template user interfaces, each template user interface comprising a plurality of user interface elements, wherein each interface element comprises a label and a functionality type. For example, several interface templates may be stored locally by the media guidance application. Each template user interface may include a layout of user interface elements, such as buttons, circular dials, scroll wheels, voice input areas, or any combination thereof. In addition, each interface element may include a label and a functionality type. For example, one user element may be a button labeled "Enter." Another interface element may be a circular dial labeled "Red."

In some embodiments, the media guidance application may select a template user interface of the plurality of template user interfaces such that at least one interface element of that template user interface corresponds to a description of at least one input of the remote controller. In some embodiments, the media guidance application considers an interface element to corresponds to the description of the input when the label of the interface element matches the label of the input, and the type of the input is compatible with the functionality type of the interface element. For example, a button labeled "power" on the remote controller may be considered to correspond to a button user interface element with a label "power." In another example, a circular touchpad labeled "red" on the remote controller may be considered to correspond to a circular dial interface element with a label "red."

In some embodiments, the media guidance application may select a template user interface of the plurality of template user interfaces such that each interface element of that template user interface corresponds to a description of at least one input of the remote controller. For example, if the template user interface has five user interface elements such that each one of them corresponds to at least one input of the remote controller, this template user interface may be selected as the optimal user interface.

In some embodiments, the media guidance application may then display the selected optimal user interface on the user equipment. For example, the media guidance application may display the selected optimal user interface on the user's TV screen, tablet, smart phone, or any combination thereof.

In some embodiments, the media guidance application may determine characteristics of the remote controller by receiving a remote controller identifier from the remote controller. For example, the remote controller may periodically, or on request, send its identification number via an IR channel or via Wi-Fi. In some embodiments, the media guidance application may then transmit the identifier to a remote server. For example, the request may be transmitted to a media application guidance data server. In some embodiments, the media guidance application may then receive characteristics of the remote controller from the remote server. For example, the server may look up the characteristics based on the identifier, and forward them to the media guidance application.

In some embodiments, the media guidance application may determine that none of the stored plurality of template user interfaces can be selected. For example, every template user interface of the stored plurality of template user interfaces may have interface elements that cannot be matched with at least one input of the remote controller. For example, all template user interfaces may have a button labeled "menu," while the user remote has no button labeled "menu." In some embodiments, in response to such a determination, the media guidance application may generate a new template user interface based on the characteristics of the remote controller.

For example, the media guidance application may select a base template user interface from the plurality of template user interfaces. For example, the media guidance application may select a template user interface that has the most user interface elements which match at least one input of the remote controller. In some embodiments, the media guidance application may then modify the base template user interface such that each interface element of that modified template user interface corresponds to a description of at least one input of the remote controller. For example, if the base template user interface had a button labeled "menu," while the user interface did not have a button labeled "menu" but had a button labeled "red," the media guidance application may modify the user interface such that a button labeled "menu" is modified to be a button labeled "red."

In some embodiments, the media guidance application may optionally re-label at least one interface element, remove at least one interface element, or modify the functionality of at least one interface element. For example, the media guidance application may completely remove the "menu" button from the base template user interface. In some embodiments, if the template user interface had a circular dial labeled volume, while the user interface only has two buttons labeled "volume down" and "volume up," the media guidance application may modify the circular dial to two buttons labeled "volume down" and "volume up." In some embodiments, the media guidance application may store the new modified template user interface another of the plurality of template user interfaces.

In some embodiments, the media guidance application may determine that the remote controller has more inputs than the number of user interface elements of the selected optimal user interface. For example, the remote controller may have a specialized button labeled "Netflix" for directly launching the Netflix application, while none of the template user interfaces has such an interface element. In some embodiments, the media guidance application may in response to such determination, modify the selected optimal user interface based on the characteristics of the remote controller.

In some embodiments, the media guidance application may do at least one of: add at least one new user interface element to the optimal user interface template or add a label to a blank user interface element to the optimal user interface template. For example, the media guidance application may add the a "open Netflix" button to the selected optimal interface. In some embodiments, the media guidance application may store a new modified optimal user interface as a part of the plurality of template user interfaces.

In some embodiments, the media guidance application may provide a series to a user device. For example, the media guidance application may provide several episodes of the series to the user's TV system. For example, each episode may be provided to the user device in response to an explicit user request. In some embodiments, the media guidance application may automatically provide several episodes of the series in succession. In some embodiments, the series may comprise a plurality of sequential seasons, each season comprising a plurality of sequential episodes.

In some embodiments, the media guidance application may receive a request for recording the series. For example, a user may interact with a "record series" button. In response, the media guidance application may perform a series of steps described below.

In some embodiments, the media guidance application may identify the last episode of the series watched by the user. For example, the media guidance application may examine what episode of the series the user has currently selected in a menu. In some embodiments, the media guidance application may deem that that episode to be the last episode of the series watched by the user. In some embodiments, the media guidance application may maintain a list of all episodes watched by the user, and determine that the latest episode on that list is the last episode of the series watched by the user.

In some embodiments, the media guidance application may determine a relevant season of the plurality of seasons that precedes another season of the plurality of seasons and that includes the last episode watched by the user. For example, if the user has last watched episode 3, season 4 of a series that has six seasons, the media guidance application may determine that season 3 is the relevant season.

In some embodiments, the media guidance application may schedule for recording episodes of the relevant season that follow the last episode watched by the user such that episodes of a season that precedes the relevant season are not scheduled for recording. For example, if the user has last watched episode 3, season 4 of a series that has six seasons, the media guidance application may schedule for recording all episodes of season 4 that follow episode 3, such that all episodes of season 1 and 2 are not scheduled for recording. In some embodiments, the media guidance application may also not schedule for recording any episodes of seasons that follow the relevant season. For example, the media guidance application may not schedule for recording all episodes of seasons 4, 5 and 6.

In some embodiments, the media guidance application may provide a series to a user device. For example, the media guidance application may provide several episodes of the series to the user's TV system. For example, each episode may be provided to the user device in response to an explicit user request. In some embodiments, the media guidance application may automatically provide several episodes of the series in succession. In some embodiments, the series may comprise a plurality of sequential seasons, each season comprising a plurality of sequential episodes. For example, the series "Game of Thrones" may comprise six sequential seasons each with 10 sequential episodes.

In some embodiments, the media guidance application may maintain a series progress indictor that identifies last episode of the series watched by the user. For example, the media guidance application may track what was the latest (e.g., last in the sequence of sequential episodes) watched by the user. For example, if the user watched episode 3 of the fourth season of "Game of Thrones" (but has not watched any subsequent episodes), the media guidance application may set the indicator series progress indicator for that show to "season 4, episode 3."

In some embodiments, the media guidance application may receive a request for recording the series. For example, the user may click the "record season" button. In some embodiments, the media guidance application may then perform a series of steps in response to such a request as described below.

In some embodiments, the media guidance application may determine the relevant season of the plurality of seasons that precedes another season of the plurality of seasons and that includes the episode identified by the series progress indicator. For example, if the series progress indicator is set to "season 4, episode 3," (and the series has more than four seasons), the media guidance application may determine the fourth season to be the "relevant season."

In some embodiments, the media guidance application may monitor a broadcast schedule to identify a plurality of available episodes of the series. For example, the media guidance application may receive the broadcast schedule for next two weeks and find if any episodes of the series are scheduled for broadcast (e.g., by matching the title of the series with metadata of the broadcast schedule). For example, if the broadcast data includes a schedule transmission of season 4, episodes 1-9, and season 5, episodes 1-5 of the series, the media guidance application may identify those episodes as available. In some embodiments, the media guidance application may also access a user profile to determine if the user has a subscription that allows for recording of a plurality of available episodes of the series. For example, if the series is scheduled to be broadcast on HBO, the media guidance application may check whether the user has HBO subscription.

In some embodiments, the media guidance application may, for each particular episode of the plurality of available episodes of the series, determine that the particular episode belongs to the relevant season and follows the episode identified by the series progress indicator. For example, if the relevant season is "season 3," the media guidance application may determine whether the particular episode belongs to season 3. In some embodiments, the media guidance application may then schedule the particular episode to be recorded if it belongs to the relevant season and follows the episode identified by the series progress indicator. For example, if the series progress indicator is set to "season 4, episode 3," episodes 4-9 of season 4 will be scheduled to be recorded. In some embodiments, the media guidance application will schedule the recordings such that episodes of a season that precedes the given relevant season are not scheduled for recording. For example, episodes of the series belonging to seasons 1-3 will not be recorded if season 4 is the relevant season. In some embodiments, the media guidance application will schedule the recordings such that episodes of a season that follows the given relevant season are not scheduled for recording. For example, episodes of the series belonging to seasons 5-6 will not be recorded if season 4 is the relevant season.

In some embodiments, the media guidance application may maintain the series progress indicator by monitoring which episode of the series is selected on a menu by the user. For example, if the user has selected a certain episode from the menu, the series progress indicator may be set to that episode.

In some embodiments, the media guidance application may maintain a list of episodes of the series that were watched by the user. For example, the media guidance application may maintain a data structure that permanently identifies every episode of the series watched by the user. In some embodiments, the media guidance application may determine which episode of the episodes of the series that were watched by the user is the latest in the series. For example, if the data structure includes episodes 1-8 of season 1 of the series, the media guidance application may set the series progress indicator to season 1, episode 8.

In some embodiments, the media guidance application may, in response to determining that all episodes of the relevant season that follow the episode identified by the series progress indicator are recorded, provide a completion notification to the user. For example, if the series progress indicator was set to season 3, episode 4 (and season has 9 episodes), the media guidance application may provide a completion notification when all of season 3 episodes 5-9 are recorded.

In some embodiments, the media guidance application may determine that at least one episode of the relevant series that follows the episode identified by the series progress indicator is not available for recording. For example, if the series progress indicator was set to season 3, episode 4 (and season has 9 episodes), the media guidance application may determine that season 3 episode 5 is not scheduled for broadcast.

In some embodiments, the media guidance application may then determine that the at least one episode of the relevant series is available for over-the-top (OTT) streaming. For example, the media guidance application may determine that season 3, episode 5 is available via Netflix (or via any other OTT service). In some embodiments, the media guidance application may then provide a notification to the user, the notification comprising a hyperlink for streaming the at least one episode of the relevant series via the at least one OTT streaming service. For example, the media guidance application may provide a hyperlink to watch season 3 episode 5 on Netflix. In some embodiments, the media guidance application may also access a user profile to determine if the user has a subscription to the at least one OTT streaming service before providing the hyperlink. For example, the media guidance application may check whether the user has a Netflix subscription.

In some embodiments, the request to record a series may comprise a user selecting an option to record the relevant season from a list of possible options. For example, options may include "relevant season," "current season" and "all seasons." In some embodiments, the user may make that selection using a radio-selection user interface element.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 10 depicts an illustrative flow diagram for a process of changing the appearance of a menu icon, in accordance with some embodiments of the disclosure;

FIG. 11 depicts another illustrative flow diagram for a process of changing the appearance of a menu icon, in accordance with some embodiments of the disclosure;

FIG. 24 depicts an illustrative embodiment of generating a playlist of content based on a first user and a second user, in accordance with some embodiments of the disclosure;

FIG. 29 depicts an illustrative embodiment of an applications menu shown on a guide screen, in accordance with some embodiments of the disclosure; and FIG. 30 depicts an illustrative embodiment of a tuners menu shown on a display screen, in accordance with some embodiments of the disclosure.

DETAILED DESCRIPTION

Figure 1:
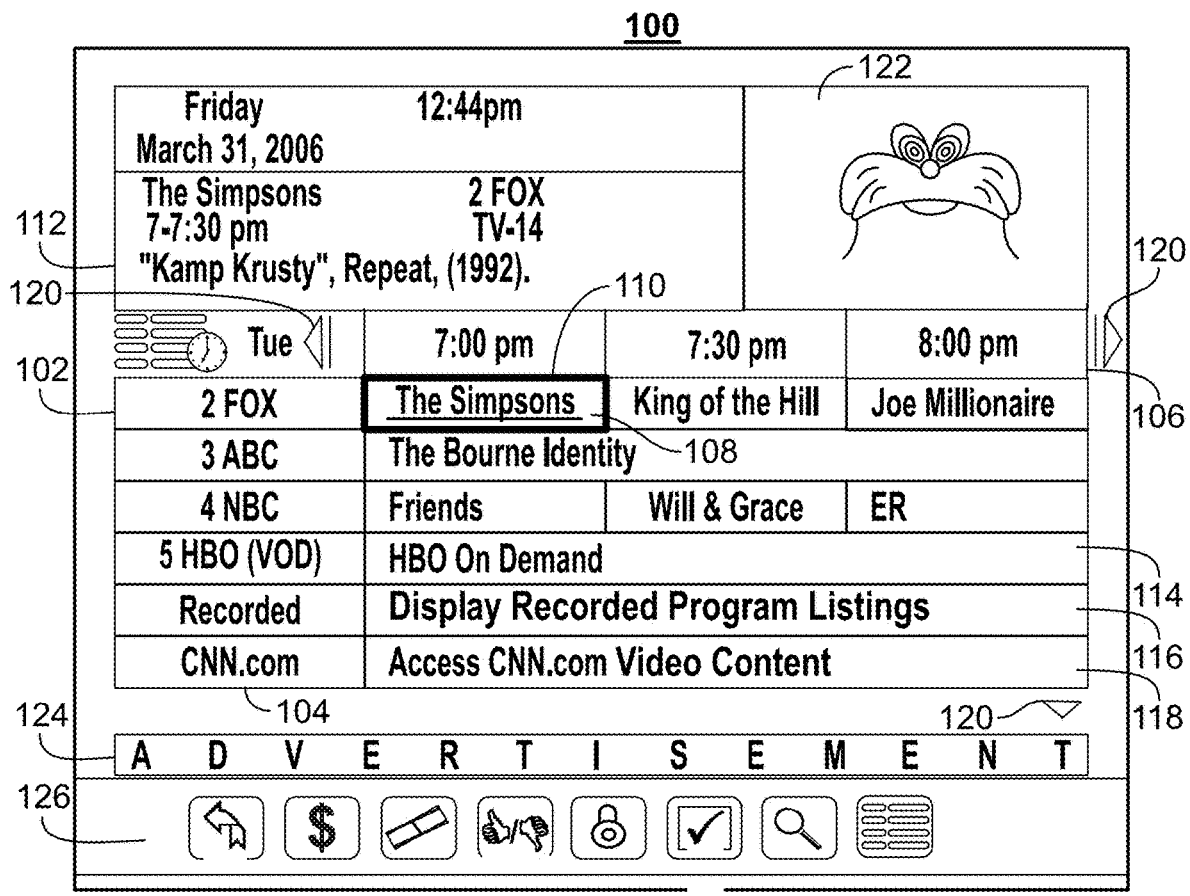
FIG. 1 shows an illustrative embodiment of a display screen that may be used to provide media guidance application listings and other media guidance information, in accordance with some embodiments of the disclosure.

In some embodiments, the media guidance application may modify an icon (e.g., a launch icon) of an application to indicate a status of an application to a user. For example, the media guidance application may determine an account status of the user with respect to an application. For example, the media guidance application may determine if the user has a first level of access or a second level access (e.g., a level of access that allows the user to access at least one more media content items than would be allowed by the first level of access) to the application. In some embodiments, the media guidance application may then generate a menu icon for the application that is indicative of the first or second level of access to allow the user to easily know what level of he has.

Different media systems often contain different hardware, including different remote controllers. Some of these controllers contain more functionalities (e.g., have more inputs, abilities to take voice commands, etc.) than others. There exists a need to modify the menu of the media guidance application to provide a more efficient user interface that increases usability for the user based on the determined functionality of the remote controller used by the user's media system. Accordingly, the media guidance application may detect a functionality of remote controller that is separate and remote from the equipment it controls. The media guidance application may then select a user interface such that all user interface elements of that interface match at least one of the inputs of the controller (e.g., have a similar label and compatible functionality). The media guidance application may then display the selected user interface on the user equipment that is controlled by the remote controller. In this way, the user interface is guaranteed not have elements that are useless or confusing, thus improving the functionality of the user equipment.

In some embodiments, the media guidance application may receive an input from the user to record a season of a TV show. In some embodiments, the media guidance application may also receive an indication that the user is only interested in recording the season of the series that is currently relevant to the user. In some embodiments, the media guidance application may determine that the user is interested in recording a season that is currently being watched by the user. For example, if the user has most recently watched season 3, episode 4 of the "Game of Thrones" series, the media guidance application may determine that season 3 is the relevant season, even if there are seasons that come after season 3. For example, seasons 1-6 may be available, yet the media guidance application may determine that only season 3 is currently relevant. In some embodiments, the media guidance application may then schedule for recording only the episodes of the currently relevant season. In some embodiments, the media guidance application may then schedule for recording only the episodes of the currently relevant season that follow the most recently watched episode.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
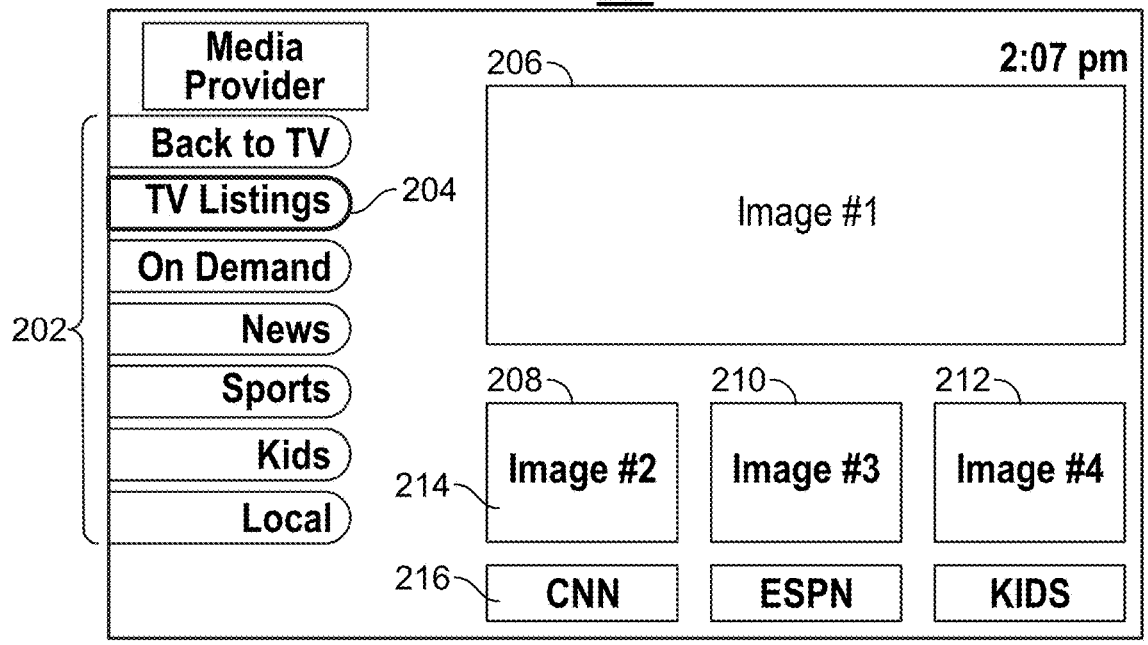
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
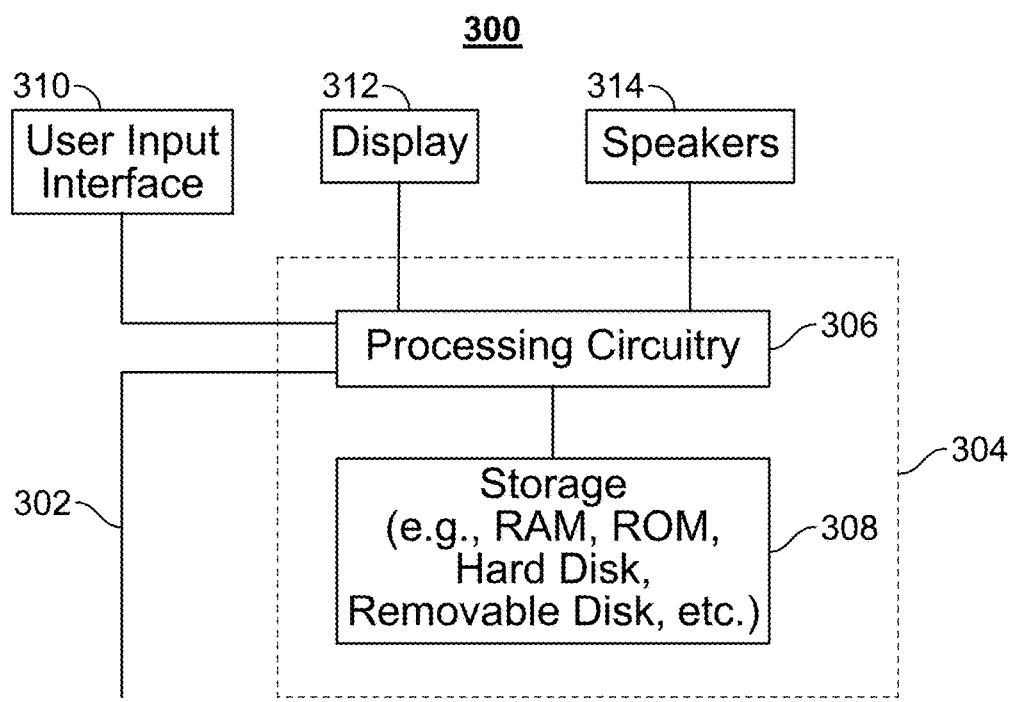
FIG. 3 is a block diagram of an illustrative user equipment (UE) device, in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
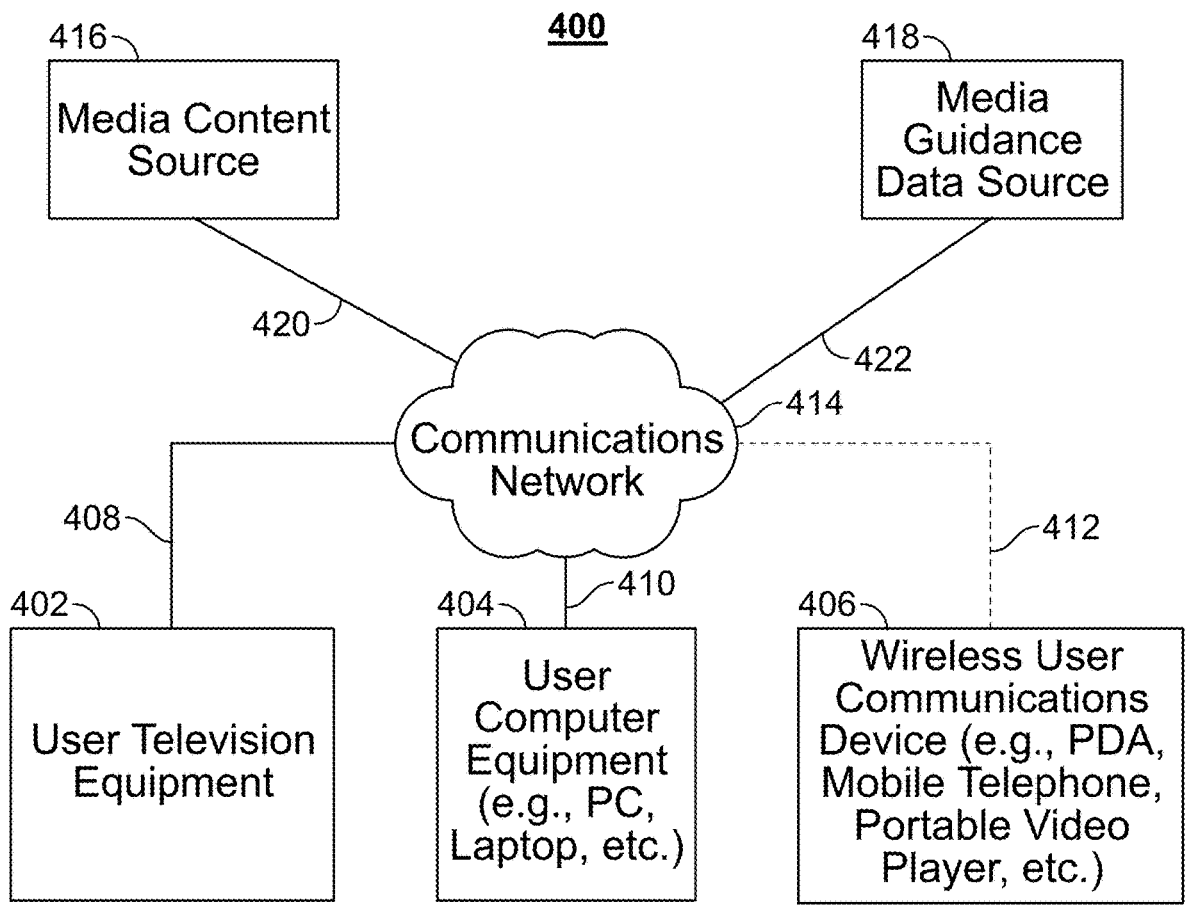
FIG. 4 is a block diagram of an illustrative media system, in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

System 400 may also include an advertisement source 424 coupled to communications network 414 via a communications path 426. Path 426 may include any of the communication paths described above in connection with paths 408, 410, and 412. Advertisement source 424 may include advertisement logic to determine which advertisements to transmit to specific users and under which circumstances. For example, a cable operator may have the right to insert advertisements during specific time slots on specific channels. Thus, advertisement source 424 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 424 may be configured to maintain user information including advertisement-suitability scores associated with user in order to provide targeted advertising. Additionally or alternatively, a server associated with advertisement source 424 may be configured to store raw information that may be used to derive advertisement-suitability scores. In some embodiments, advertisement source 424 may transmit a request to another device for the raw information and calculate the advertisement-suitability scores. Advertisement source 424 may update advertisement-suitability scores for specific users (e.g., first subset, second subset, or third subset of users) and transmit an advertisement of the target product to appropriate users.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

In some embodiments, the media guidance application may periodically, or continuously, check the database in the user profile to determine if any user account information associated with applications has been updated, added to, or deleted. The media guidance application may periodically, or continuously, refresh the menu of applications to reflect the current status of all applications.

In some embodiments, the media guidance application may establish different cues that distinguish between the level of account that the user has for an application. For example, the media guidance application may have three distinct cues that represent three levels of accounts (e.g., no account, an account with no paid subscription to content, and an account with a paid subscription to content). These distinct cues may be used to help the user identify the current status of all the applications displayed on the screen of the user equipment.

In some embodiments, the media guidance application may determine that a user has selected (e.g., navigated to and selected via a remote or a voice command) and opened an application. The media guidance application may determine that the user has input their account information into the application (e.g., by logging in via a login screen). The media guidance application may store this account information associated with the opened application in the database in the user profile.

In some embodiments, the media guidance application may generate a prompt for the user asking the user to input account information for the currently installed applications, when applicable. The media guidance application may generate the prompt when initializing the user's settings and profile. The media guidance application may also generate the prompt when the user navigates to a sub menu (e.g., a settings menu) from the main menu.

In some embodiments, the media guidance application may determine that the cues are visual. The media guidance application may determine that a highlight box is created around all the applications where the user has an account.

As defined herein, "level of access" to an application refers to any kind of data or a rule that defines the user's ability to access different tiers of service provided by that application. For example, with regard to an exemplary application, the user may have the highest level of subscription, a medium level of subscription, or no subscription or account associated with an application. The highest level of subscription may be a paid subscription, a paid subscription to premium content (e.g., a monthly paid subscription to HBO Now, Netflix, etc.), or any subscription that includes access to content in an application. The medium level of subscription may be a paid subscription (e.g., a paid subscription in a lower tier than the highest level of subscription), or a free subscription (e.g., a free account with the music streaming application Spotify, that makes the user listen to advertisements every set amount of songs). The medium level of subscription may not allow the user to access all of the content available on the corresponding application; some content (e.g., at least one media content item) may be restricted and/or require a higher level of subscription.

As defined herein, "account status" refers to any kind of data that defines the user's level of access to an application. In some embodiments, the account status may be a locally stored filed that defines the user's level of access to an application. In some embodiments, the media guidance application may retrieve the account status by retrieving, from a database in the user profile, user account information for the application. In the event the search does not return a result, the media guidance application may determine that the user does not have an account with the corresponding application.

Figure 5:
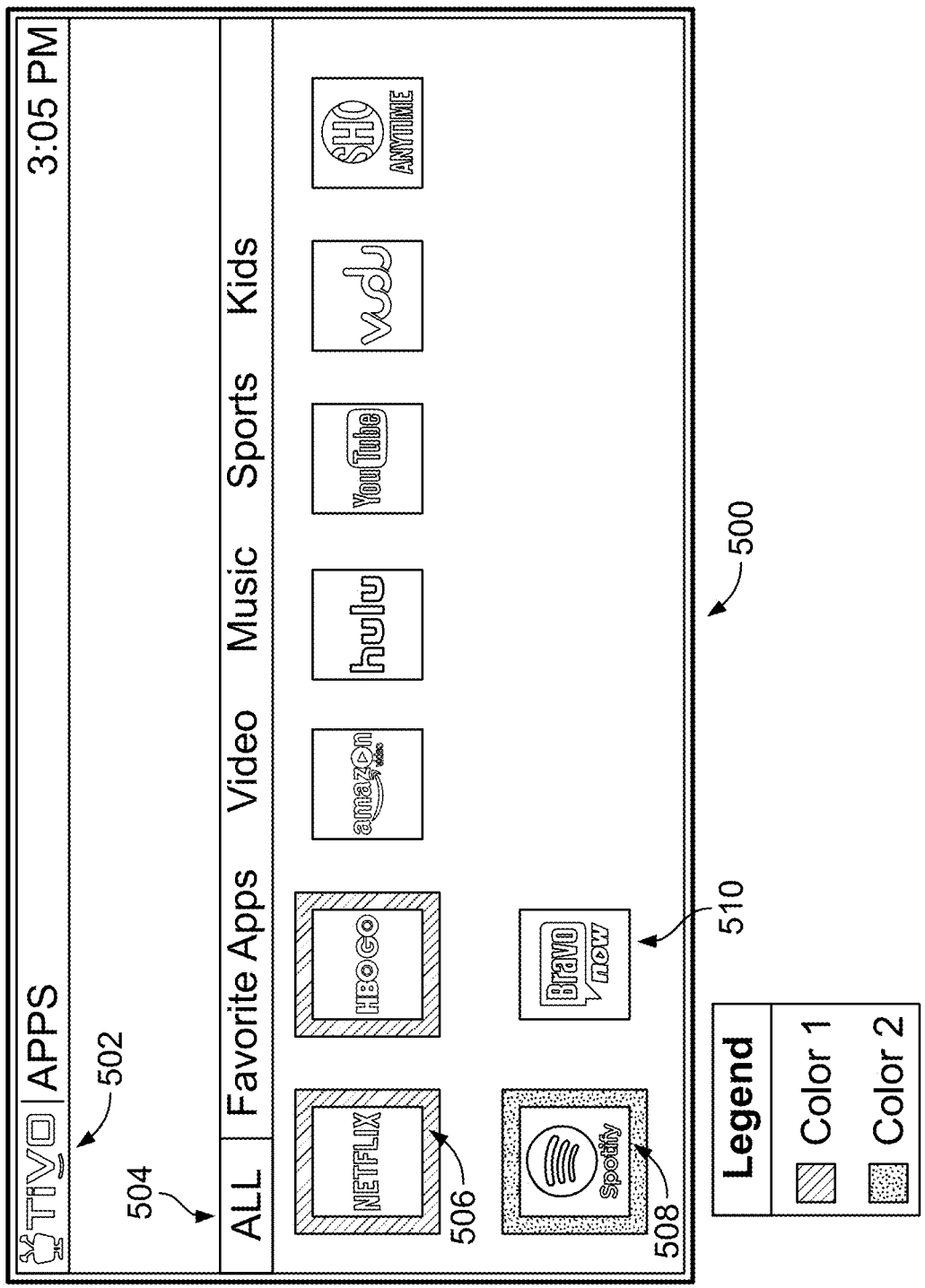
FIG. 5 shows an illustrative embodiment of an applications menu shown on a display screen, in accordance with some embodiments of the disclosure.

FIG. 5 shows an illustrative embodiment of an applications menu shown on a display screen, in accordance with some embodiments of the disclosure. FIG. 5 shows display 500 of user equipment. Display 500 may include "APPS" menu 502. Display 500 may include an application overlay bar 504 that shows the different application filter options (e.g., the user selecting one of these options would filter the application based on the application type (e.g., favorites, sports, kids, videos, etc.)). Display 500 may include a plurality of menu icons (e.g., a Netflix icon, HBO GO icon, Amazon icon etc.) In some embodiments, at least one icon (e.g., Netflix icon) can include visual cue 506. For example, visual cue 506 may highlight the border of the application icon in a first color. In some embodiments, at least one icon (e.g., Spotify icon) can include a different visual cue 508. For example, visual cue 508 may highlight the border of the application (e.g., Spotify) in a second color. In some embodiments, at least one application icon 510 (e.g., Bravo Now launch icon) may not have a visual cue associated with it.

For example, the media guidance application may generate visual cue 506 (e.g., a green highlight box) around each application icon that is associated with an application where the user has a paid subscription account. As another example, the media guidance application may generate visual cue 508 (e.g., a red highlight box) around all application icons associated with applications where the user has a free account. In some embodiments, the media guidance application may generate no cue for application icons 510 associated with applications where the user does not have an account.

In some embodiments, the media guidance application may filter the applications based on the status of the application (e.g., filter based on subscribed to and/or premium applications), to indicate which applications are not free. The filter may be selected by the user, e.g., by using application overlay bar 504.

In some embodiments, the media guidance application may filter the applications based on the status of the application in relation to a free trial (e.g., for applications that require paid subscriptions). For example, the media guidance application may filter the applications based on applications that still have a free trial period available for the user (e.g., determined based on information in the user profile).

Figure 6:
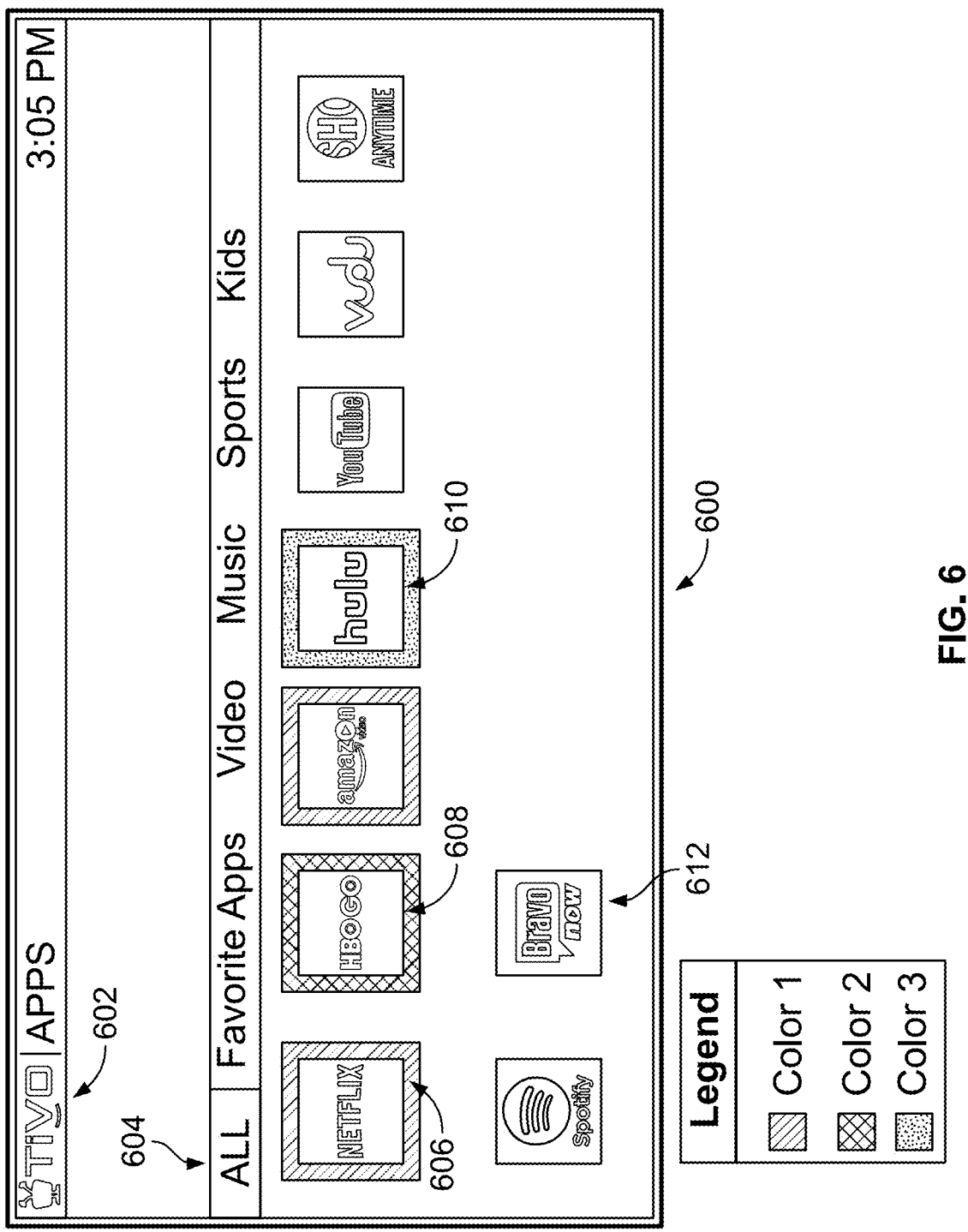
FIG. 6 shows an illustrative embodiment of another applications menu shown on a display screen, in accordance with some embodiments of the disclosure.

FIG. 6 shows display 600 of user equipment. Display 600 may include "APPS" menu 602. Display 600 may include application overlay bar 604 that shows different application filter options (e.g., the user selecting one of these options would filter the application based on the application type (e.g., favorites, sports, kids, videos, etc)). Display 600 may include a visual cue 606 that highlights the border of an application icon (e.g., Netflix) in color one. Display 600 may also include a visual cue 608 that highlights the border of another application icon (e.g., Spotify) in color two. Display 600 may also include a visual cue 610 that highlights the border of an application icon (e.g., Hulu) in color three. Display 600 may also include an application icon 612 (e.g., Bravo Now) that does not have a visual cue associated with it.

In some embodiments, the media guidance application may establish different cues that indicate how much time the user has left before the user's paid subscription to an application expires. The media guidance application may retrieve this information from the database that stores user account and subscription information. For example, the media guidance application may retrieve a preset (e.g., by an editor) set of thresholds from the user profile, which may be adjustable upon user input. For example, the media guidance application may retrieve the set of thresholds, each of which corresponds to a cue (e.g., 30+ days which corresponds to green, 7+ days which corresponds to yellow, and expired which corresponds to red). The media guidance application may compare the time that the user has left before the user's paid subscription to an application expires for each application the user has a subscription to the set of thresholds, to assign a cue to each application. The media guidance application may then generate and display said cue for each application on the user equipment.

For example, the media guidance application may determine, using the methods described above, that the user's paid subscription to the application associated with an icon does not expire for at least 30 days, and thus generate cue 606 that highlights the icon in green. In some embodiments, the media guidance application may determine that the user's paid subscription to application does not expire for at least 7 days, and thus generate cue 608 that highlights the icon in yellow. In some embodiments, the media guidance application may determine that the user's paid subscription to the application has already expired, and thus generate cue 610 that highlights the icon in red. In some embodiments, the media guidance application may not highlight application icon 612 in any color after determining the user does not have any subscription or account associated with an application associated with that icon.

In some embodiments, the size of the application as it appears on the display may be modified by the media guidance application to show a difference between paid and unpaid subscriptions associated with applications, as well as no account/subscription for applications. The modification may help the user easily identify which applications may be more desirable for the user to access (e.g., applications with paid subscriptions may be more desirable than applications with no subscriptions/accounts).

Figure 7:
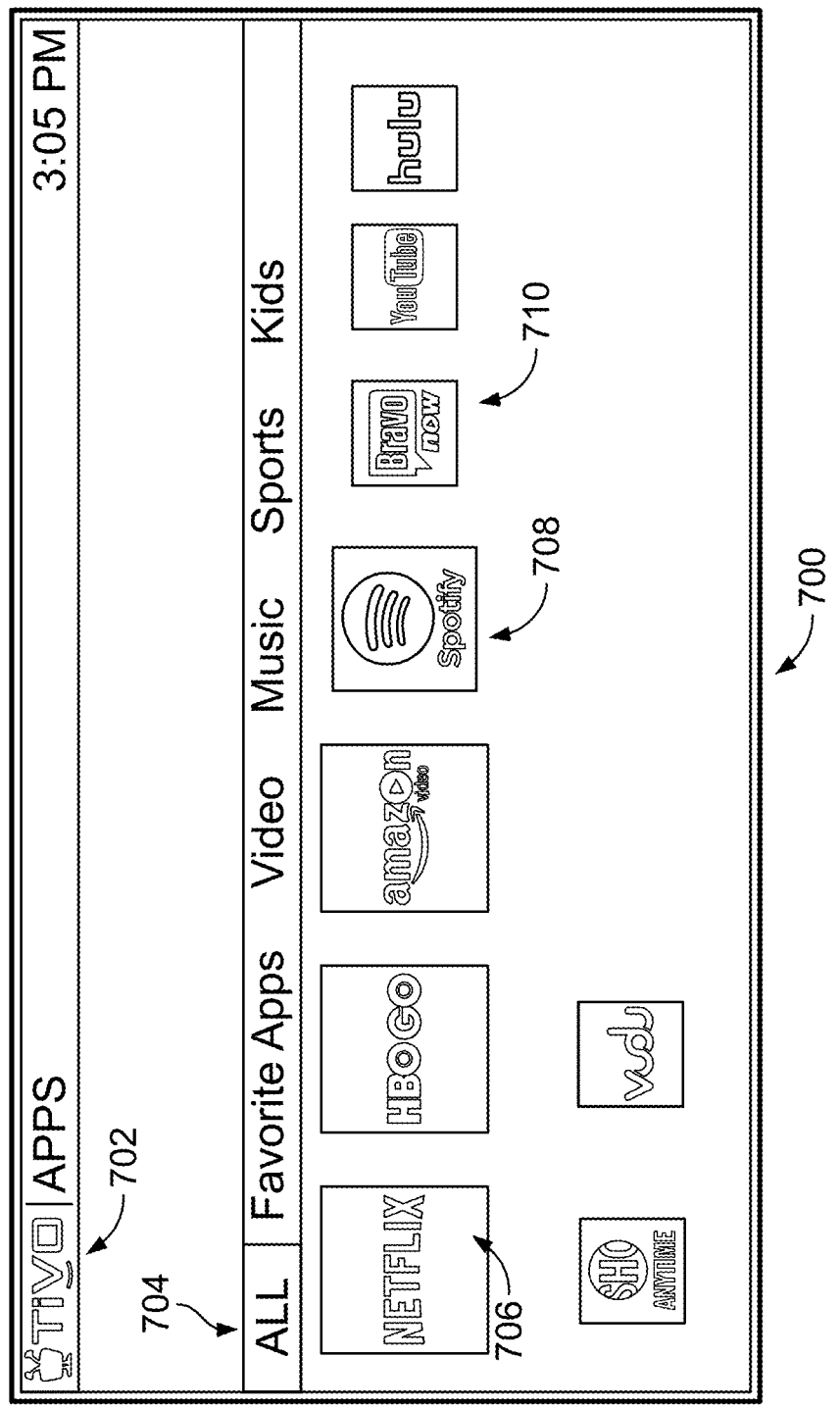
FIG. 7 shows an illustrative embodiment of yet another applications menu shown on a display screen, in accordance with some embodiments of the disclosure.

FIG. 7 shows display 700 of user equipment 700. Display 700 may include "APPS" menu 700. Display 700 may include application overlay bar 700 that shows the different application filter options (e.g., the user selecting one of these options would filter the application based on the application type (e.g., favorites, sports, kids, videos, etc.) Display 700 may include a visual cue 706 that enlarges the size of an application icon (e.g., Netflix) to a first size. Display 700 may also include a visual cue 708 that enlarges the size of an application icon (e.g., Spotify) to a second size. Display 700 may include a visual cue that shrinks the size of an application icon (e.g., Hulu) to a third size. For example, the media guidance application may modify all icons associated with applications to which the user has paid subscription applications to enlarge their sizes to a first size. In some embodiments, the media guidance application may modify all icons associated with applications to which the user has an unpaid subscription to enlarge their sizes to a second size, where the first size is larger than the second size. In some embodiments, the media guidance application may modify all icons associated with applications where the user does not have a subscription to the applications to shrink the size to a third size, where the third size is smaller than the first and second sizes.

In some embodiments, the media guidance application may create visual cues based on application size (e.g., make the application where the user has an account with bigger and more prominently displayed than the applications where the user does not have an account); opaqueness (e.g., fade out the applications where the user does not have an account), order (order the applications where the user has accounts (e.g., from paid, to unpaid, to none); manipulation of the size of the applications (e.g., making the applications where the user has accounts with "bounce" on the screen by repetitively making the application icon size smaller and larger in a short period of time), and any other similar visual cue.

In some embodiments, the media guidance application may provide haptic feedback as a cue. For example, the media guidance application may use a sensor (e.g., a piezoelectric sensor) contained inside the remote controller to create a vibration in the remote control when the user navigates to an application that the user has an account for. Once the user navigates to an application and stays on the application for a threshold amount of time (e.g., a threshold amount of time that is found in the user profile and preset by an editor), the media guidance application may generate a vibration. The media guidance application may determine that the length of vibration, force of the vibration, and other characteristics of the vibration are dependent on the status of the application. For example, the media guidance application may generate vibrations in three different time lengths (e.g., a long time-length vibration to indicate that the user has a paid subscription to the selected application, a medium time-length vibration to indicate that the user has an unpaid subscription to the selected application, and a short or no vibration to indicate that the user does not have a subscription or account to the selected application). The media guidance application may determine not to create a vibration using the sensor when the user navigates to an application where the user does not have an account.

In some embodiments, the media guidance application may provide audio feedback as a cue. The media guidance application may play different tones or phrases based on the status of the application. For example, the media guidance application may generate a low, medium, and high frequency tone associated with no account, an unpaid account, and a paid account immediately after the user navigates to an application. As another example, the media guidance application may play back a phrase (e.g., the phrase "none" etc.) immediately after the user navigates to an application that the user does not have an account with. The media guidance application may play back a phrase (e.g., the phrase "free" etc.) immediately after the user navigates to an application where the user has an unpaid subscription account. In some embodiments, the media guidance application may play back a phrase (e.g., the phrase "paid" or "premium" etc.) immediately after the user navigates to an application that the user has a paid subscription with.

Figure 8:
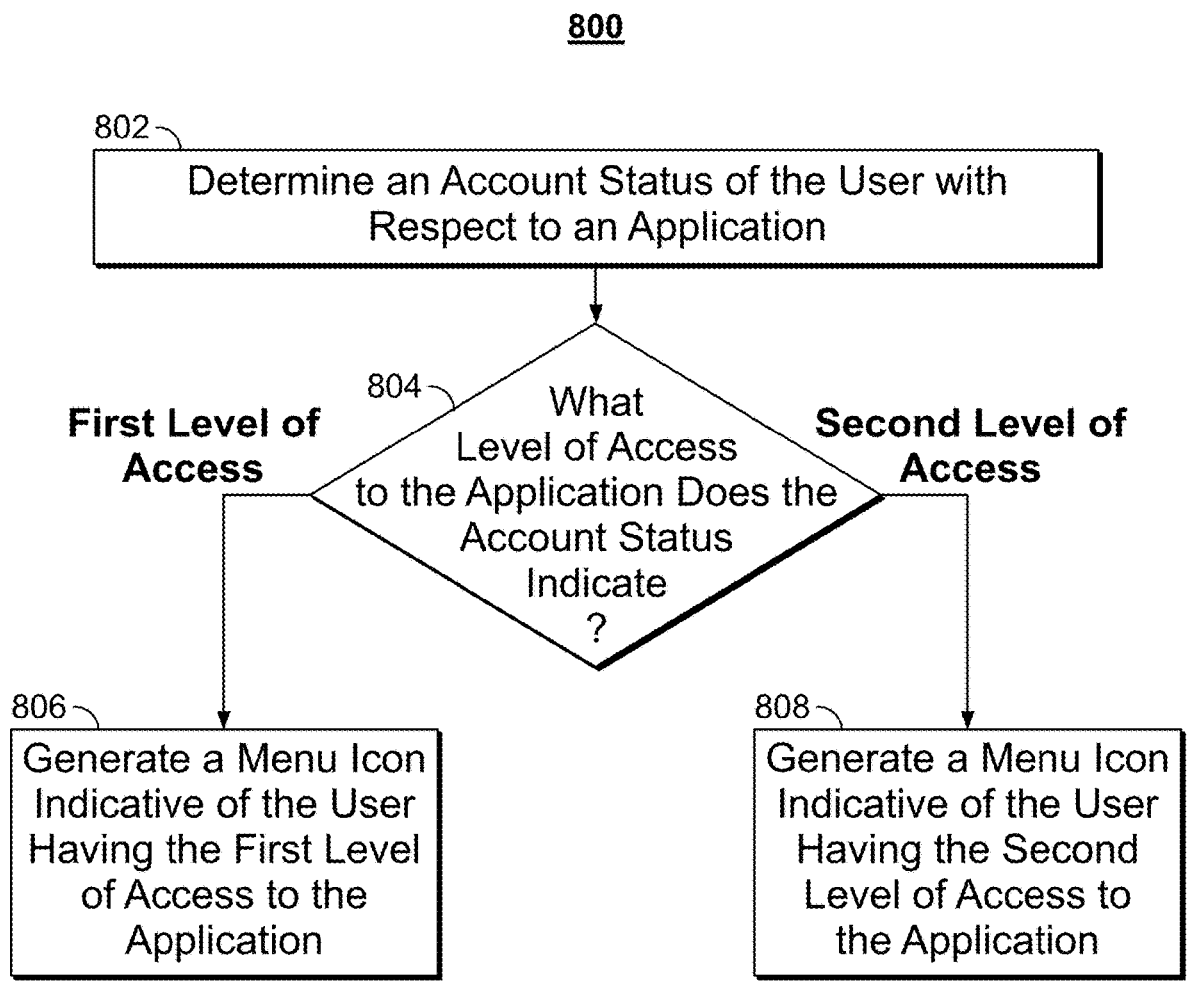
FIG. 8 depicts an illustrative flow diagram for a process of generating a menu icon indicative of the user's level of access, in accordance with some embodiments of the disclosure.

FIG. 8 depicts an illustrative flow diagram of a process 800 for generating a menu icon indicative of the user's level of access, in accordance with an embodiment of the disclosure. Process 800 may be executed by control circuitry 304 (e.g., in a manner instructed to control circuitry 304 by the media guidance application). Control circuitry 304 may be a part of user equipment (e.g., user television equipment 402, user computer equipment 404, and/or wireless communications device 406), or of a remote server separated from the user equipment by way of communications network 414.

Process 800 begins at 802, where control circuitry 304 determines an account status of the user with respect to an application. For example, control circuitry 304 may determine an account status of the user with respect to an application associated with a Netflix icon (e.g., Netflix) of FIG. 5. For example, control circuitry 304 may query local storage 308 to receive a file that stores account status for all applications installed on user television equipment 402 or user computer equipment 404. In some embodiments, control circuitry 304 may retrieve account status from a remote server (e.g., media guidance data source 418).

Process 800 continues at 804, where control circuitry 804 determines what level of access to the application (e.g., Netflix) the user has. For example, control circuitry 304 may determine whether the user has the first level of access or the second level of access. In some embodiments, when the user has the first level of access to the application, the user may be able to access a first set of media content items using the application. For example, the first level of access may be a free subscription to the application. In some embodiments, the free subscription may allow the user to watch several movie previews and/or several free promotions of media content items (e.g., movies or TV shows). In some embodiments, when the user has the second level of access to the application, the user may be able to access a second set of media content items using the application. The second set of media content items may contain at least one more media content item than the first set. For example, the second level of access may be a paid subscription to the application. In some embodiments, the paid subscription may allow the user to watch many premium movies and TV shows in addition to movie previews and/or several free promotions of media content items (e.g., movies or TV shows).

In some embodiments, when control circuitry 304 determines that the user has the first level of access to the application, process 800 may continue at 806. In some embodiments, when control circuitry 304 determines that the user has the second level of access to the application, process 800 may continue at 808.

At 806, control circuitry 304 may generate a menu icon (e.g., Netflix icon of FIG. 5) indicative of the user having the first level of access to the application. For example, the menu icon may be generated to include a first color indicative of the first level of access. In another example, the menu icon may be generated to be of a first size, indicative of the first level of access.

At 808, control circuitry 304 may generate a menu icon (e.g., Netflix icon of FIG. 5) indicative of the user having the second level of access to the application. For example, the menu icon may be generated to include a second color indicative of the second level of access. In another example, the menu icon may be generated to be of a second size, indicative of the second level of access.

Figure 9:
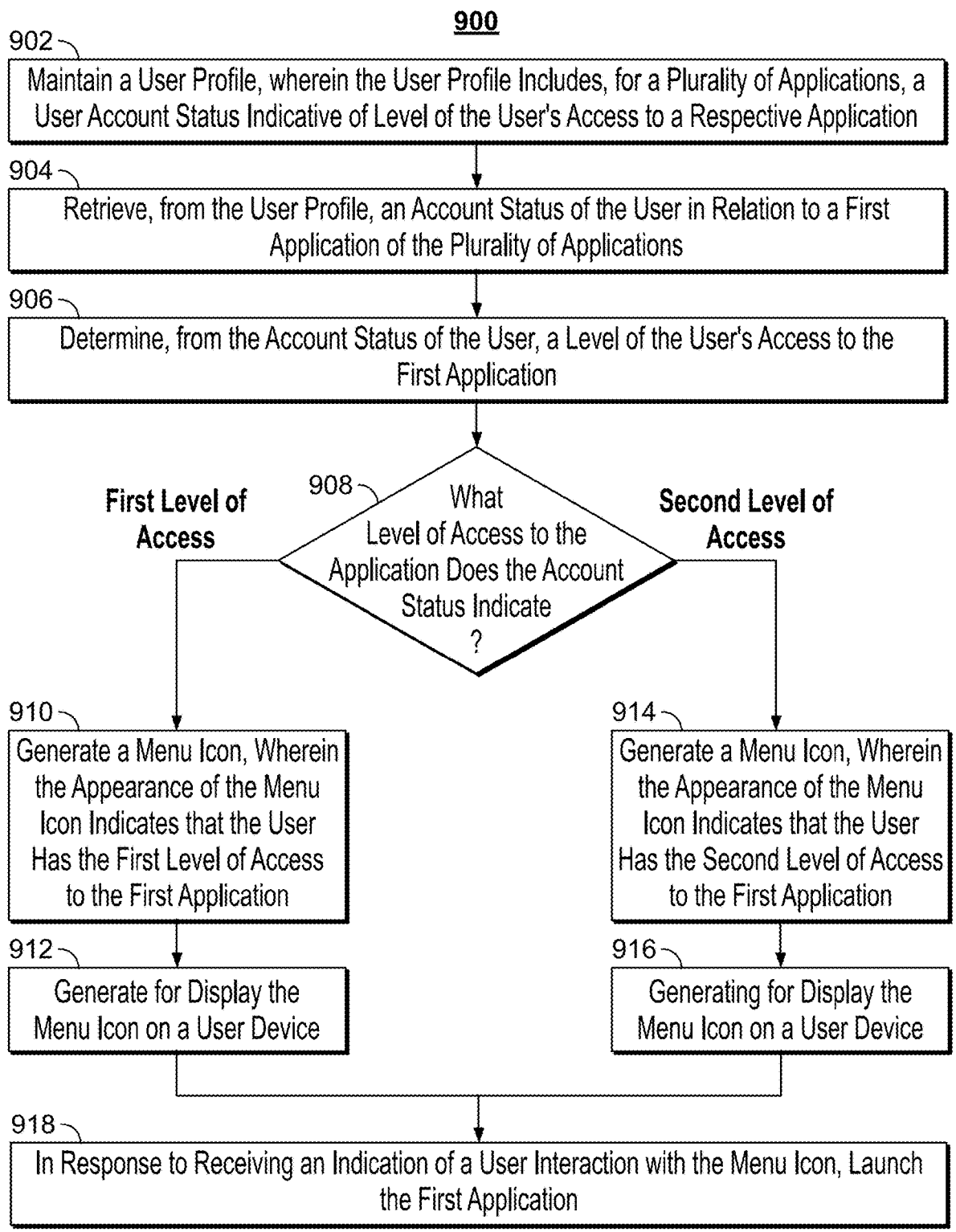
FIG. 9 depicts another illustrative flow diagram for a process of generating a menu icon indicative of the user's level of access, in accordance with some embodiments of the disclosure.

FIG. 9 depicts another illustrative flow diagram of a process 900 for generating a menu icon indicative of the user's level of access, in accordance with an embodiment of the disclosure. Process 900 may be executed by control circuitry 304 (e.g., in a manner instructed to control circuitry 304 by the media guidance application). Control circuitry 304 may be a part of user equipment (e.g., user television equipment 402, user computer equipment 404, and/or wireless communications device 406), or of a remote server separated from the user equipment by way of communications network 414.

Process 900 begins at 902, where control circuitry 304 may maintain a user profile. In some embodiments, the user profile may include, for a plurality of applications, a user account status indicative of the level of the user's access to a respective application. For example, the user profile may be in a database that includes the status of each application (e.g., Netflix, Spotify, etc.) installed by the user. In some embodiments, whenever a user purchases a subscription, or a subscription lapses, control circuitry 304 may modify the user profile to reflect this change. For example, if the user purchases a paid subscription to Spotify, control circuitry 304 may modify the database entry associated with Spotify to reflect that that user has paid subscription access. In some embodiments, when the user's Spotify subscription expires, control circuitry 304 may modify the database entry associated with Spotify to reflect that that user has no subscription access.

Process 900 continues at 904, where control circuitry 304 may retrieve, from the user profile, an account status of the user in relation to a first application (e.g., Netflix application of FIG. 5) of the plurality of applications (e.g., applications of FIG. 5). In some embodiments, control circuitry 304 may perform step 904 periodically or aperiodically. For example, control circuitry 304 may perform step 904 every time an applications menu (e.g., APPs menu 504 of FIG. 5) is opened. In another example, control circuitry 304 may perform step 904 every 30 minutes or every other period of time.

Process 900 continues at 906, where control circuitry 304 may determine, from the account status of the user, a level of the user's access to the first application. For example, control circuitry 304 may determine the user's level of access to a particular application (e.g., Netflix) of all applications installed on user's television equipment 402. For example, control circuitry 304 may determine if the user has the first level (e.g., free subscription) of access to the application or if the user has a second level of access (e.g., paid subscription) to the application. In some embodiments, there may be any number of levels of access to the application. In some embodiments, when the user has the first level of access to the application, the user can, via that application, access a first set of media content items (e.g., watch movie previews on Netflix). In some embodiments, when the user has the second level of access to the application, the user can, via that application, access a second set of media content items that includes at least one more media content item than the first set (e.g., watch movies and tv shows in addition to previews on Netflix).

Process 900 continues at 908, where control circuitry 304 may take different paths depending on what level of access the account status indicates for the application. In some embodiments, if the account status indicates the first level of access, process 900 may continue to 910. In some embodiments, if the account status indicates the second level of access, process 900 may continue to 914.

At 910, control circuitry 304 may generate a menu icon, wherein the appearance of the menu icon indicates that the user has the first level of access to the first application. For example, control circuitry 304 may generate an icon to include a first color (e.g., dull blue) to indicate that the user has a first level of access to the first application. In another example, control circuitry 304 may generate an icon to be of a first size to indicate that the user has a first level of access to the first application.

At 912, control circuitry 304 may generate for display the menu icon on a user device. For example, control circuitry 304 may display the menu icon on display 500 of FIG. 5.

At 914, control circuitry 304 may generate a menu icon, wherein the appearance of the menu icon indicates that the user has the second level of access to the first application. For example, control circuitry 304 may generate an icon to include a second color (e.g., bright yellow) to indicate that the user has the second level of access to the first application. In another example, control circuitry 304 may generate an icon to be of a second size (e.g., larger than the first size) to indicate that the user has the first level of access to the first application.

At 916, control circuitry 304 may generate for display the menu icon on a user device. For example, control circuitry 304 may display the menu icon on display 500 of FIG. 5.

Process 900 continues at 918, where control circuitry 304 may, in response to receiving an indication of a user interaction with the menu icon, launch the first application. For example, control circuitry 304 may listen for user input via user input interface 310. For example, the user may click on the menu icon using a TV remote controller, a touch screen interface, or a computer mouse. Once the user clicks on the menu icon, control circuitry 304 may launch the associated application.

FIG. 10 depicts an illustrative flow diagram for a process of changing the appearance of a menu icon, in accordance with some embodiments of the disclosure. Process 1000 may be executed by control circuitry 304, for example, in a manner instructed to control circuitry 304 by the media guidance application. In some embodiments, process 1000 is executed as a part of block 906.

Process 1000 begins at 1002, wherein control circuitry 304 determines, from the account status of the user, a time, wherein the time is an amount of time left until a subscription to the first application for the user expires. For example, if the user has purchased a paid subscription to Netflix on Nov. 20, 2017, and 10 days elapsed since, control circuitry 304 may determine that 20 days are left on the paid subscription.

Process 1000 continues at 1004, wherein control circuitry 304 determines the level of the user's access to the first application based on the time. For example, if control circuitry 304 has determined that 20 days are left of the paid subscription, control circuitry 304 may determine that the user still has a paid subscription to the application. However, if the amount of time is equal to zero (or less), control circuitry 304 may determine that the user has lapsed back to a free subscription.

Process 1000 continues at 1006, where control circuitry 304 may change the appearance of a menu icon associated with the application to reflect the determined level of subscription. This may be performed in a manner described at steps 910 and 914 of FIG. 9.

FIG. 11 depicts another illustrative flow diagram for a process of changing the appearance of a menu icon, in accordance with some embodiments of the disclosure. Process 1000 may be executed by control circuitry 304, for example, in a manner instructed to control circuitry 304 by the media guidance application. In some embodiments, process 1000 is executed as a part of block 906.

Process 1100 begins at 1102, wherein control circuitry 304 may, in response to determining that the account status indicates the first level of access to the application, generate a menu icon that includes an upgrade input. For example, a menu icon (e.g., Netflix icon of FIG. 5) may be generated to include an "upgrade now" text. The text may be below, above, alongside or overlaid over the menu icon.

Process 1100 continues at 1104, wherein control circuitry 304, in response to detecting the user interaction with the upgrade input, may adjust the menu icon such that the appearance of the menu icon indicates that the user has the second level of access to the first application. For example, if the user has clicked the upgrade input, control circuitry 304 may automatically upgrade the user's level of access (e.g., by submitting the user's payment information to an application store), and subsequently modify the icon to indicate that the user now has the second level of access (e.g., paid subscription) to the application.

Figure 12:
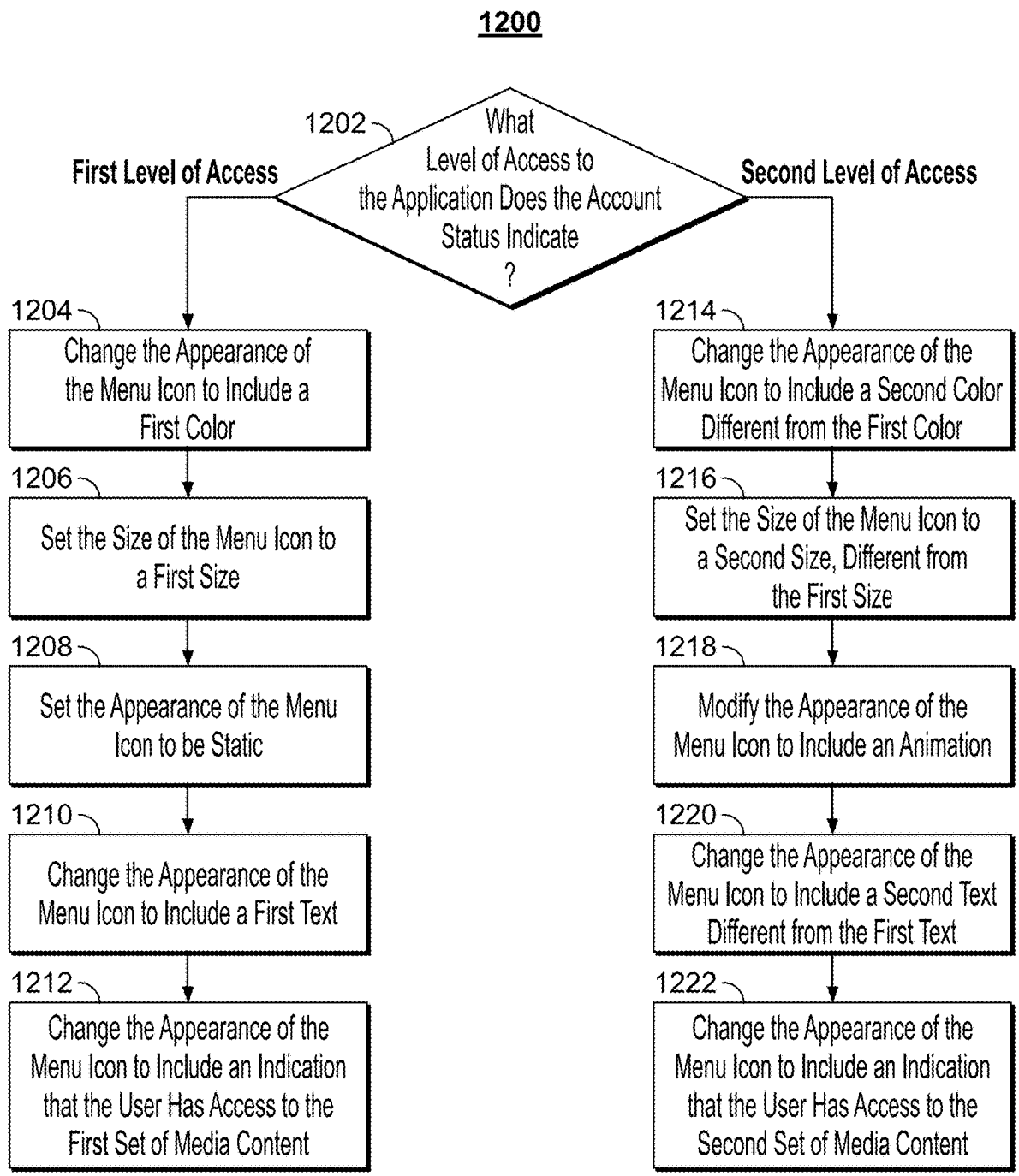
FIG. 12 depicts yet another illustrative flow diagram for a process of changing the appearance of a menu icon, in accordance with some embodiments of the disclosure.

FIG. 12 depicts yet another illustrative flow diagram for a process of changing the appearance of a menu icon, in accordance with some embodiments of the disclosure. Process 1200 may be executed by control circuitry 304, for example, in a manner instructed to control circuitry 304 by the media guidance application. In some embodiments, process 1200 is executed as a part of either block 1210 or 1214.

Process 1200 begins at 1202, where control circuitry 304 may determine what level of application the account status indicates. In some embodiments, steps 1204-1212 are performed in response to control circuitry 304 determining that the user has the first level of access (e.g., free subscription) to the first application (e.g., Netflix). In some embodiments, steps 1214-1222 are performed in response to control circuitry 304 determining that the user has the second level of access (e.g., premium subscription) to the first application (e.g., Netflix). In some embodiments, any of the steps 1204-1222 may be executed optionally, simultaneously, or consecutively.

At step 1204, control circuitry 304 may change the appearance of the menu icon to include a first color (e.g., blue). For example, the background or outline of the icon may be changed to include the first color. In some embodiments, some designs elements (e.g., text) of the menu icon may change to the first color.

At step 1206, control circuitry 304 may change the appearance of the menu icon by setting the size of the menu icon to a first size. For example, the first size may be a comparatively smaller size.

At step 1208, control circuitry 304 may change the appearance of the menu icon to be static. For example, the menu icon may be generated not to include any animations.

At step 1210, control circuitry 304 may change the appearance of the menu icon to include a first text. For example, the menu icon may be modified to include the text "free" or "free subscription."

At step 1212, control circuitry 304 may change the appearance of the menu icon to include an indication that the user has access to a first set of media content. For example, the menu icon may be modified to include the text "previews only."

At step 1214, control circuitry 304 may change the appearance of the menu icon to include a second color (e.g., yellow). For example, the background or outline of the icon may be changed to include the second color. In some embodiments, some designs elements (e.g., text) of the menu icon may change to the second color.

At step 1216, control circuitry 304 may change the appearance of the menu icon by setting the size of the menu icon to a second size. For example, the first size may be a comparatively larger size.

At step 1218, control circuitry 304 may change the appearance of the menu icon to include an animation. For example, menu icon may be generated to including moving or flashing elements.

At step 1220, control circuitry 304 may change the appearance of the menu icon to include a first text. For example, the menu icon may be modified to include the text "premium" or "premium subscription."

At step 1222, control circuitry 304 may change the appearance of the menu icon to include an indication that the user has access to a second set of media content (e.g., a set that is larger than the first set). For example, the menu icon may be modified to include the text "full library access."

The media guidance application may retrieve information associated with the remote controller associated with the user and the user equipment. The media guidance application may then determine the functionality of the remote controller based on the labels and functionality of each input of the remote controller (e.g., the number and labels of active buttons/inputs it has, as well as the remote controller's ability to detect voice commands). In some embodiments, the media guidance application may retrieve a threshold from the user profile, where the threshold corresponds to different functionalities of the remote controller.

In some embodiments, the media guidance application may determine the label and functionality of each input of the remote controller. In some embodiments, the media guidance application may determine the total number of programmable inputs (e.g., buttons) contained by the remote controller. In some embodiments, the media guidance application may compare this number to the threshold from the user profile to determine over functionality that the remote controller has (e.g., 0-5 inputs is determined to be limited functionality, 5-10 inputs is determined to be medium functionality, and 10+ inputs is determined to be high functionality). The media guidance application may select an appropriate user interface corresponding to the functionality determined by the comparison.

In some embodiments, the media guidance application may generate and display a user interface menu based on the selected user interface on the user equipment. In some embodiments, the media guidance application may simplify the selected user interface when there are fewer buttons on the remote controller than user interface elements on the selected user interface. In some embodiments, the media guidance application may make the selected user interface more complex when there are more buttons on the remote controller than user interface elements on the selected user interface. For example, the media guidance application may autofill text entries into areas of the selected user interface where text can be entered for remotes controllers with fewer buttons, but may not autofill text entries for remote controllers that contain more buttons (e.g., a functional keyboard). As another example, the media guidance application may simplify the selected user interface (e.g., by changing inputs from accepting text inputs to yes/no questions) based on fewer inputs being present on the remote controller. The media guidance application may remove a number of commands on a selected user interface (e.g., as depicted in FIG. 8 and FIG. 9) as the functionality of the remote controller becomes more limited.

As defined herein, "remote controller" refers to any kind of physical device or software application that a user uses to remotely issue commands to another physical device or software application. For example, "remote controller" may refer to a physical device that issues commands to an STB and/or a TV device via IR signal. In some embodiments, "remote controller: may refer to a remote controller application executed on a mobile phone that allows the user to issue commands to an STB and/or a DVR via a network.

As defined herein, "input" of a remote controller refers to any physical or software feature that may be used by the user to issue a specific command. In some embodiments, an input may refer to a button, a touch pad, a circular input, a toggle, a voice input element or any other device or part of a device usable to issue a command.

As defined herein, "user interface element" refers to any kind of a visual feature of a user interface (e.g., a menu) which may be interacted with by a user via an input of a remote controller. For example, a user interface element may refer to a visual display of a button, a toggle, a voice input field, a radio input field or any other visual feature that reacts to a command issued by a user.

Figure 13:
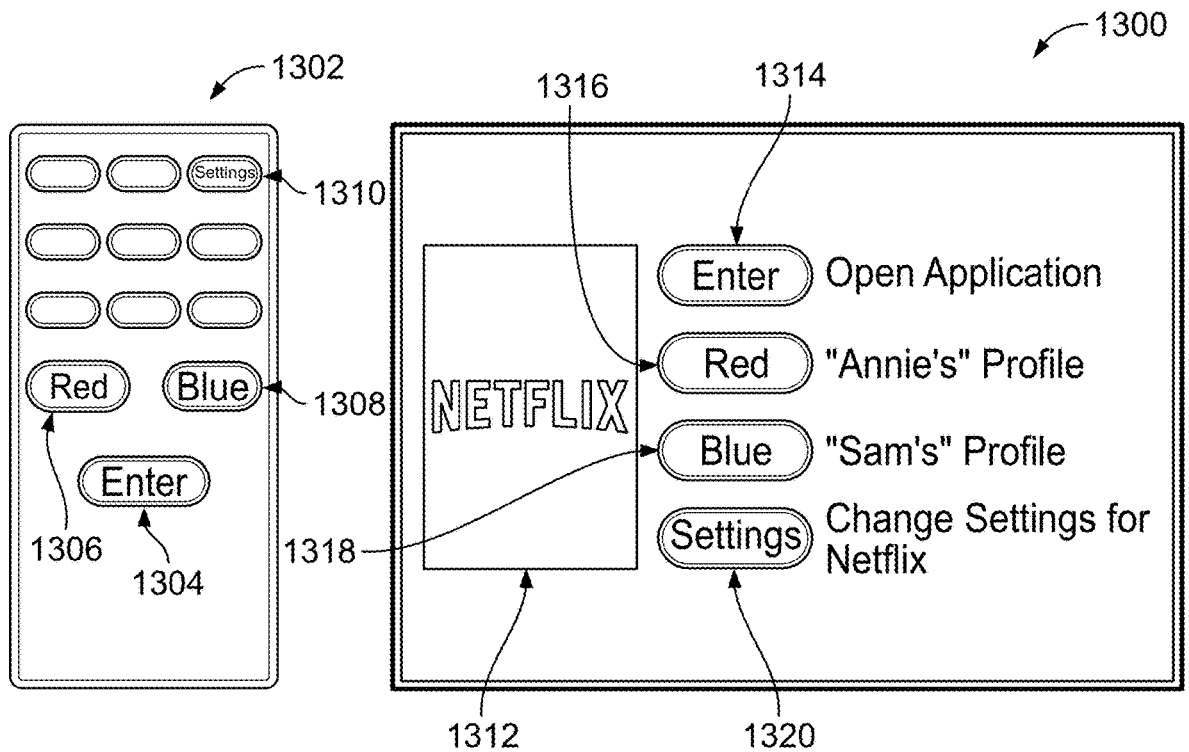
FIG. 13 shows an illustrative embodiment of a user interface chosen based on the functionality of the remote controller, in accordance with some embodiments of the disclosure.

FIG. 13 shows an illustrative embodiment of a user interface chosen based on the functionality of the remote controller, in accordance with some embodiments of the disclosure. In some embodiments, the media guidance application may select a user interface 1300 in response to determining that the functionality of remote controller 1302 is highly functional (e.g., remote 1302 has 10+ buttons). Remote controller 1302 has entered input 1304, red input 1306, blue input 1308, settings input 1310, among numerous other inputs. User interface 1300 may be displayed on a screen and represent an application menu (e.g., user interface menu of a Netflix application).

In some embodiments, the media guidance application may have selected user interface 1300 by analyzing functionalities and labels of inputs of remote controller 1302. In some embodiments, the media guidance application may have received this information from the remote controller 1302. For example, remote controller 1302 may have transmitted the following remote controller information, depicted by Table 1:

TABLE 1

| Input | Label | Functionality |
| --- | --- | --- |
| Button 1 | "Red" | Push Button |
| Button 2 | "Blue" | Push Button |
| Button 3 | "Enter" | Push Button |
| Button 4 | "Settings" | Push Button |

In some embodiments, after receiving the remote controller information, the media guidance application may select a user interface (that includes a plurality of user interface elements) such that at least one input of the remote controller (or all inputs of the remote controller) matches at least one element of that user interface. For example, the media guidance application may select user interface 1300 because it has the following user interface elements, depicted by Table 2:

TABLE 2

| User Interface Element | Label | Functionality |
| --- | --- | --- |
| User Interface Element 1 | "Red" | Push Button |
| User Interface Element 2 | "Blue" | Push Button |
| User Interface Element 3 | "Enter" | Push Button |
| User Interface Element 4 | "Settings" | Push Button |

For example, in this embodiments the media guidance application may have selected user interface 1300 because for each of the user interface elements in Table 2 there is at least one input depicted in Table 1 with matching label and functionality. For example, Button 1 matches User Interface Element 1, etc.

In some embodiments, user interface 1300 includes icon 1312 that identifies the application that is being controlled (e.g., Netflix) by the user interface 1300. In some embodiments, user interface 1300 includes user interface element 1314 that comprises a button labeled "Enter." In some embodiments, the media guidance application may assign "Open Application" functionality to user interface element 1314. In some embodiments, the media guidance application may place text "Open Application" next to user interface element 1314. In some embodiments, the media guidance application may associate user interface element 1314 with input 1304 of the remote 1302 based on the label and functionality of input 1304 matching the label and functionality of user interface element 1314. In some embodiments, when the user presses button 1304, the media guidance application may visually depict button 1314 being pressed and execute the functionality associated with user interface element 1314 (e.g., the media guidance application may open the Netflix application).

In some embodiments, the media guidance application may similarly associate interface element 1316 with input 1306, e.g., because they have matching label and functionality. In some embodiments, the media guidance application may assign option two (e.g., "Annie's Profile") to interface element 1316. In some embodiments, when the user presses button 1306, the media guidance application may visually depict button 1316 being pressed and execute the functionality associated with user interface element 1316 (e.g., the media guidance application may select Annie's profile).

In some embodiments, the media guidance application may similarly associate interface element 1318 with input 1308, e.g., because they have matching label and functionality. In some embodiments, the media guidance application may assign option three (e.g., "Sam's Profile") to interface element 1318. In some embodiments, when the user presses button 1308, the media guidance application may visually depict button 1318 being pressed and execute the functionality associated with user interface element 1318 (e.g., the media guidance application may select Sam's profile).

In some embodiments, the media guidance application may similarly associate interface element 1320 with input 1310, e.g., because they have matching label and functionality. In some embodiments, the media guidance application may assign option four (e.g., "Change Settings for Netflix") to interface element 1320. In some embodiments, when the user presses button 1310, the media guidance application may visually depict button 1320 being pressed and execute the functionality associated with user interface element 1317 (e.g., the media guidance application may open a menu for changing a Netflix setting).

Figure 14:
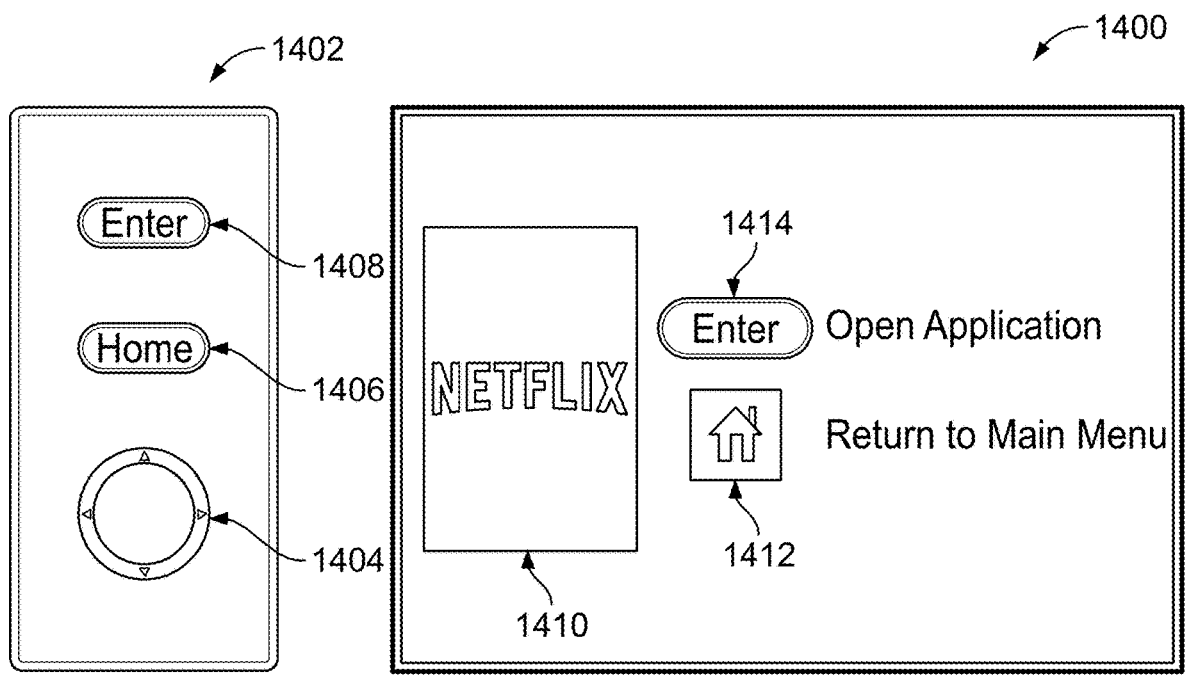
FIG. 14 shows an illustrative embodiment of a user interface chosen based on the functionality of the remote controller, in accordance with some embodiments of the disclosure.

FIG. 14 shows another illustrative embodiment of a user interface chosen based on the functionality of the remote controller, in accordance with some embodiments of the disclosure. In some embodiments, the media guidance application may select a user interface 1400 in response to determining that the functionality of remote controller 1402 has limited functionality (e.g., remote 1402 has fewer than five inputs). In some embodiments, remote controller 1402 has navigation input 1404, home input 1406, and enter input 1408, among potentially other inputs. User interface 1400 may be displayed on a screen and represent an application menu (e.g., user interface menu of a Netflix application). In some embodiments, user interface 1400 may be used to launch and/or control the same application as user interface 1300 of FIG. 13.

In some embodiments, the media guidance application may have selected user interface 1400 by analyzing functionalities and labels of inputs of remote controller 1402. In some embodiments, the media guidance application may have received this information from the remote controller 1402. For example, remote controller 1402 may have transmitted the following remote controller information, depicted by Table 3:

TABLE 3

| Input | Label | Functionality |
|---|---|---|
| Button 1 | "Enter" | Push Button |
| Button 2 | "Home" | Push Button |

TABLE 3-continued

| Input | Label | Functionality |
|---|---|---|
| Circular Navigation Input 1 | Directional Arrows | Circular Input |

In some embodiments, after receiving the remote controller information, the media guidance application may select a user interface (that includes a plurality of user interface elements) such that at least one input of the remote controller (or all inputs of the remote controller) match at least one element of that user interface. For example, the media guidance application may select user interface 1400 because it has the following user interface elements, depicted by Table 4:

TABLE 4

| User Interface Element | Label | Functionality |
|---|---|---|
| User Interface Element 1 | "Enter" | Push Button |
| User Interface Element 2 | Home graphical icon | Push Button |

For example, in this embodiment, the media guidance application may have selected user interface 1400 because for each of the user interface elements in Table 4 there is at least one input depicted in Table 3 there with matching label and functionality (e.g., Button 1 matches, User Interface Element 1, etc.)

In some embodiments, user interface 1400 includes icon 1410 that identifies the application that is being controlled (e.g., Netflix) by user interface 1400. In some embodiments, user interface 1400 includes user interface element 1414 that comprises a button labeled "Enter." In some embodiments, the media guidance application may assign "Open Application" functionality to user interface element 1414. In some embodiments, the media guidance application may place text "Open Application" next to user interface element 1414. In some embodiments, the media guidance application may associate user interface element 1414 with input 1408 of the remote 1402, based on the label and functionality of input 1408 matching the label and functionality of user interface element 1414. In some embodiments, when the user presses button 1408, the media guidance application may visually depict button 1414 being pressed and execute the functionality associated with user interface element 1414 (e.g., the media guidance application may open the Netflix application).

In some embodiments, the media guidance application may similarly associate interface element 1412 with input 1406, e.g., because they have matching label and functionality. In some embodiments, the media guidance application may assign option two (e.g., "Return to Main Menu") to interface element 1412. In some embodiments, when the user presses button 1406, the media guidance application may visually depict button 1412 being pressed and execute the functionality associated with user interface element 1412 (e.g., the media guidance application may exit to the main menu).

In some embodiments, user interface 1400 does not include functionalities that were available on user interface 1300. For example, user interface 1400 may lack options "Annie's profile," "Sam's profile," and "Change settings for Netflix" because remote controller 1402 (unlike remote controller 1302) lacks appropriate inputs that could be matched up with these functionalities.

As another example, the media guidance application may determine that a remote controller that has limited functionality needs to traverse through fewer screens to get to a menu location than a remote controller that has medium or high functionality. For instance, the media guidance application may determine that a medium or highly functional remote controller has to navigate through one screen to get to the Netflix homepage (e.g., select the Netflix icon on a main menu screen associated with a specified input on the remote controller (e.g., a Netflix button on the remote)), while a limited functional remote controller has to navigate through three screens to get to the Netflix homepage (e.g., selecting the applications menu from the main menu screen, selecting the Netflix application from the applications menu, and then selecting the "open application" button from the Netflix menu).

As another example, the media guidance application may generate a database that associates different application interfaces with different controller types, number of input buttons (as well their labels and functionalities), and voice command ability. The media guidance application may compare the remote controller currently in use with the database. The media guidance application may determine, from the comparison, an optimal user interface (e.g., an interface that matches with the remote controller) to be displayed as the menu.

Figure 15:
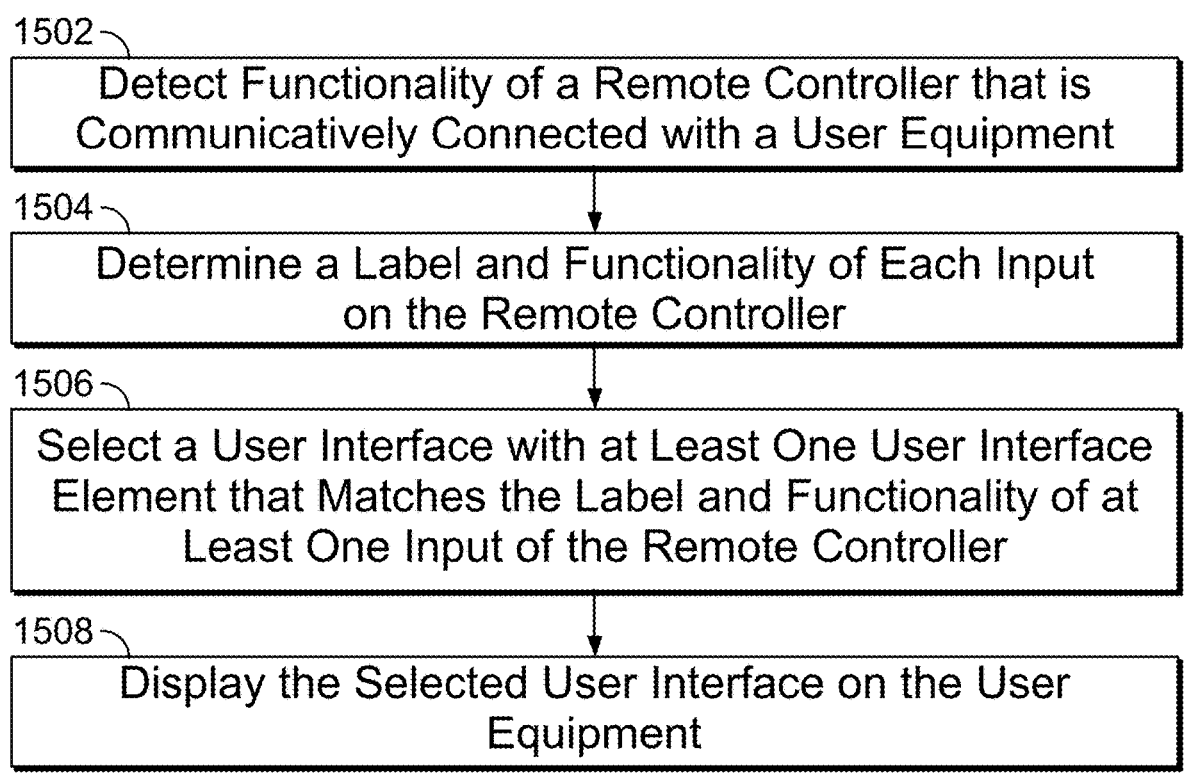
FIG. 15 depicts an illustrative flow diagram for a process of selecting a user interface, in accordance with some embodiments of the disclosure.

FIG. 15 depicts an illustrative flow diagram of a process 1500 for a process of selecting a user interface in accordance with an embodiment of the disclosure. Process 1500 may be executed by control circuitry 304 (e.g., in a manner instructed to control circuitry 304 by the media guidance application). Control circuitry 304 may be a part of user equipment (e.g., user television equipment 402, user computer equipment 404, and/or wireless communications device 406), or of a remote server separated from the user equipment by way of communications network 414.

Process 1500 begins at 1502, where control circuitry 304 detects functionality of a remote controller (e.g., remote controller 1302 or 1402) that is communicatively connected with user equipment (e.g., user television equipment 402). For example, control circuitry 304 may receive remote controller data directly from the remote controller (e.g., via IR signal or via communication network 414). In another embodiment, the user may enter the model number of the remote controller via user input interface 310, and control circuitry 304 may look up the remote controller data from a remote server (e.g., media guidance data source 418).

Process 1500 continues at 1504, where control circuitry 304 determines a label and functionality of each input on the remote controller. For example, control circuitry 304 may parse a table (e.g., Table 1 or Table 3) received from the remote controller. For example, control circuitry 304 may determine that the remote controller has "Button 1" labeled "Enter" and has a "Push button" functionality. In some embodiments, control circuitry 304 may also make a similar determination for every other input of the remote controller.

Process 1500 continues at 1506, where control circuitry 304 selects a user interface with at least one user interface element that matches the label and functionality of at least one input of the remote controller. In some embodiments, control circuitry 404 selects a user interface with at least one user interface element that matches the label and functionality of every input of the remote controller. For example, control circuitry 304 may have access to several user interfaces (e.g., user interface 1300 and user interface 1400). In some embodiments, each user interface may have an associated table (e.g., table 2, table 4 described above) that defines labels and functionalities of each user interface element of the associated user interface. For example, an exemplary user interface may have a table that defines "User Interface Element 1" that has a label "Enter" and functionality "Push Button." The table may also define other user interface elements.

In some embodiments, control circuitry 304 may select the user interface such that at least one user interface element matches the label and functionality of at least one input of the remote controller. For example, "Button 1" may be determined to match User Interface Element 1" because they have the same (or similar, or compatible) labels (e.g., "Enter" and "Enter") and the same (or similar, or compatible) functionalities (e.g., "Push Button.") In some embodiments, control circuitry 304 may select the user interface such that every user interface element matches the label and functionality of at least one input of the remote controller.

Process 1500 continues at 1508, where control circuitry 304 displays the selected user interface on the user equipment. For example, control circuitry 304 may display the selected user interface on user television equipment 402, user computer equipment 404 or display 312.

Figure 16:
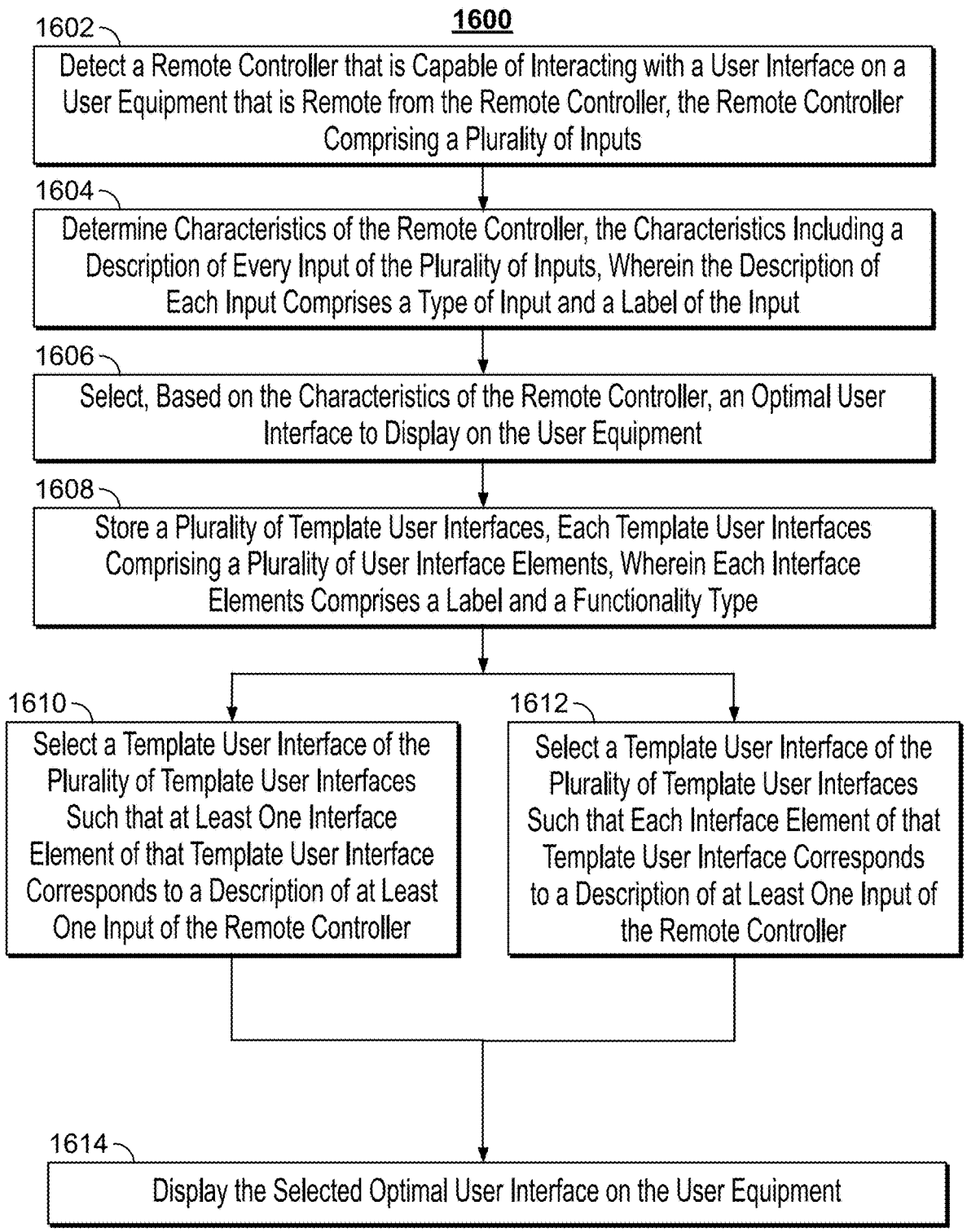
FIG. 16 depicts another illustrative flow diagram for a process of selecting a user interface, in accordance with some embodiments of the disclosure.

FIG. 16 depicts another illustrative flow diagram of a process 1600 for a process of selecting a user interface in accordance with an embodiment of the disclosure. Process 1600 may be executed by control circuitry 304 (e.g., in a manner instructed to control circuitry 304 by the media guidance application). Control circuitry 304 may be a part of user equipment (e.g., user television equipment 402, user computer equipment 404, and/or wireless communications device 406), or of a remote server separated from the user equipment by way of communications network 414.

Process 1600 begins at 1602, where control circuitry 304 detects a remote controller (e.g., remote controller 1302 or 1402) that is capable of interacting with a user interface on user equipment (e.g., user tv equipment 402) that is remote from the remote controller, the remote controller comprising a plurality of inputs. For example, control circuitry 304 may detect an identification signal from the remote controller. In some embodiments, control circuitry 304 detects the remote controller due to explicit input by the user.

Process 1600 continues at 1604, where control circuitry 304 determines characteristics of the remote controller. In some embodiments, the characteristics may include a description of every input of the plurality of inputs. In some embodiments, the description of each input may comprise a type of input and a label of the input. For example, when the remote controller is controller 1302 of FIG. 3, the type of input and a label of the input may be defined as described by table 1. For example, control circuitry 304 may determine that the remote controller has "button 1" labeled "enter" and having a "push button" functionality. In some embodiments, control circuitry 304 may also make a similar determination for every other input of the remote controller.

Process 1600 continues at 1606 where control circuitry 304 selects, based on the characteristics of the remote controller, an optimal user interface to display on the user equipment. In some embodiments, control circuitry 304 may select the user interface to maximally utilize the capabilities of the remote controller, yet avoid presenting options that the user is unable to select thus significantly improving user experience by providing the maximum amount of possible options and avoiding frustration of seeing options that are not selectable. In some embodiments, control circuitry 304 selects the optimal user interface by performing steps 1608-1614 as described below.

Process 1600 continues at 1608, where control circuitry 304 stores a plurality of template user interfaces, each template user interfaces comprising a plurality of user interface elements, wherein each interface element comprises a label and a functionality type. For example, each template user interface may define a layout of several user interface elements. For example, each template user interface may define absolute location of each user interface element. In another example, each template user interface may define relative locations of each user interface element with respect to each other, such that each template user interface may be scaled to different sizes of a display. In some embodiments, each template user interface may have an associated table (e.g., table 2, table 4 described above) that defines labels and functionalities of each user interface element of the associated user interface. For example, an exemplary template user interface may have a table that defines "User Interface Element 1" that has a label "Enter" and functionality "Push Button." In some embodiments, process 1600 may continue to either 1610 or to 1612.

At 1610, control circuitry 304 may select a template user interface of the plurality of template user interfaces such that at least one interface element of that template user interface corresponds to a description of at least one input of the remote controller. For example, "button 1" of the remote controller may be determined to match "User Interface Element 1" of a first template user interface because they have the same (or similar, or compatible) label (e.g., "Enter") and the same (or similar, or compatible) functionalities (e.g., "push button.") In some embodiments, control circuitry 304 may consequently select the first template user interface as the optimal user interface for the remote controller.

At 1612, control circuitry 304 may select a template user interface of the plurality of template user interfaces such that each interface element of that template user interface corresponds to a description of at least one input of the remote controller. For example, "button 1" of the remote controller may be determined to match "User Interface Element 1" of a first template user interface because they have the same (or similar, or compatible) label (e.g., "Enter") and the same (or similar, or compatible) functionalities (e.g., "push button.") In some embodiments, control circuitry 304 may similarly match each user interface element of the first template user interface to at least one input of the remote controller. In some embodiments, control circuitry 304 may consequently select the first template user interface as the optimal user interface for the remote controller.

In some embodiments, the at least one interface element may be found by control circuitry 304 to correspond to the description of the input when the label of the interface element matches the label of the input, and the type of the input is compatible with the functionality type of the interface element. For example, label "home" of an input may match the label "home" of the user input element. In some embodiments, the label "home" of an input may match labels of a user input element that are sufficiently similar. For example, the label "base menu" or a picture depicting a house may be determined to match the label "home". In some embodiments, the functionality "push button" of an input may match the functionality "push button" of the user input element. In some embodiments, the functionality "toggle" of an input may match the functionality "radio selection" of the user input element. In some embodiments, the functionality "circular touch pad" of an input may match the functionality "dial" of the user input element.

At 1614, control circuitry 304 may display the selected optimal user interface (e.g., user interface 1300 or 1400) on the user equipment (e.g., user TV equipment 402).

Figure 17:
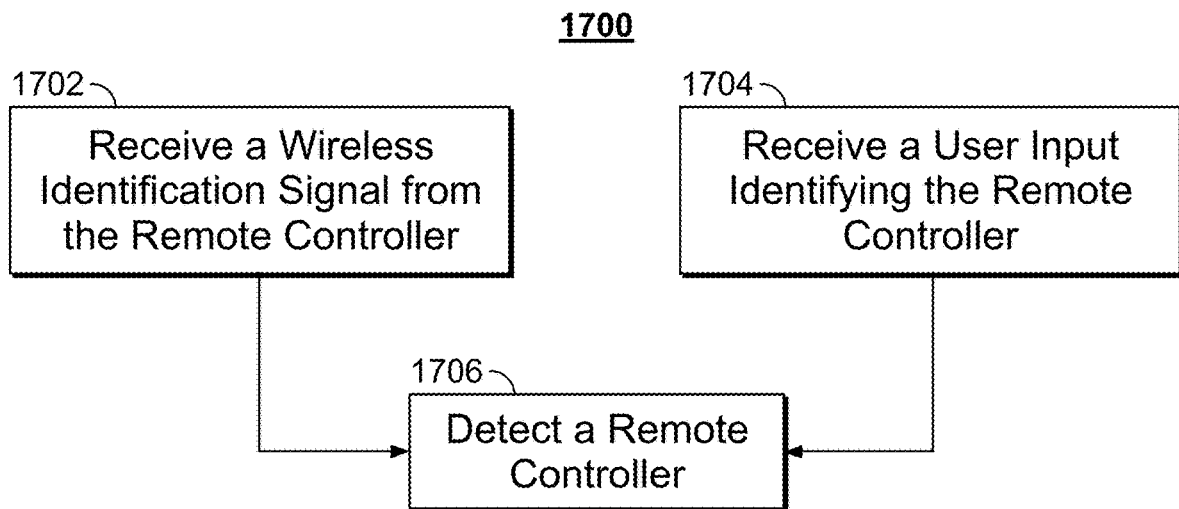
FIG. 17 depicts an illustrative flow diagram for a process of detecting a remote controller, in accordance with some embodiments of the disclosure.

FIG. 17 depicts an illustrative flow diagram of a process 1700 for a process of detecting a remote controller, in accordance with some embodiments of the disclosure. Process 1700 may be executed by control circuitry 304, for example, in a manner instructed to control circuitry 304 by the media guidance application. In some embodiments, process 1700 is executed as a part of block 1602. Process 1700 may begin at either 1702 or 1704. In some embodiments, these steps may be performed optionally, sequentially or simultaneously.

At 1702, control circuitry 304 may receive a wireless identification signal from the remote controller. For example, the remote controller may, via IR, transmit its model number (e.g., Samsung 4504). The remote controller may transmit the model number upon initial set up, periodically (e.g., every day), or aperiodically.

At 1704, control circuitry 304 may receive a user input identifying the remote controller. For example, the user may manually type in the remote controller's model number, e.g., via user input interface 310.

At 1706, control circuitry 304 may detect the remote controller. For example, the control circuitry 304 may detect the identification signal or user input signal and identify the controller using the local database stored on storage 308.

Figure 18:
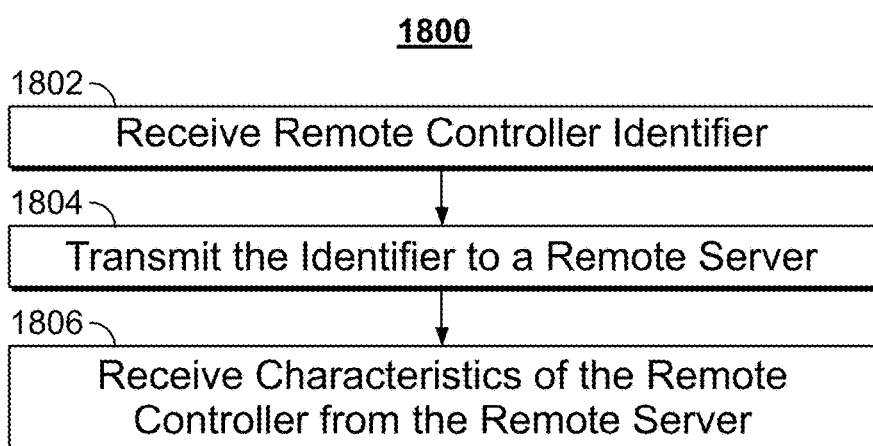
FIG. 18 depicts an illustrative flow diagram for a process of receiving a characteristic of a remote controller, in accordance with some embodiments of the disclosure.

FIG. 18 depicts an illustrative flow diagram of a process 1800 for a process of receiving characteristics of a remote controller, in accordance with some embodiments of the disclosure. Process 1800 may be executed by control circuitry 304, for example, in a manner instructed to control circuitry 304 by the media guidance application. In some embodiments, process 1800 is executed as a part of block 1604.

At 1802, control circuitry 304 may receive a remote controller identifier from the remote controller. For example, the remote controller may transmit, via IR signal or via a network, its model number (e.g., Samsung 4504).

At 1804, control circuitry 304 may transmit the identifier to a remote server. For example, control circuitry 304 may transmit the model number (e.g., Samsung 4504) via communication network 414 to a media guidance data source 418.

At 1806, control circuitry 304 may receive characteristics of the remote controller from the remote server. For example, media guidance data source 418 may, via communication network 414, send a table (e.g., Table 1 or Table 3) describing each input of the remote controller.

Figure 19:
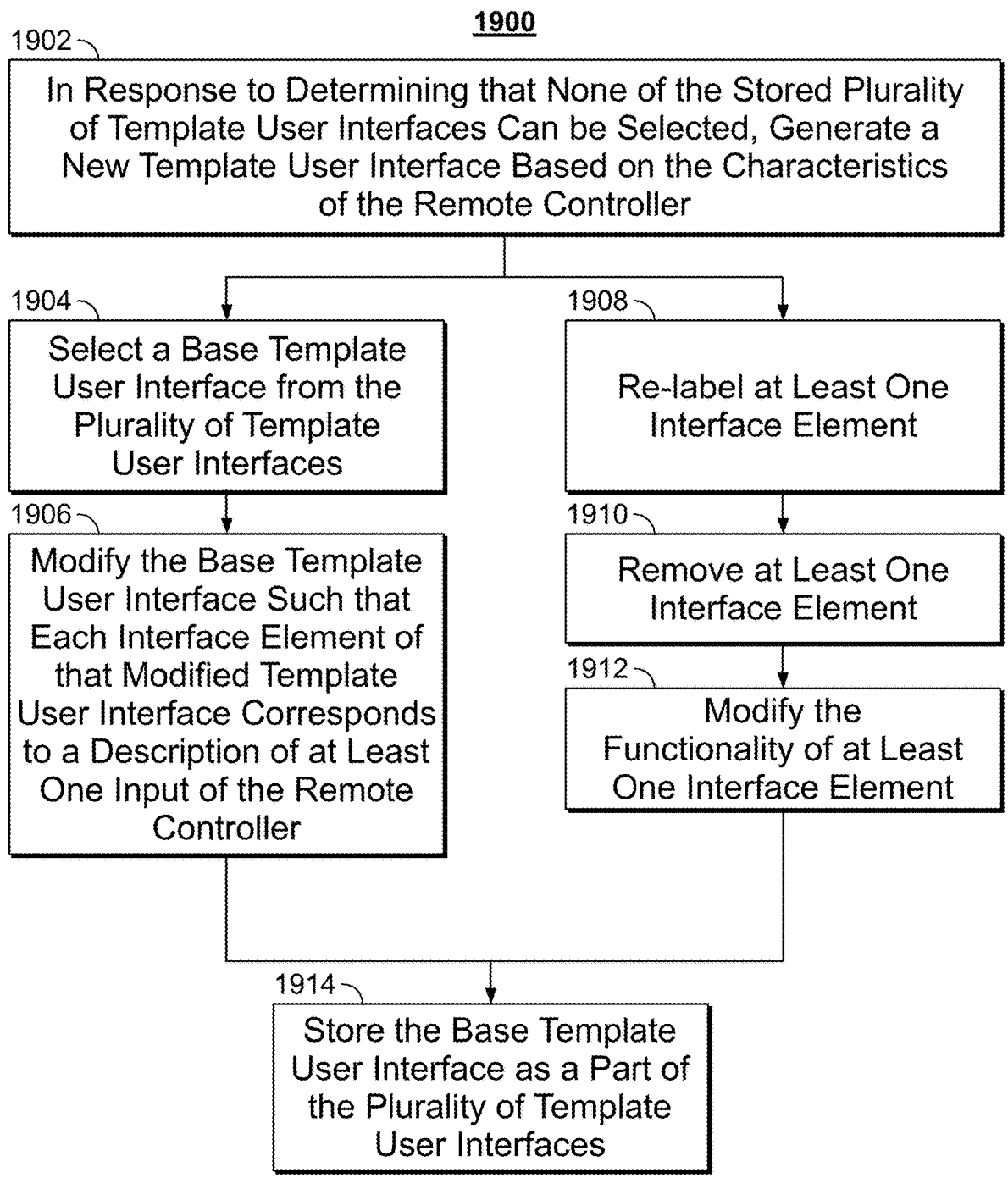
FIG. 19 depicts an illustrative flow diagram for a process of storing a new template user interface, in accordance with some embodiments of the disclosure.

FIG. 19 depicts an illustrative flow diagram of a process 1900 for a process of storing a new template user interface, in accordance with some embodiments of the disclosure. Process 1900 may be executed by control circuitry 304, for example, in a manner instructed to control circuitry 304 by the media guidance application. In some embodiments, process 1900 is executed as a part of block 1606.

Process 1902 begins at 1902, wherein control circuitry 304, in response to determining that none of the stored plurality of template user interfaces can be selected, generates a new template user interface based on the characteristics of the remote controller.

For example, control circuitry 304 may determine that all of the stored template user interfaces have user interface elements that cannot be matches to at least one input of the remote controller. For example, each of the stored template user interfaces may have a user interface element that is a push button labeled "home," while the remote controller has no button labeled, "home." In some embodiments, control circuitry 304 may then modify one of the template user interfaces such that each interface element of that modified template user interface corresponds to a description of at least one input of the remote controller. For example, control circuitry 304 may generate a new template user interface by performing steps 1904-1906, or any one of the steps 1908, 1910, and 1912. In some embodiments, these steps may be performed optionally, sequentially or simultaneously.

At 1904, control circuitry 304 may select a base template user interface from the plurality of template user interfaces. For example, control circuitry 304 may select a template that is the closest to the optimal user interface. For example, control circuitry 304 may select a user interface template that has the fewest user interface elements that cannot be matched to at least one input of the remote controller.

At 1906, control circuitry 304 may modify the base template user interface such that each interface element of that modified template user interface corresponds to a description of at least one input of the remote controller. For example, control circuitry 304 may do so by performing either one of steps 1908, 1910, or 1912.

At 1908, control circuitry 304 may relabel at least one interface element. For example, base user interfaces may have a user interface element that is a push button labeled "home," while the remote controller has no button labeled "home." On the other hand, the remote controller has no button labeled "return." In some embodiments, control circuitry 304 may then relabel the user interface element that was labeled "home" to be labeled "return."

At 1910, control circuitry 304 may remove at least one interface element. For example, base user interfaces may have a user interface element that is a push button labeled "home," while the remote controller has no button labeled, "home." In some embodiments, control circuitry 304 may then remove the user interface element that was labeled "home" from the base user interface.

At 1912, control circuitry 304 may modify functionality of at least one interface element. For example, base user interfaces may have a user interface element that is a push button labeled "home," while the remote controller has no button labeled "home." On the other hand, the remote controller may have a voice input capability. In some embodiments, control circuitry 304 may then modify the user interface element (a push button that was labeled "home") to be an audio response element labeled "say home, to enable the user to return to home menu.

At 1914, control circuitry 304 may store the base template user interface as a part of the plurality of template user interfaces. For example, control circuitry 304 may store the base template user interface on storage 308.

Figure 20:
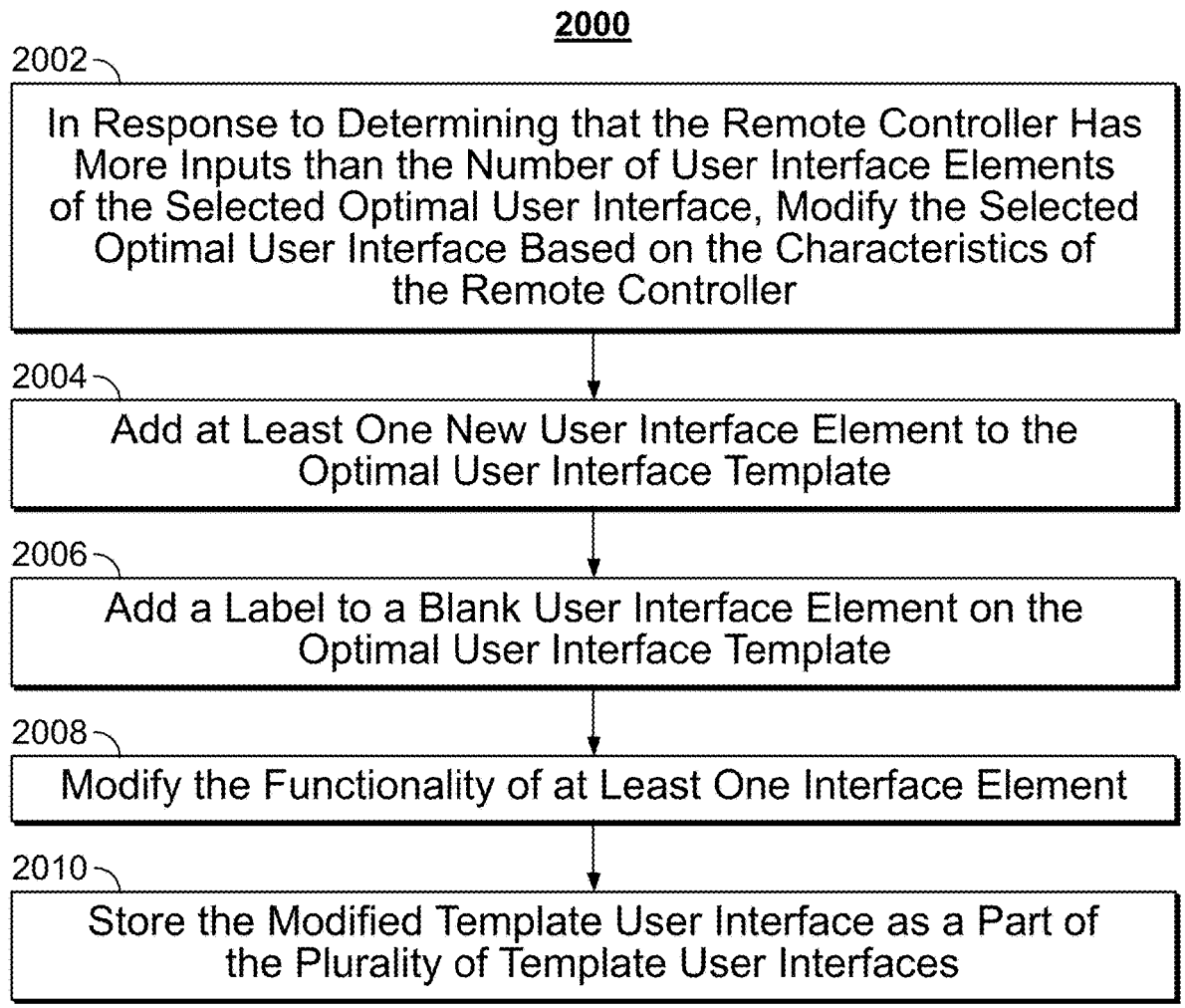
FIG. 20 depicts another illustrative flow diagram for a process of storing a new template user interface, in accordance with some embodiments of the disclosure.

FIG. 20 depicts an illustrative flow diagram of a process 1900 for a process of storing a new template user interface, in accordance with some embodiments of the disclosure. Process 2000 may be executed by control circuitry 304, for example, in a manner instructed to control circuitry 304 by the media guidance application. In some embodiments, process 2000 is executed as a part of block 1606.

Process 2000 begins at 2002, wherein control circuitry 304 may, in response to determining that the remote controller has more inputs than the number of user interface elements of the selected optimal user interface, modify the selected optimal user interface based on the characteristics of the remote controller. For example, control circuitry 304 may determine that the remote controller has inputs that do not correspond to at least one user interface element of the optimal user interface. For example, the remote controller may have a button labeled "home," while optimal user interface has no user interface element labeled "home." In some embodiments, control circuitry 304 may then modify the selected optimal user interface based on the characteristics of the remote controller. For example, control circuitry 304 may do so by performing any of the steps 2004-2008. In some embodiments, these steps may be performed optionally, sequentially or simultaneously.

At 2004, control circuitry 304 may add at least one new user interface element to the optimal user interface. For example, the remote controller may have a button labeled "home," while the optimal user interface has no user interface element label "home." In some embodiments, control circuitry 304 may then add a button to the optimal user interface with a label "home."

At 2006, control circuitry 304 may add a label to a blank user interface element. For example, the remote controller may have a button labeled "home," while the optimal user interface has no user interface element labeled, "home." In some embodiments, the optimal user interface may deliberately have some user interface elements that are left blank. In some embodiments, control circuitry 304 may then add a "home" label to one of such user interface elements that are left blank.

At 2008, control circuitry 304 may modify functionality of at least one interface element. For example, the remote controller may have a circular volume control, while the optimal user interface has two push buttons labeled "volume up" and "volume down." In some embodiments, control circuitry 304 may modify the functionality of the push buttons labeled "volume up" and "volume down" to be a dial that visually turns in response to the user operating the circular volume control.

At 2010, control circuitry 304 may store the modified template user interface as a part of the plurality of template user interfaces. For example, control circuitry 304 may store the base template user interface on storage 308.

In some embodiments, the media guidance application may schedule for recording only episodes of the relevant season that follow the last episode watched by the user. In some embodiments, the media guidance application may avoid scheduling for recording episodes of a season that precede the relevant season, or follow the relevant season. For example, if the user has most recently watched Season 3, Episode 4 of the "Game of Thrones" series, Season 3 may be determined to be the relevant season. In this example, the media guidance application may schedule for recording any available "Game of Thrones" episodes from season 3, but not from any seasons that precede or follow season 3 (e.g., season 1, 2, and 4-6). In some embodiments, the media guidance application may, additionally, only schedule episodes of season that follow season 3, episode 4. In some embodiments, the media guidance application may notify the user when the season recording is complete. This technique provides an improvement to the technical field of video recording, by saving space on a DVR by not selecting episodes that are not currently relevant to the user.

As referred to herein, the term "series" or "media asset series" refers to any kind of media (e.g., video, audio, or multimedia) content that includes distinct sequential episodes that may be watched separately from one another. For example, the television series "Game of Thrones" may include sequential episodes "Episode 1," "Episode 2," . . . "Episode 7." A series may be intended to be provided in a sequential order according to episode numbering via a television, a computer, or any other user device. In some embodiments, e.g., when the series are in syndication, the series may be provided in any order.

As referred to herein, the term "episode" refers to any kind of media (e.g., video, audio, or multimedia) content that forms a distinct part of a series. Each episode can be watched separately from other episodes of the series. Episodes may be typically arranged sequentially by number such that content of one episode follows content of a previous episode.

Figure 21:
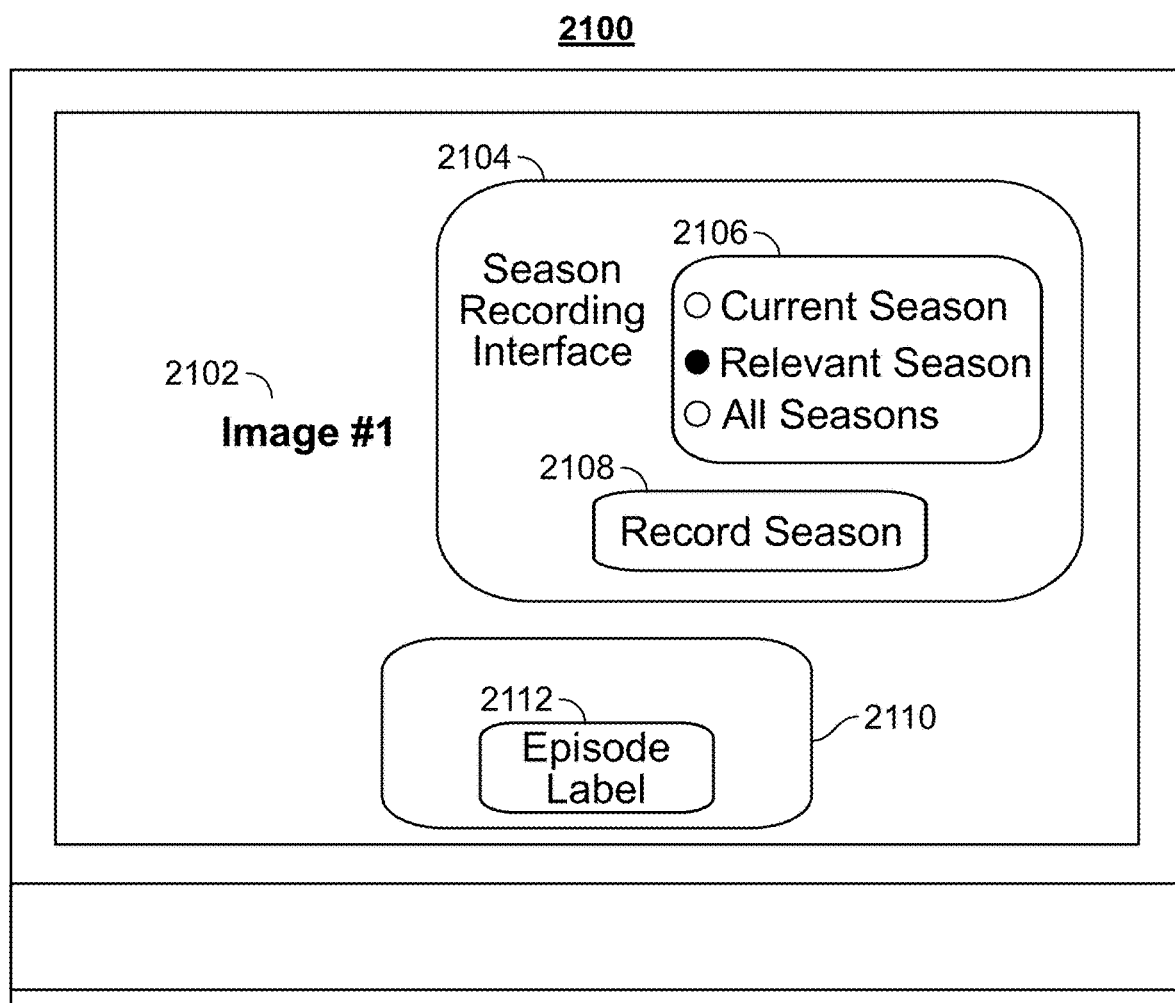
FIG. 21 shows another illustrative embodiment of a display screen that may be used to provide media guidance application listings, in accordance with some embodiments of the disclosure.

FIG. 21 shows an illustrative media guidance interface on a display screen that may provide improved functionality for resuming a relevant season of a series in accordance with various embodiments of the disclosure. Display 2100 shows a media guidance interface for video presentation and an interface for scheduling a season recording. In some embodiments, display 2100 may display media content provided by the media guidance application. For example, display 2100 may display image 2102. Image 2102 may be a part of media content provided by the media guidance application. In some embodiments, media content provided by the media guidance application includes a series that contains a plurality of sequential episodes.

In some embodiments, display 2100 may include current episode user interface UI element 2110. In some embodiments, current episode UI element 2110 may indicate an episode (Season 3, Episode 4) of the series (e.g., the "Game of Thrones" series) that is currently selected by the user. In some embodiments, current episode UI element 2110 may include episode label 2112. For example, episode label 2112 may visually indicate the currently selected episodes. For example, episode label 2112 may include the text "Game of Thrones, Season 3, Episode 4." In some embodiments, the media guidance application may assume that the currently selected episode is the last episodes of the series that was watched by the user. In some embodiments, the media guidance application may maintain a file that tracks all episodes ever watched by the user to determine the last episode of the series that was watched by the user.

In some embodiments, display 2100 may include season recording interface 2104. For example, season recording interface 2104 may be displayed in response to a user clicking a "record" button on a remote controller. In some embodiments, season recording interface 2104 may include radio selection interface 2106 that allows the user to select one of the season recording options. For example, radio selection interface 2106 may allow the user to select between "current season," "relevant season," and "all seasons" options. In some embodiments, the user may confirm the selection by clicking "record season" button 2108, that is displayed on display 2100

In some embodiments, if the "current season" option was chosen, the media guidance application may schedule for recording the most recent season of the series. For example, if the series is the "Game of Thrones" series that includes six seasons, the media guidance application may schedule for recording all episodes of season 6 (which is the most recent season).

In some embodiments, if the "all seasons" option was chosen, the media guidance application may schedule for recording all seasons of the series. For example, if the series is the "Game of Thrones" series that includes six seasons, the media guidance application may schedule for recording all episodes of all six seasons.

In some embodiments, if the "relevant season" option was chosen, the media guidance application may schedule for recording the only the relevant season of the series. For example, if the series is the "Game of Thrones" series that includes six seasons, the media guidance application may determine what was the latest episode of the "Game of Thrones" series that was watched by the user to determine which season is relevant. For example, if the user last watched season 3, episode 4, the media guidance application may determine that Season 3 is the relevant season. In some embodiments, the media guidance application may then schedule for recording all episodes of season 3 (even if seasons 4-6 are seasons that follow season 3.) That is, episodes of seasons 4-6 of the "Game of Thrones" series are not scheduled for recording. In some embodiments, the media guidance application may additionally, schedule for recording only episodes of the relevant season (e.g., season 3) that follow the last episode watched by the user (e.g., episode 4 of season 3).

Figure 22:
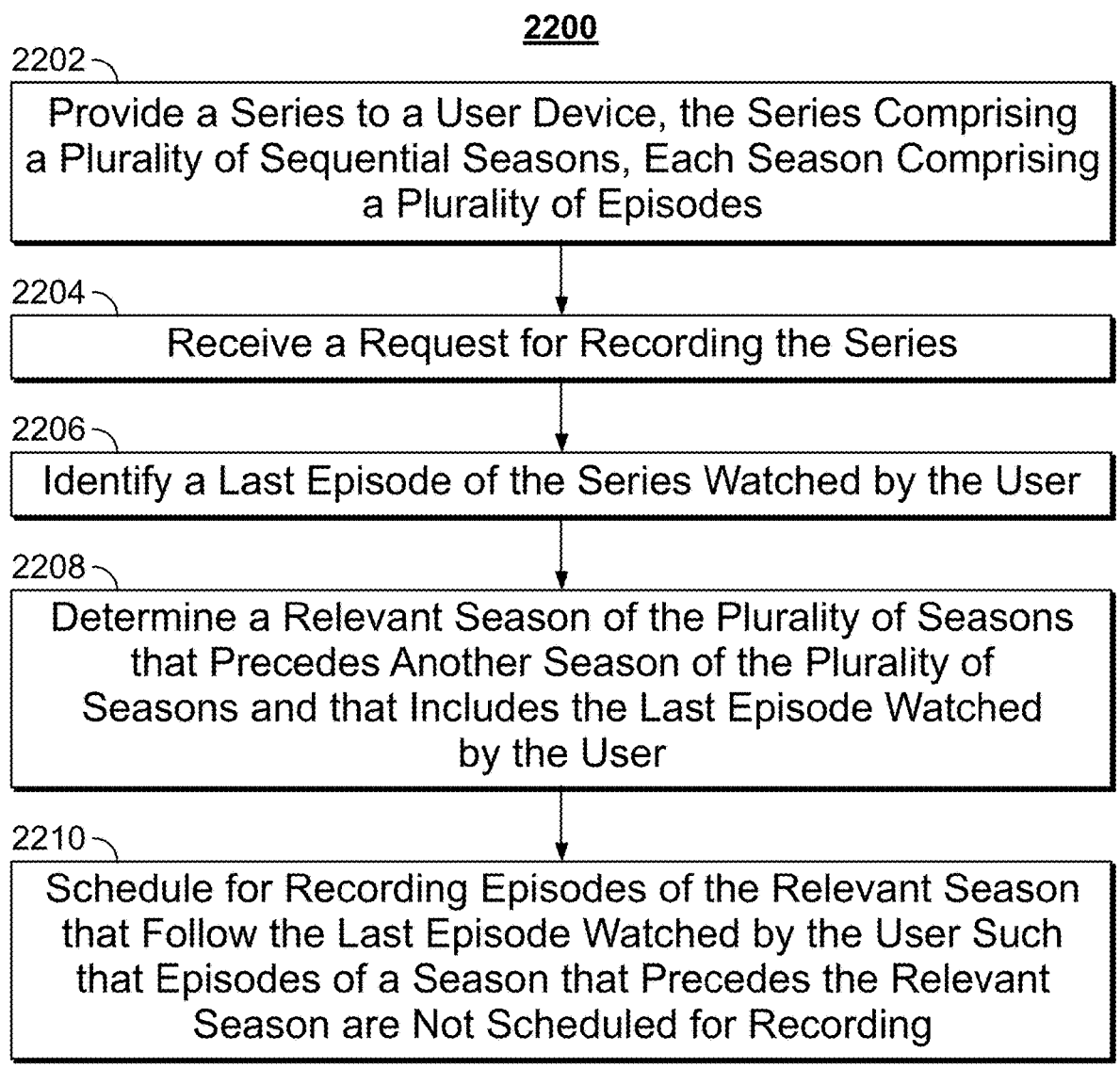
FIG. 22 depicts an illustrative flow diagram for a process of scheduling a season recording, in accordance with some embodiments of the disclosure.

FIG. 22 depicts an illustrative flow diagram of a process 2200 for scheduling a season recording, in accordance with an embodiment of the disclosure. Process 2200 may be executed by control circuitry 304 (e.g., in a manner instructed to control circuitry 304 by the media guidance application). Control circuitry 304 may be a part of user equipment (e.g., user television equipment 402, user computer equipment 404, and/or wireless communications device 406), or of a remote server separated from the user equipment by way of communications network 414.

Process 2200 begins at 2202, where control circuitry 304 provides a series (e.g., the "Game of Thrones" series) to a user device, the series comprising a plurality of sequential seasons, each season comprising a plurality of episodes. For example, control circuitry 304 may make the series (or any portion of the series) available for viewing on user equipment (e.g., user television equipment 402 or user computer equipment 404). For example, control circuitry 304 may provide episodes of the series via a broadcast signal in an order defined by a TV schedule, or via a network (in any order) in response to user requests.

Process 2200 continues at 2204, where control circuitry 304 receives a request for recording the series. For example, a user may request recording of the relevant season of the series via season recording interface 2104 of FIG. 21.

Process 2200 continues at 2206, where control circuitry 304 identifies a last episode of the series watched by the user. For example, control circuitry 304 may maintain a file (e.g., on storage 308) where every episode ever watched by the user is recorded. In some embodiments, control circuitry 304 may then select the highest-number episode identified by the file. In some embodiments, control circuitry 304 may, instead, assume that an episode of the series that is currently selected by the user is the episode that was watched last. For example, control circuitry 304 may determine that an episode identified by episode label 2112 of FIG. 21 is the episode that was watched last. For example, if episode label 2112 contains text "Game of Thrones, Season 3, Episode 4," the control circuitry 304 may determine that Season 3, Episode 4 is the last watched episode of the "Game of Thrones" series.

Process 2200 continues at 2208, where control circuitry 304 determines a relevant season of the plurality of seasons that precedes another season of the plurality of seasons and that includes the last episode watched by the user. For example, the series may be the "Game of Thrones" series that includes six seasons, while Season 3, Episode 4 is the last watched episode of the "Game of Thrones" series. In this example, control circuitry 304 may determine that Season 3

(a season that precedes seasons 4-6) is the relevant season, because it includes the episode the last episode watched by the user.

Process 2200 continues at 2210, where control circuitry 304 schedules for recording episodes of the relevant season (e.g., season 3 of the "Game of Thrones" series) that follow the last episode watched by the user (e.g., Season 3, Episode 4) such that episodes of a season that precedes the relevant season are not scheduled for recording. In some embodiments, episodes of seasons that precede the relevant season (e.g., seasons 1 and 2) are not scheduled for recording. In some embodiments, episodes of seasons that follow the relevant season (e.g., seasons 4-6) are also not scheduled for recording.

Figure 23:
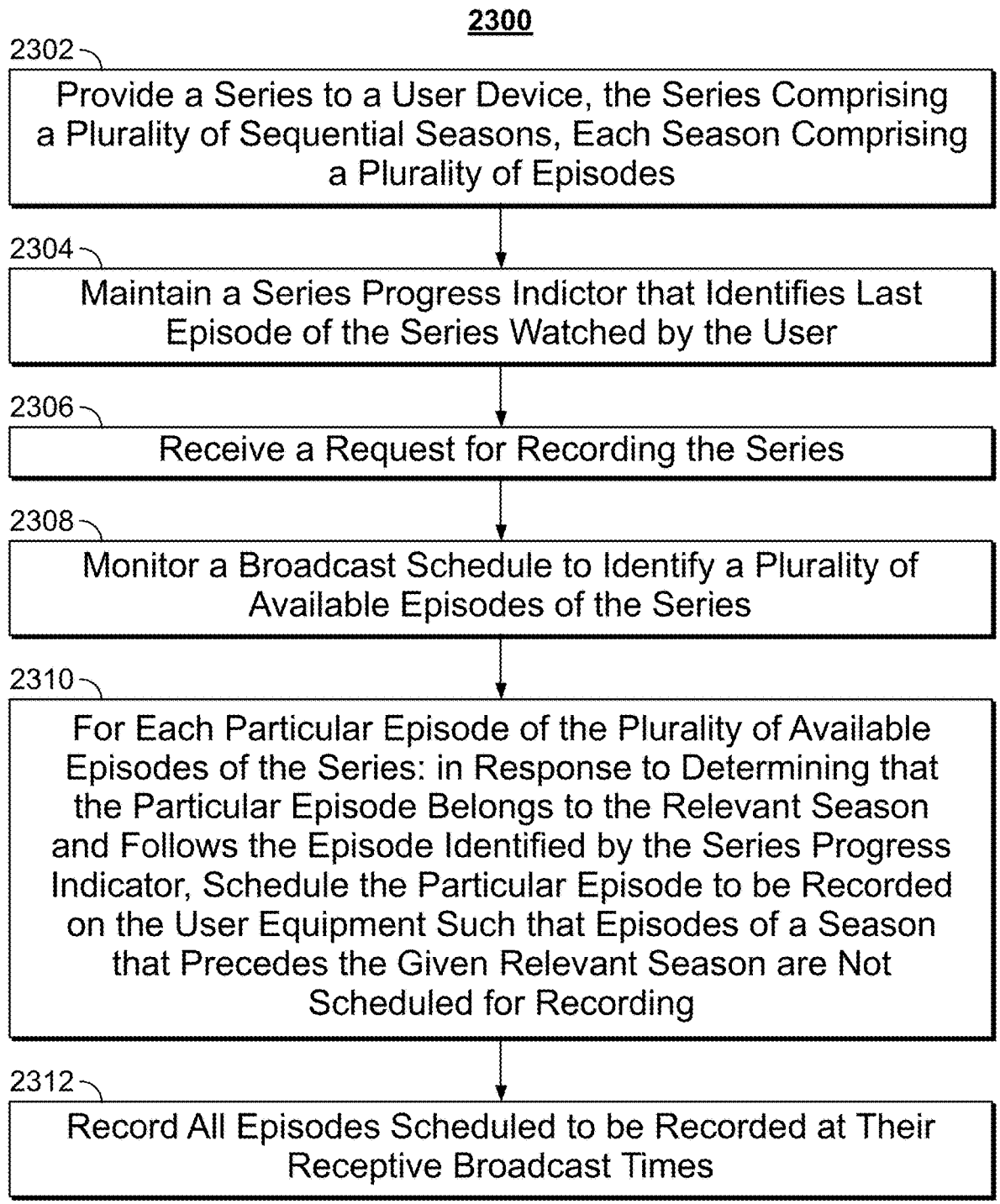
FIG. 23 depicts another illustrative flow diagram for a process of scheduling a season recording, in accordance with some embodiments of the disclosure.

FIG. 23 depicts an illustrative flow diagram of a process 2300 for scheduling a season recording, in accordance with an embodiment of the disclosure. Process 2300 may be executed by control circuitry 304 (e.g., in a manner instructed to control circuitry 304 by the media guidance application). Control circuitry 304 may be a part of user equipment (e.g., user television equipment 402, user computer equipment 404, and/or wireless communications device 406), or of a remote server separated from the user equipment by way of communications network 414.

Process 2300 begins at 2302, where control circuitry 304 provides a series (e.g., the "Game of Thrones" series) to a user device, the series comprising a plurality of sequential seasons, each season comprising a plurality of episodes. For example, control circuitry 304 may make the series (or any portion of the series) available for viewing on user equipment (e.g., user television equipment 402 or user computer equipment 404). For example, control circuitry 304 may provide episodes of the series via broadcast in an order defined by a TV schedule, or via a network in response to user requests.

Process 2300 continues at 2304, where control circuitry 304 maintains a series progress indicator that identifies the last episode of the series watched by the user. For example, control circuitry 304 may maintain a file (e.g., on storage 308) where every episode ever watched by the user is recorded. In some embodiments, control circuitry 304 may then set the series progress indicator to the highest number episode stored by the file. In some embodiments, control circuitry 304 may, instead, set the series progress indicator to indicate an episode of the series that is currently selected by the user is the episode that was watched last. For example, control circuitry 304 may determine that an episode identified by episode label 2112 is the episode that was watched last. For example, if episode label 2112 contains text "Game of Thrones, Season 3, Episode 4," the control circuitry 304 may determine that Season 3, Episode 4 is the last watched episode of the "Game of Thrones" series. In some embodiments, control circuitry 304 may then set the series progress indicator to Season 3, Episode 4.

Process 2300 continues at 2306, where control circuitry 304 receives a request for recording the series. For example, a user may request recording of the relevant season of the series via season recording interface 2104 of FIG. 21. For example, the user may explicitly select an option to record the relevant season as shown on FIG. 21. In some embodiments, the user may explicitly select an option to record the relevant season among other options, such as an option to record the current season, and an option to record all seasons.

In some embodiments, in response to receiving a request for recording the series, control circuitry 304 may determine a relevant season of the plurality of seasons that precedes another season of the plurality of seasons and that includes the episode identified by the series progress indicator. For example, the series may be the "Game of Thrones" series that includes six seasons, while Season 3, Episode 4 is the episode of the "Game of Thrones" series that is identified by the series progress indicator. In this example, control circuitry 304 may determine that Season 3 (a season that precedes seasons 4-6) is the relevant season, because it includes the episode identified by the series progress indicator. In this example, season 3 may be selected as the relevant season, even though season 3 precedes seasons 4-6.

Process 2300 continues at 2308, where control circuitry 304 may monitor a broadcast schedule to identify a plurality of available episodes of the series. For example, control circuitry 304 may receive the broadcast schedule from media guidance data source 418. For example, the broadcast schedule may identify a plurality of episodes, titles of those episodes, season and number information for each episode, broadcast times, and broadcast channel. For example, the broadcast schedule may include information that Season 3, Episode 5 of the "Game of Thrones" series is scheduled for broadcast on Nov. 21, 2017 at 3:00 PM on channel 112. In some embodiments, control circuitry 304 may identify, in the broadcast schedule, each episode of the series that is scheduled for broadcast. In some embodiments, control circuitry 304 may monitor a broadcast schedule by accessing a user profile to determine if the user has a subscription that allows for recording of a plurality of available episodes of the series. For example, if the user is not authorized to view channel 112, that episode may be excluded from consideration by control circuitry 304.

Process 2300 continues at 2310, where control circuitry 304 may, for each particular episode of the plurality of available episodes of the series, determine that the particular episode belongs to the relevant season and follows the episode identified by the series progress indicator. For example, if the relevant season is Season 3, and the episode identified by the series progress indicator is Season 3, Episode 4, control circuitry 304 may determine if the particular episode belongs to Season 3 and follows the episode identified by the series progress indicator (e.g., has an episode number that is higher than 4.) In some embodiments, control circuitry 304 may then (if the determination succeeds) schedule the particular episode to be recorded on the user equipment (e.g., on a DVR) such that episodes of a season that precedes the relevant season are not scheduled for recording. That is, none of the episodes of Seasons 1-2 may be scheduled for recording. In some embodiments, episodes of a season that follow the relevant season are also not scheduled for recording. That is, none of the episodes of Seasons 4-6 may be scheduled for recording.

Process 2300 continues at 2312, where control circuitry 304 may record all episodes scheduled to be recorded at their respective broadcast times. For example, Season 3, Episode 5 of the "Game of Thrones" series may have been scheduled for recording, and it was scheduled for broadcast on Nov. 21, 2017 at 3:00 PM on channel 112. In this example, control circuitry 304 may record Season 3, Episode 5 by tuning to channel 112 on Nov. 21, 2017 at 3:00 PM and recording the content that is being broadcast over that channel.

In some embodiments, control circuitry 304 may monitor which episodes are being recorded. In some embodiments, control circuitry 304 may, in response to determining that all episodes of the relevant season that follow the episode identified by the series progress indicator are recorded, provide a completion notification to the user. For example, if all episodes of Season 3 that follow episode 4 (e.g., episodes 5-10) are recorded, control circuitry 304 may display a notification (e.g., on display 2100) that has the text "season 3 of Game of Thrones is fully recorded."

In some embodiments, control circuitry 304 may determine (e.g., based on the broadcast schedule) that at least one episode of the relevant series that follows the episode identified by the series progress indicator is not available for recording. For example, Season 3, Episode 5 may be missing from the broadcast schedule. In some embodiments, in response, control circuitry 304 may determine that the at least one episode of the relevant series is available for over-the-top (OTT) streaming. For example, control circuitry 304 may determine that Season 3, Episode 5 is available for streaming on Netflix. In some embodiments, control circuitry 304 may then provide a notification to the user, the notification comprising a hyperlink for streaming the at least one episode of the relevant series via at least one OTT streaming service. For example, control circuitry 304 may display a notification (e.g., on display 2100) that has text "Season 3, Episode 5 of Game of Thrones is available on Netflix." The notification may also include a hyperlink for streaming Season 3, Episode 5 of "Game of Thrones" series on Netflix. In some embodiments, control circuitry 304 may access a user profile to determine if the user has a subscription to the at least one OTT streaming service (e.g., Netflix). In some embodiments, the notification is displayed only if the user has the relevant subscription.

The user may use a media guidance application to launch other third-party applications. These third-party applications can be launched in a menu of the media guidance application. As defined herein, "third party applications" are any applications developed by or sold by an entity other than the original vendor of the media guidance application. The menu of the media guidance application is a display that allows the user to navigate to different types of content, settings, applications, and other features. The menu is user customizable because it may only feature certain user selectable applications. The media guidance application may generate and display the menu on the user equipment. The media guidance application may generate applications to be displayed in the menu on the user equipment based on user preferences as well as default settings (e.g., certain applications are preinstalled on every user's main menu). The media guidance application may receive an input from the user to access the applications using some means to navigate and select an application. For example, the media guidance application may receive input from the user using input buttons on a remote control to navigate the menu. As another example, the media guidance application may receive a voice command from a user to navigate the menu. An example implementation of the menu may be seen in FIGS. 12-15.

The user may customize the menu by ranking or categorizing the applications to allow for the applications to be automatically selected for inclusion/exclusion from the menu based on how the user ranks/categorizes the applications.

Figure 27:
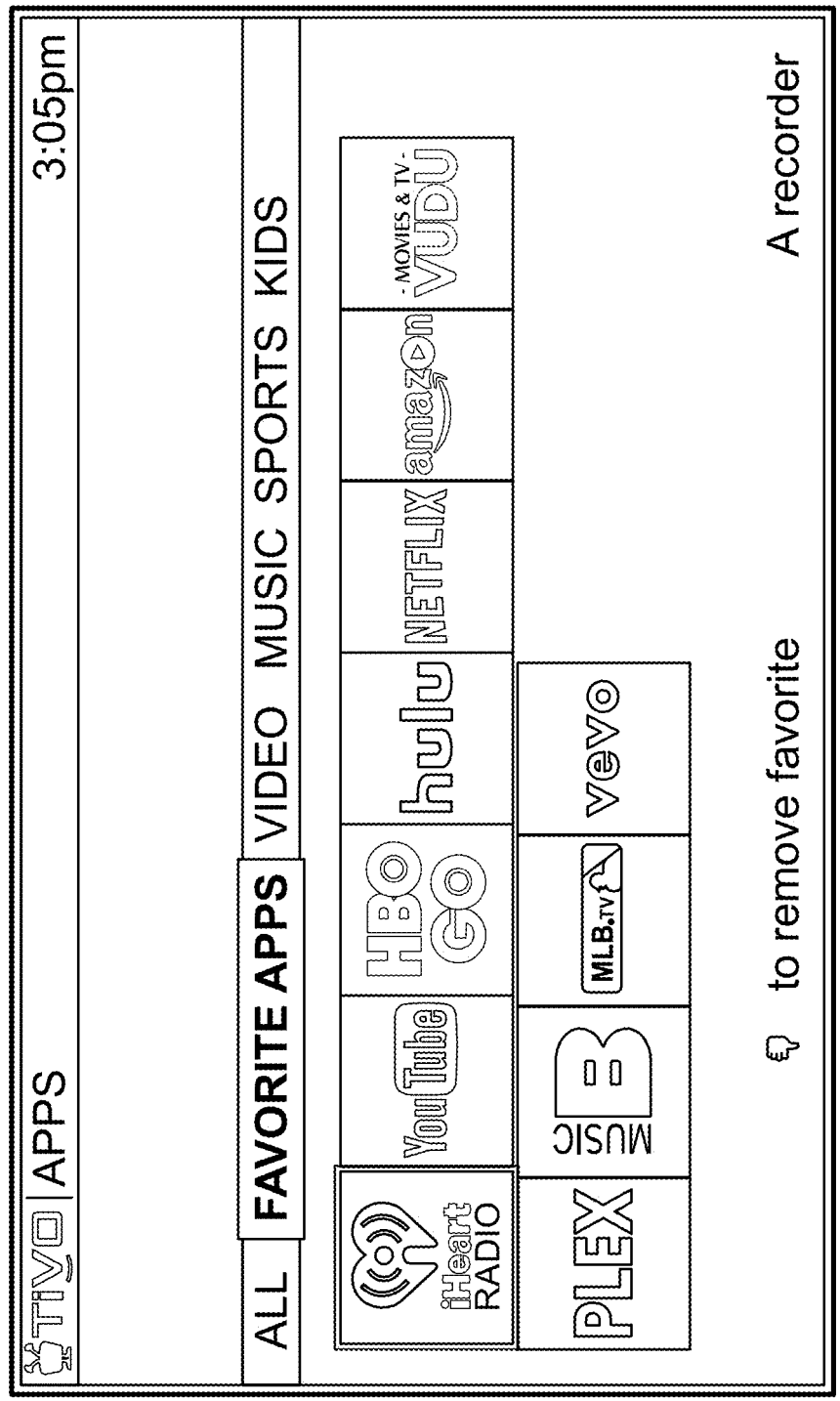
FIG. 27 depicts an illustrative embodiment of an applications menu shown on a display screen, in accordance with some embodiments of the disclosure.

In some embodiments, the user may categorize the applications using a "thumbs up" and "thumbs down" categorization. The media guidance application may generate a menu to be displayed on the user equipment that displays third-party applications. The media guidance application may receive input from the user, via a remote control, containing a user choice as to whether to categorize a selected application as a "favorite" application. For example, the media guidance application may determine that a user has selected an application (e.g., the user navigated to a certain application in the menu) to be one of the user's "favorite" applications by receiving a "thumbs up" input from a remote control via the "thumbs up" remote control button. The media guidance application may also determine that a user no longer wants an application to be a "favorite" by determining that a user has selected a highlighted application and has selected the "thumbs down" button on the remote control. An example implementation of the favorites menu may be seen in FIG. 27.

In some embodiments, the user may rank the applications. The media guidance application may present a set of applications from a plurality of applications to the user. The media guidance application may generate a prompt asking the user to rank the applications within the set of applications. The user may navigate through the set of applications and rank them using commands from a remote control (e.g., using the number keys to assign a number to each application) or may rank the set of applications based on a voice command (e.g., giving a voice command of a numerical value for each application in the set of applications, or assigning each application in the set of applications an arbitrary rank such as "high," "medium," or "low" etc.) The media guidance application may order the applications in the menu based on their rank (e.g., from applications ranked highest to lowest).

In some embodiments, the applications may be ranked according to popularity. The media guidance application may determine, based on a setting in the user preferences from the user profile, that the user prefers for the applications to be ranked and ordered based on popularity. The media guidance application may retrieve data from other users who are associated with the user (e.g., friends of the user) to determine the popularity of the applications. For example, the media guidance application may determine that the application that is used the most (e.g., has the highest amount of total use time out of all the applications) is ranked the highest, and as follows, the subsequent applications are ranked from high to low based on the total time use. As another example, the media guidance application may determine the overall rankings based on the individual user rankings for each application. The media guidance application may determine the ranking based on the individual user rankings for each application (e.g., an application is ranked the highest by the most users, and thus it is ranked the highest for the user).

The media guidance application may create user profiles for users in a plurality of users. The media guidance application may store the user profiles in a database. The media guidance application may determine preferences for each user corresponding to each user profile based on inputs from the user. The media guidance application may determine that each user profile in the plurality of profiles has preset preferences (e.g., determined by an editor) that may be adjustable via user input.

The media guidance application may display profile choices corresponding to the user profiles on the user equipment. The media guidance application may receive an input from the user corresponding to selecting a profile (e.g., a user selecting a profile displayed on the user equipment using a button on a remote controller). Based on the selection of the user, the media guidance application may generate a menu screen based on the preferences of the selected user profile.

In some embodiments, the media guidance application may store, in the preferences for the user, data corresponding to user account information. The data corresponding to user account information may contain account information (e.g., login credentials such as a user name and password) associated with an application. For example, the media guidance application may store, in the preferences for the user, a username and password corresponding to a third-party application.

In some embodiments, when the user requests to access an application (e.g., the user selects, via a remote, the third-party application Netflix), the media guidance application may automatically retrieve the user's login credentials (e.g., username and password) associated with the application from the database in the user profile. The media guidance application may automatically log into the application without generating a prompt for the user requesting the user to input the user's login credentials (e.g., username and password).

In some embodiments, when a user requests to access an application (e.g., the user selects, via a voice command, the third-party application Netflix), the media guidance application may determine the identity of the user based on a voiceprint from the voice command (e.g., a unique voice identifier). The media guidance application may determine the corresponding user profile for the user based on a voiceprint (e.g., matching the voiceprint to a correct voiceprint stored in the user profile). The media guidance application may automatically retrieve the user's login credentials (e.g., username and password) associated with the application from the database in the user profile. The media guidance application may automatically log into the application without generating a prompt for the user requesting the user to input the user's login credentials (e.g., username and password).

In some embodiments, the media guidance application may use data from third-party applications as data inputs into the prediction calculation to influence recommendations in the prediction bar, as seen in FIG. 11 and at 2532. The media guidance application may retrieve viewing history data, favorites data, and any other relevant data to use as inputs into the prediction calculation.

The media guidance application may generate and display a main menu bar. The media guidance application may provide suggestions (e.g., based on machine learning, frequency, user preferences, user input, etc.) of items that should be featured in the main menu bar list. For example, the media guidance application may determine, based on the frequency of the user using a certain application (e.g., the user spends more time on the video streaming application Netflix than any other application), to suggest to the user to add "Netflix" as an item that should be featured in the main menu bar list.

In some embodiments, the media guidance application may determine the functionality of the remote controller based on the remote's ability to detect voice commands. The media guidance application may retrieve menu screen settings corresponding to voice commands. The media guidance application may generate and display a menu screen based on the voice command settings. For example, the media guidance application may generate a menu that consistently displays prompts to the user to be answered via voice commands (e.g., "what movie would you like to watch?"). As another example, the media guidance application may generate a menu that is "keyword friendly." The media guidance application may display a keyword associated with a voice command that corresponds to an action (e.g., the keyword "open Netflix" next to the third-party application, Netflix).

As another example, when the remote controller has the ability to process voice commands, the media guidance application may generate and display a menu screen based on the voice command settings. The media guidance application may generate icons for voice input to be displayed on the menu screen. The icons for voice input may include a microphone icon, pause/play icon, home menu icon, etc. These icons may not be generated when the remote controller does not have the functionality to process voice commands.

The media guidance application may change a menu bar based on user attributes (e.g., tone of voice, facial recognition that the user is happy/sad/etc.). The media guidance application may determine user attributes using a sensor (e.g., a camera, a smartwatch that measures biometrics) or based on user data (e.g., the user is only watching "sad" movies based on metadata from the user's watch history, indicating that the user is sad). The media guidance application may compare the current attribute of the user (e.g., stored in a database in the user profile) to the determined user attributes. The media guidance application may change the appearance and functionality of the menu bar in response to determining that an attribute of the user has changed.

The media guidance application may change the display of a menu bar based on detecting a new user. The media guidance application may display a menu bar based on the profile of a current user accessing the user equipment. The media guidance application may detect a new user, who is not the current user, accessing the user equipment.

In some embodiments, the media guidance application may use a camera to identify a new user. The camera may detect the presence of a new user in a viewing environment of the new user. The camera may identify the new user (e.g., using facial/body recognition) and retrieve a profile associated with the new user. Based on the preferences in the profile associated with the new user, the media guidance application may generate a menu bar to be displayed on the user equipment based on the preferences in the profile associated with the new user.

In some embodiments, the media guidance application may use voice recognition to determine a new user. The voice recognition may detect the presence of a new user in a viewing environment of the new user. The voice recognition may identify the new user (e.g., matching an audio sample of the voice to a corresponding voice audio sample from a user profile) and retrieve a profile associated with the new user. Based on the preferences in the profile associated with the new user, the media guidance application may generate a menu bar to be displayed on the user equipment based on the preferences in the profile associated with the new user.

The media guidance application may detect an audio input from the user. The media guidance application may determine the user corresponding to the audio (e.g., voice) input. The media guidance application may compare the audio input to audio samples in a plurality of audio samples stored in a database, each audio sample corresponding to a known user. The media guidance application may determine, from the comparison, the identity of user from whom the audio input came from (e.g., determine the user from the voice input). The media guidance application may make this determination based on matches in the tone, loudness, and other audio characteristics used to match audio signals.

In some embodiments, the media guidance application may determine, from the comparison, that there is not a match between the audio input and the plurality of audio samples corresponding to known users. The media guidance application may store the audio input in the database as an unknown user, and upon creation of a user profile for said unknown user, the media guidance application may assign the unknown user's audio samples to the newly created user profile.

In some embodiments, the media guidance application may retrieve a profile for the user corresponding to the identified user from the audio input comparison. The media guidance application may then process the audio input from the user. For example, the media guidance application may use natural language processing of the audio input to determine the exact command said by the user. For example, the media guidance application may use natural language processing on the phrase spoken by the user (e.g., "catch me up to where Juliette is on 'Game of Thrones'") to determine that the user wants to watch "Game of Thrones" from the user's current position in "Game of Thrones" to the latest episode that Juliette has viewed. The media guidance application may determine keywords in the command spoken by the user associated with other users. These keywords may include names of users (e.g., Juliette), which are associated with the user profiles, as well as familial relationships (e.g., wife, brother, etc.). The media guidance application may determine familial relationships based on data retrieved from social media, user input, machine learning, etc. The media guidance application may determine, the context of the command using natural language processing (e.g., watching "Game of Thrones" to catch up to another viewer's place).

FIG. 24 corresponds to display 2400, where in response to user command 2404 (e.g., "Catch me up to where Juliette is on 'Game of Thrones'") from user 2402, the media guidance application generates playlist (e.g., episodes of "Game of Thrones") 2406. The media guidance application may generate prompt 2408 that displays queries to the user, such as "Begin playlist to catch up to Juliette?" and other similar queries. Trick play bar 624 displays the user's progress in playlist 2406.

The media guidance application, in response to determining that a keyword of another user exists in the spoken command, as well as in response to determining the context of the command, may access the profile of the second user (e.g., Juliette) to retrieve data from the second user's profile. The media guidance application may retrieve viewing history data, user preferences, and other similar types of data from the second user's profile. The media guidance application may determine, from the second user's data, information related to the context of the command (e.g., what episodes of Game of Thrones the second user watched). The media guidance application may generate, based on the information, a response to the user's command. For example, the media guidance application may generate a response (e.g., a playlist of "Game of Thrones" episodes from the next episode the user needs to watch until the latest episode the second user viewed) by retrieving the first user's viewing history data to determine the next episode the user needs to view and by retrieving the second user's viewing history data to determine the latest episode the second user viewed, and play-back the response after receiving a user command (e.g., the user selecting "play" or "select" on a remote control in response to the generated response). As another example, the media guidance application may determine, based on the viewing history data of the second user, that the latest episode that the second user watched was only partially viewed (e.g., the second user watched only 15 minutes out of the 60-minute episode). The media guidance application may generate the playlist of episodes for the first user to catch the first user up to the play position (e.g., the 15-minute mark) of the latest episode that the second user watched. The media guidance application may pause playback of the playlist of episodes when it reaches the play position and may generate a prompt for the user (e.g., "You've caught up to Juliette! Would you like to keep watching or end your viewing session?") to determine if the user would like to move past the play position of the second user or stop watching the playlist.

Figure 28:
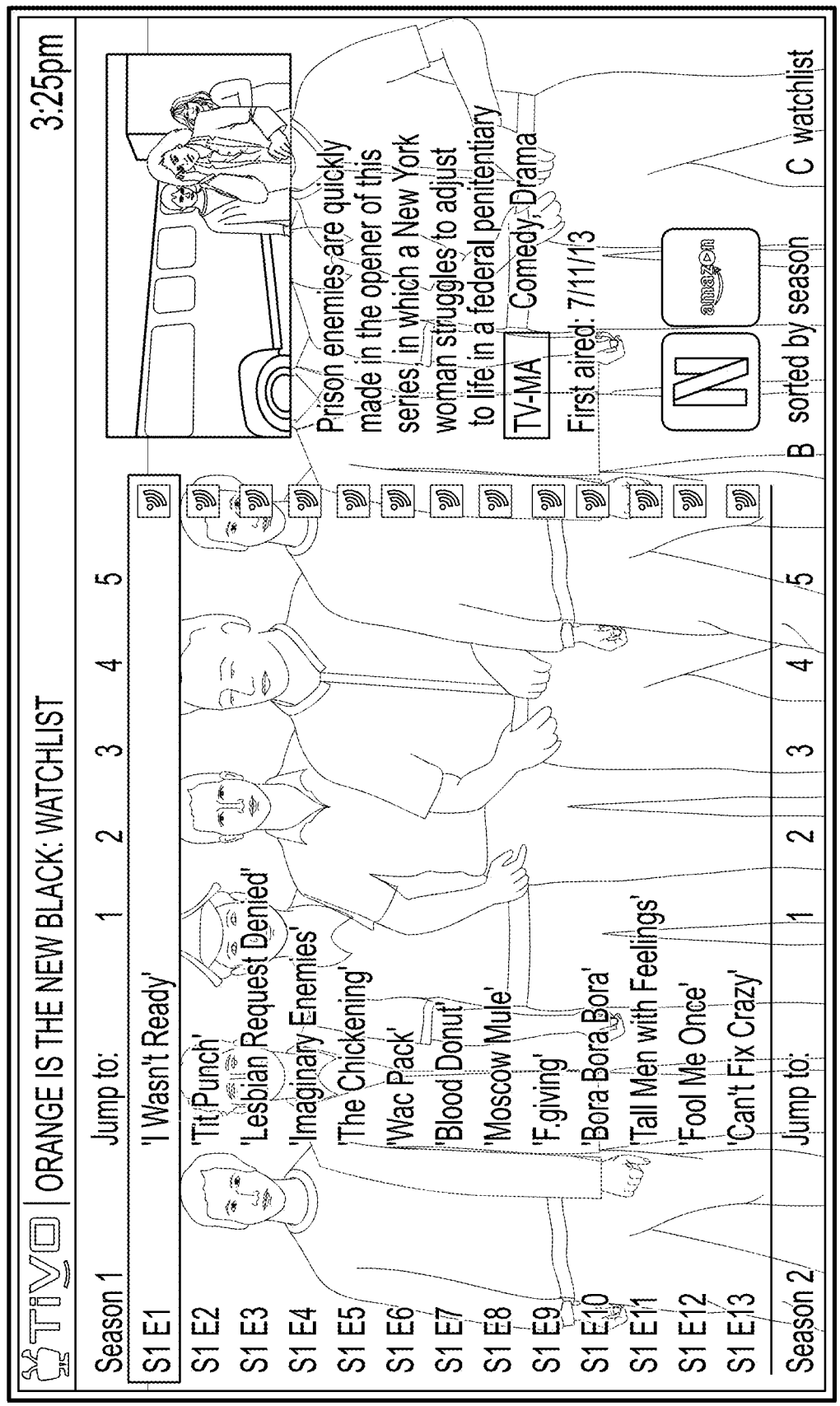
FIG. 28 depicts an illustrative embodiment of a watch list menu shown on a display screen, in accordance with some embodiments of the disclosure.

In some embodiments, when the user navigates to a menu (e.g., the "My Shows" menu), the media guidance application will retrieve artwork from a database to be displayed behind the menu, as seen in FIG. 28. The user may navigate to or select media content using a remote controller or voice command. The media guidance application may retrieve artwork related to the selected media content.

In some embodiments, when the user is selecting a show to view from a menu screen (e.g., the "My Shows" menu) the media guidance application may retrieve the user profile for the user selecting the show. When the user selects to view a specific episode of the show (e.g., an episode of "Orange is the New Black"), the media guidance application may retrieve profile information for the applications where the user can view the episode on (e.g., Netflix, Amazon Video, etc.). The media guidance application may automatically play the episode of the show via one of the applications (e.g., choses the application to play through based on a user-specified preset application order) without going via the normal process of opening the application, choosing a user profile in the application, searching for the episode, and then selecting to play the episode. The media guidance application may automatically choose a profile from the application based on retrieving a profile associated with that application as found in a database in the user profile to play the episode via. This ensures that the user's watch history, recommendations, and other information the application uses viewing history data for is not altered by a foreign user.

The media guidance application may configure the system to utilize a stickiness key. As referred to herein, a "stickiness key" is a setting that, if on, saves the settings and current page of a selected submenu, even when navigating outside of the submenu for a set amount of time (e.g., 30 seconds). The media guidance application may retrieve the setting from the preferences in the user profile. The media guidance application may determine that the setting is preset (e.g., preset to be "on" by an editor) and adjustable by the user. For example, the media guidance application may generate a prompt to the user in the settings menu that asks the user whether to turn the stickiness key on or off (e.g., creating two selectable options on the prompt: "yes"/"no").

In some embodiments, the media guidance application may detect that the user has navigated to a menu screen that is associated to the stickiness key. The media guidance application may store generic menu screens associated with the stickiness key in a database in the user profile. The media guidance application may compare, upon detecting that the user has pressed a button that would navigate outside of said menu screen, said menu screen and the generic menu screens to determine whether there is a match. In response to determining that there is a match, the media guidance application can store, in a temporary cache in memory or in storage, the settings, data, and metadata associated with the current menu screen. The media guidance application may store enough data to be able to recreate the current menu screen from scratch in real time. The media guidance application may then navigate to a screen related to the input pressed by the user. In response to the user navigating back to the screen the user was viewing prior to the input from the user, the media guidance application may determine the amount of time between the user pressing the input button on the remote to navigate away from the current menu screen and the time the user pressed the button on the remote to navigate back to the current menu screen. In response to determining that the period of time is within a threshold period of time (e.g., 30 seconds retrieved from the user profile), the media guidance application may display the current menu screen instead of the stock menu screen. The media guidance application may retrieve the threshold period of time from the preferences in the user profile. The media guidance application may determine that the threshold period of time is preset by an editor that may be adjustable based on user input. The media guidance application may also retrieve the threshold period of time from previously stored settings in the user profile. For example, the media guidance application may retrieve the threshold period of time from the preferences in the user profile (e.g., 30 seconds which was preset by an editor). In response to determining that the period of time is not within the threshold period of time, the media guidance application may reset the menu screen to it's original (stock) settings. The media guidance application may delete the data stored in the temporary cache in the memory or in the storage after the threshold period of time. When the user navigates back to the current menu screen after the threshold period of time, the current menu screen will be reset to its default state.

In some embodiments, when the user navigates back to the current menu screen after the threshold period of time, and the media guidance application has reset the current menu screen to its default state, the media guidance application may generate a prompt to ask the user if the user wishes to extend the threshold period of time (e.g., "Do you want to extend the stickiness time from 30 seconds to 45 seconds?) with inputs to record the user's response (e.g., "yes" and "no" input buttons).

Figure 25:
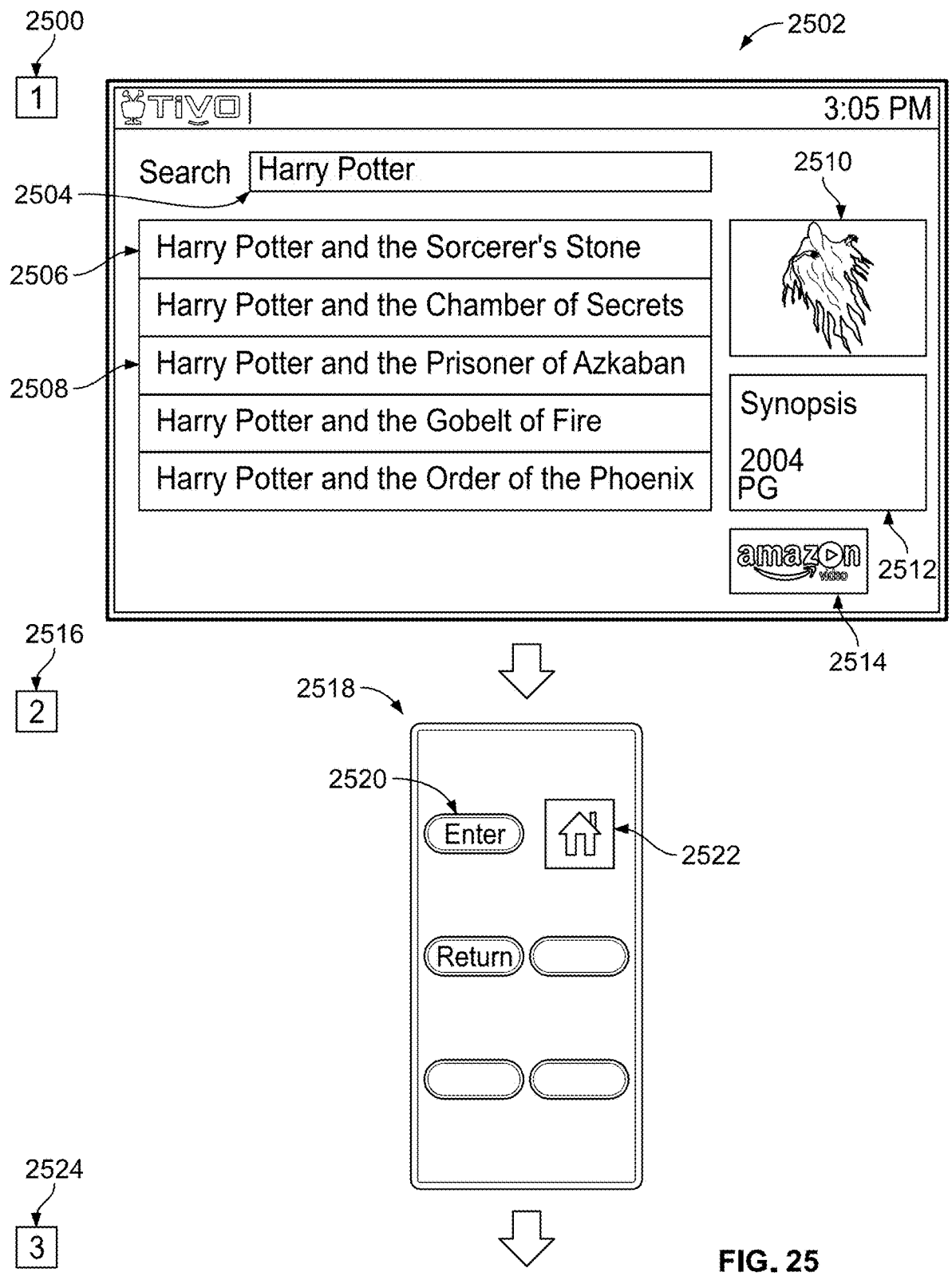
FIG. 25 depicts an illustrative embodiment for retrieving past viewed content based on a stickiness key, in accordance with some embodiments of the disclosure.
Figure 25:
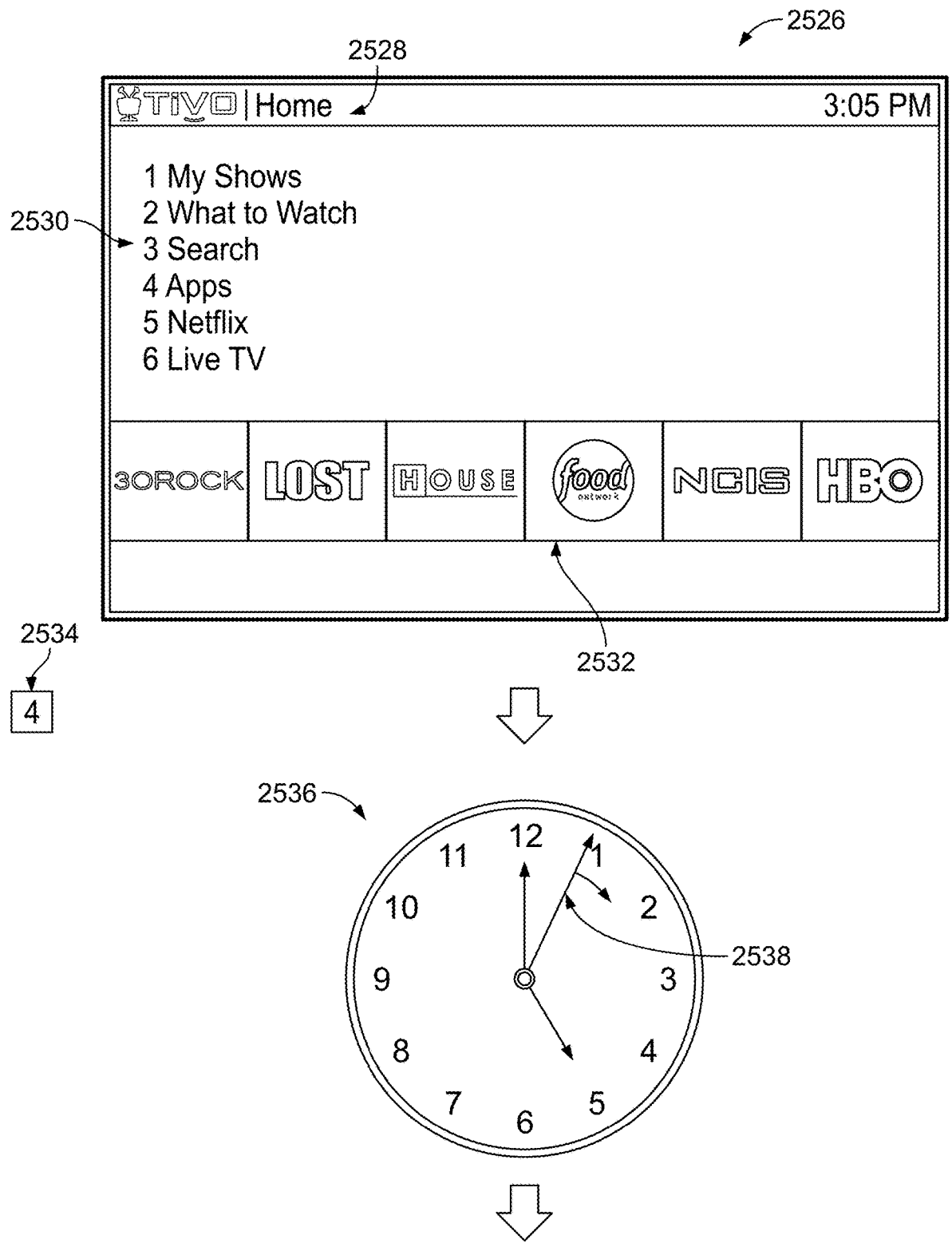
Figure 25:
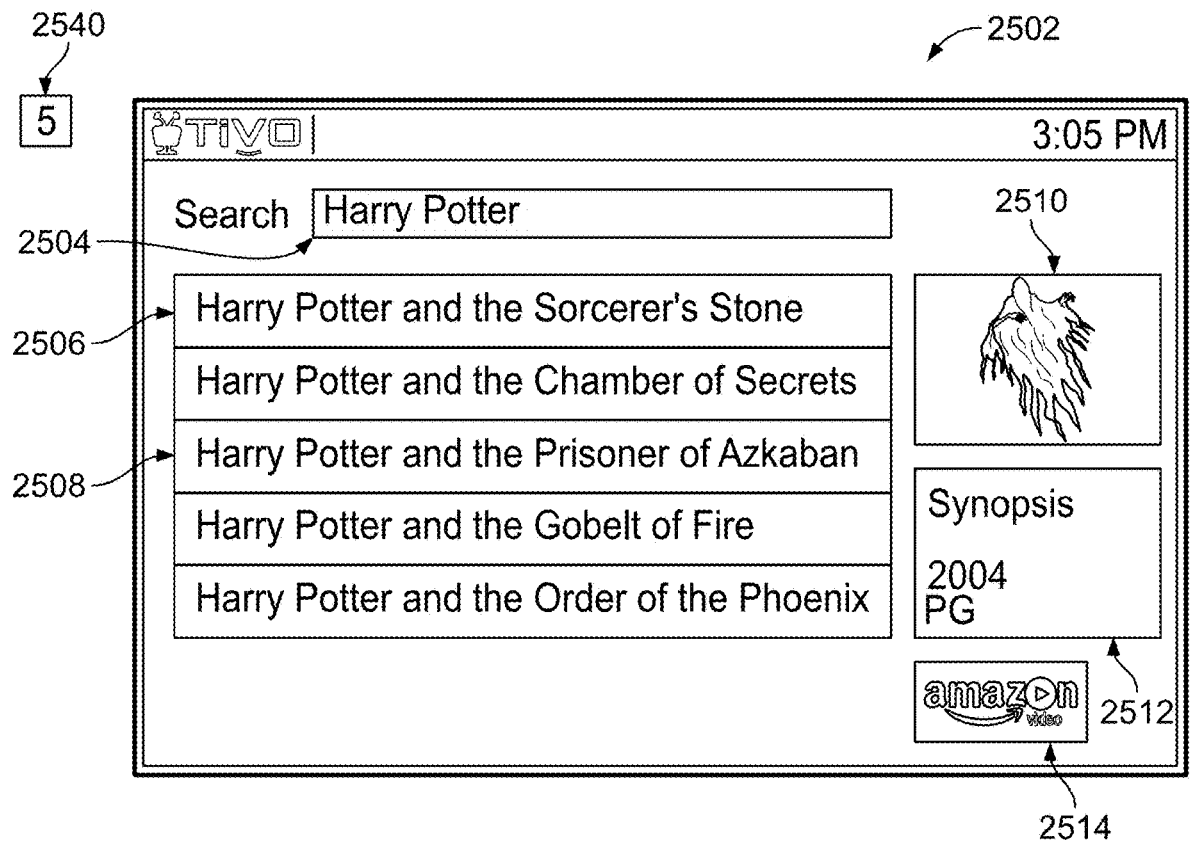
Figure 26:
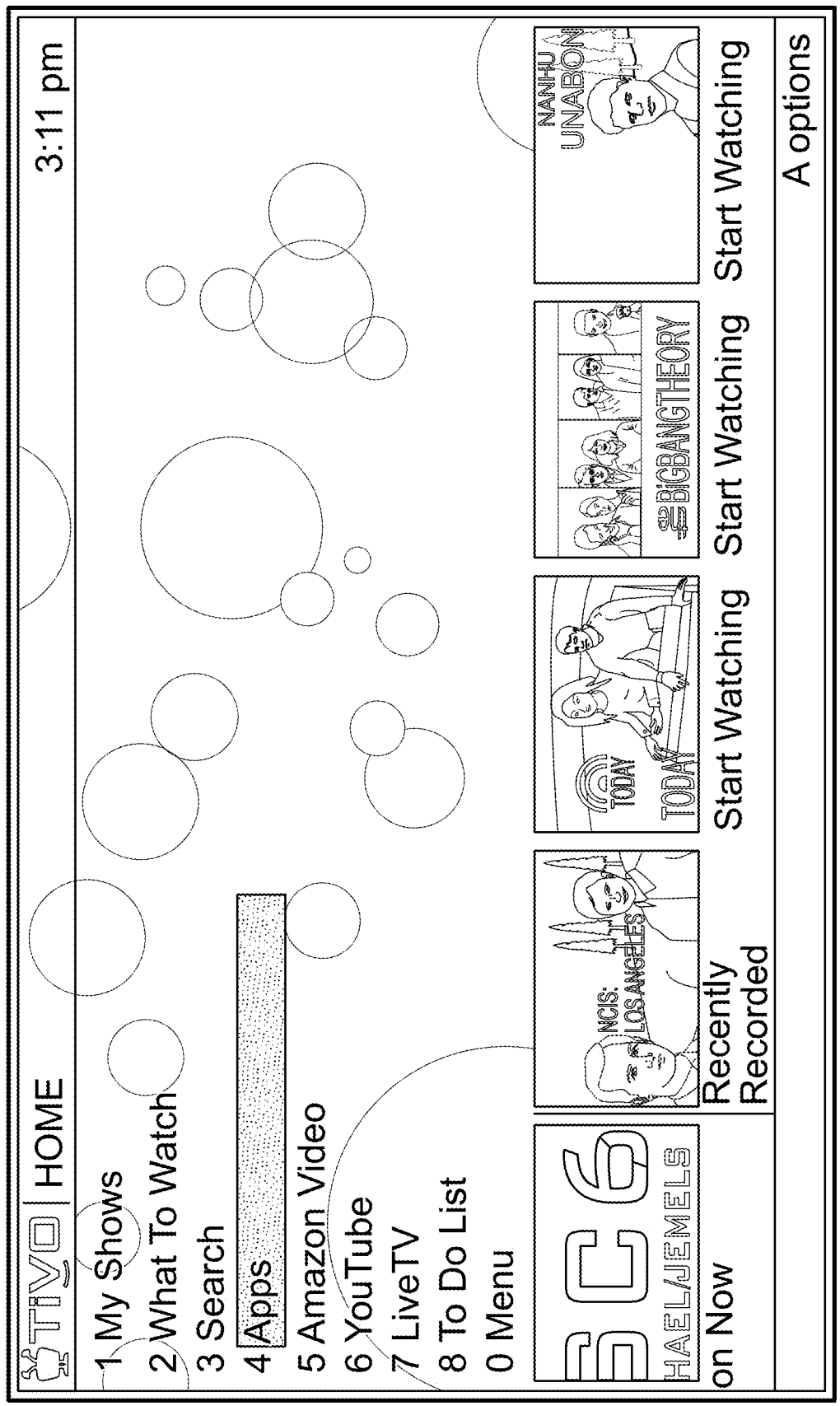
FIG. 26 depicts an illustrative embodiment of a home menu shown on a display screen, in accordance with some embodiments of the disclosure.

FIG. 25 represents one embodiment of the stickiness key. At 2500, step one occurs, where the user has navigated to search menu 2502. Search menu 2502 contains search bar 2504, which may contain user input that the user wants to search (e.g., "Harry Potter"). Search result grid 2506 represents the results generated from the user search. Search result 2506 represents one of the plurality of search results (e.g., "Harry Potter and the Sorcerer's Stone"). Highlighted search result 2508 represents a search result (e.g., "Harry Potter and the Chamber of Secrets") that the user has navigated over, which may be represented by a visual cue (e.g., highlighting the search result box). Results window 2510 represents an image associated with the content from search result 2508. Text box 2512 represents a text box that contains a textual description of the content from search result 2508. Application box 2514 represents an application where the user can view the content from search result 2508.

At 2516, step two occurs, where the user selects an input button from remote controller 2518. Remote controller 2518 may contain enter input 2520, home input 2522, along with numerous other input buttons. At 2524, step three occurs, where the user may accidentally select home input 2522 instead of enter input 2520, which reverts the user back to home menu 2526. Home menu 2526 may contain overlay bar 2528, favorites list 2530, and prediction bar 2532. At 2534, step four occurs, where the media guidance application determines, upon the user navigating back to search menu 2502, whether the period of time 2538 that it took for the user to navigate back to the search menu is within threshold period of time 2536 associated with the stickiness key. At 2540, step four occurs, where the media guidance application determines that period of time 2538 is within threshold period of time 2536, and search menu 2502 is retrieved and displayed for the user, where search menu 2502 displays search result grid 2504 and contains the same results as the previous search. When the media guidance application determines that period of time 2538 is not within threshold period of time 2536, search menu 2502 is displayed without any saved data (e.g., does not contain "Harry Potter" in search bar 2504 and would not display search result grid 2504).

In some embodiments, the media guidance application may adjust the threshold period of time based on the speed of user's clicks on the remote. For example, the media guidance application may determine that the user navigates away from a menu screen (e.g., makes an incorrect selection on the remote) and always navigates back to the menu screen, but at a slower pace than normal (e.g., it takes the user 45 seconds vs. the threshold amount of 30 seconds). The media guidance application may learn from this behavior that the threshold for the user should be adjusted to make it longer (e.g., at least 45 seconds).

In some embodiments, the media guidance application may adjust the threshold period of time based on the age of the user. The media guidance application may retrieve the age of the user from the user profile. The user guidance application may determine, based on the age of the user (e.g., adjust the threshold to be longer for older users and shorter for younger users), an adjustment to the threshold period of time.

In some embodiments, the media guidance application may also make determinations about the user based on the accuracy and slowness of their clicks on the remote controller. For example, the media guidance application may measure the period of time between a user selecting two buttons on the remote controller (e.g., the user takes 45 seconds between selecting two buttons when the normal average is 5 seconds). The media guidance application may compare the period of time to a normal average time between selecting two buttons on a remote (e.g., this data may be stored in a database in the user profile or may be calculated based on input selection history from other user accounts). The media guidance application may determine if the period of time is out of range of the normal average time (e.g., not within a threshold percentage of the normal average time) that the user takes longer to select remote control buttons. After determining this, the media guidance application may simplify the menu and user interface to help the user navigate through the menu more easily and while spending less time on the menu. The media guidance application may simplify the user interface in similar manners as described above with regards to remote controller functionality.

The media guidance application may generate a list of keywords, based on inputs from a user. The media guidance application may search metadata from the program guide corresponding to future programs to be broadcast. The media guidance application may compare the metadata with the list of keywords, and may determine a match between the metadata and the list of keywords. In response to determining a match, the media guidance application may record the program corresponding to the metadata that matched.

In some embodiments, the media guidance application may determine, from the metadata, that the matched program is part of a plurality of matched programs (e.g., a single episode in a television series). The media guidance application may record the corresponding episodes in the plurality of related episodes, regardless of whether the corresponding episodes are a match. The media guidance application may determine whether to record the corresponding episodes based on a preference in the user profile (e.g., the user selects "record corresponding episodes").

In some embodiments, the media guidance application may receive user input that adds or deletes words on the list of keywords. The media guidance application may automatically delete any previously recorded programs in a plurality of programs that contains the deleted keyword. The media guidance application may determine whether to automatically delete the previously recorded programs that contain the deleted keywords based on settings (e.g., may be in the user preferences) in the user profile.

In some embodiments, the media guidance application may generate a prompt to be displayed on the user equipment. The prompt may contain selectable options including allowing the user to delete a list of keywords, delete a list of keywords and all corresponding programs recorded via those keywords, add to or delete from a list of keywords, and/or create a new list of keywords. The media guidance application may generate this prompt in response to the user navigating to the list of keywords section on a menu screen (e.g., may be the wishlist section that the user navigates to via a remote controller).

In some systems, when recording a series of a television show, the system records all episodes of all seasons of the series, which may not be an accurate representation of what episodes the user has already seen and needs to see. For example, the user may, when watching a rerun of the first episode of season three of "Game of Thrones," press the record series button. The system may then record any episode, whether it be a rerun or new episode, from any season of the series. However, due to the fact that the user decided to record the series when watching the first episode of the third season of "Game of Thrones," this may be indicative that the user has already viewed the first and second series of "Game of Thrones." Depending on settings in the user preferences, the media guidance application may determine to only record episodes from the third season and later of "Game of Thrones" to ensure that only episodes that the user has not previously viewed are recorded.

The media guidance application may receive a user input to record a program in a plurality of programs (e.g., recording a series of a television show). The media guidance application may determine, from a setting stored in the profile, the user's preferences for recording. The media guidance application may retrieve the user's "record series" setting in the user profile. The media guidance application may determine, based on the retrieved setting (e.g., the setting is set to "current season" instead of "all"), to record programs that meet a criterion (e.g., only record episodes from the current playing season and later). The media guidance application may retrieve the criterion from the preferences in the user profile. The criterion may be predefined (e.g., by an editor), and may specify that only episodes in the current season and later seasons are recorded, where the current season is the season of the selected program to be recorded (e.g., the user selected Season 5 Episode 6 of Game of Thrones to record, only seasons 5 and later would be recorded in the future).

The media guidance application may generate and display a program guide displaying a list of currently airing programs. The media guidance application may display the programs in a grid format, where there are a set amount of rows. The media guidance application may display a channel and the program currently airing and the programs airing in the future in each row. The media guidance application may generate a row in the grid that gives the channel and times for each program.

In some embodiments, the media guidance application may display eight rows in the grid, each dedicated to a specific channel.

In some embodiments, the media guidance application may generate an image to be displayed behind the programs displayed in the grid. The media guidance application may retrieve an image from a database of images (e.g., from a database frequently updated on an online server) to be displayed behind the programs displayed in the grid. The media guidance application may retrieve an image corresponding to the currently highlighted program that the user has navigated to. For example, the media guidance application may determine that the user has navigated (e.g., via buttons on a remote controller) to a program on a television channel (e.g., an episode of "Wynonna Earp" currently airing on the SYFY channel). The media guidance application may retrieve an image related to the program (e.g., a promotional photo for "Wynonna Earp," a released picture from the currently highlighted episode of "Wynonna Earp," etc.) to be displayed behind the grid.

The media guidance application may receive input from a controller (e.g., a remote controller). The media guidance application may display on the user equipment, in response to receiving a user input of a "right key" on a controller, tuners in a plurality of tuners. The user equipment may contain multiple tuners. The media guidance application may generate an overlay on the screen to display images associated with each individual tuner (e.g., the current television show/movie being currently shown on the channel tuned to by the tuner).

The media guidance application may generate and display on the user equipment, in response to receiving a user input of a "left key" on a controller, an overlay displaying the user's favorite channels. The user's favorite channels may be selectable, and the media guidance application may receive an input from the user (e.g., via a remote control) selecting a channel from the favorites list. The media guidance application may tune to the selected channel after receiving the user's selection. In some embodiments, the media guidance application may determine that the favorite channels listed in the overlay are determined based on user selection. The user may select his/her favorite channels, and this selection may be saved by the media guidance application in the user profile. In some embodiments, the media guidance application may determine the user's favorite channels based on the user's viewing history, user preferences, favorite applications, and other factors. For example, the media guidance application may determine, from the user's viewing history, that the user's favorite channels are the channels that the user spent the most time viewing. In some embodiments, the favorite channel overlay may be displayed on the left side of the screen of the user equipment.

The media guidance application may generate and display on the user equipment, in response to receiving a user input of an "up key" on a controller, an overlay displaying a one-line guide (e.g., a browse bar). The media guidance application may retrieve information (e.g., from metadata for the currently viewed program/media asset) related to program guide information about the currently tuned to channel and media content. The media guidance application may display the program guide information in the one-line guide, and may continuously update the information in realtime as the program guide information changes (e.g., when one program ends and a different program begins directly after).

The media guidance application may generate and display on the user equipment, in response to receiving a user input of a "down key" on a controller, an overlay displaying a quick view. The media guidance application may display in the quick view recommended content for the viewer. The user may navigate to and select a piece of content in the quick view overlay, and the media guidance application may tune to the selected piece of content (e.g., tune to it on a tuner, play-back the selected content from a recording/storage copy, etc.).

It is contemplated that the steps or descriptions of each of FIGS. 8-12, 16-20, 22, and 23 may be used with any other embodiment of this disclosure. It is contemplated that some steps or descriptions of each of FIGS. 8-12, 16-20, 22, and 23 may be optional and may be omitted in some embodiments. In addition, the steps and descriptions described in relation to FIGS. 8-12, 16-20, 22, and 23 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIGS. 8-12, 16-20, 22, and 23.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 300, media content source 416, or media guidance data source 418.

The processes discussed above in FIGS. 8-12, 16-20, 22, and 23 are intended to be illustrative and not limiting. One skilled in the art would appreciate that the steps of the processes in FIGS. 8-12, 16-20, 22, and 23 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
receiving a request to store a season of a series, wherein the series comprises a plurality of seasons;
detecting an indication that a last consumed episode of the series belongs to a relevant season of the plurality of seasons that precedes another season of the plurality of seasons;
identifying a plurality of available episodes of the series that are available for storage;
automatically scheduling storage of episodes of the plurality of available episodes of the series that belong to the relevant season and follow the episode identified by the indication, wherein the automatic scheduling excludes scheduling for storage episodes of a season that precedes the relevant season and excludes scheduling for storage episodes of the relevant season that precede the episode identified by the indication; and
storing all episodes scheduled for storage.

2. The method of claim 1, wherein the storing comprises storing at least a portion of an episode of the series using a local storage device.

3. The method of claim 1, wherein the storing comprises storing at least a portion of an episode of the series using a network storage device.

4. The method of claim 1, wherein the storing comprises storing at least a portion of an episode of the series using a cloud storage device.

5. The method of claim 1, wherein:
the automatic scheduling excludes scheduling for storage episodes of a season that follows the given relevant season.

6. The method of claim 1, further comprising:
maintaining a list of episodes of the series that have been consumed; and
determining which episodes of the episodes of the series that were consumed is the latest in the series;
wherein the indication indicates the determined episode.

7. The method of claim 1, further comprising:
determining whether all episodes of the relevant season that follow the episode identified by the indication are stored; and
in response to determining that all episodes of the relevant season that follow the episode identified by the indication are stored, providing a completion notification to the user.

8. The method of claim 1, further comprising:
determining whether any episode of the relevant season that follows the episode identified by the indication is not available for storage; and
in response to determining that at least one episode of the relevant series that follows the episode identified by the indication is not available for storage:
determining that the at least one episode of the relevant series is available for over-the-top (OTT) streaming; and
providing a notification to the user, the notification comprising a hyperlink for streaming the at least one episode of the relevant series via at least one over the top (OTT) streaming service.

9. The method of claim 8 wherein determining that the at least one episode of the relevant series is available for OTT streaming comprises:

accessing a profile of a user to determine when the user has a subscription to the at least one OTT streaming service.

10. The method of claim 1, further comprising monitoring a content availability schedule.

11. The method of claim 10, wherein monitoring the content availability schedule comprises:
accessing a profile of a user to determine when the user has a subscription that allows for storage of a plurality of available episodes of the series.

12. A system comprising:
memory; and
control circuitry configured to:
receive a request to store a season of a series, wherein the series comprises a plurality of seasons;
detect an indication that a last consumed episode of the series belongs to a relevant season of the plurality of seasons that precedes another season of the plurality of seasons;
identify a plurality of available episodes of the series that are available for storage;
automatically schedule storage of episodes of the plurality of available episodes of the series that belong to the relevant season and follow the episode identified by the indication, wherein the automatic scheduling excludes scheduling for storage episodes of a season that precedes the relevant season and excludes scheduling for storage episodes of the relevant season that precede the episode identified by the indication; and
store all episodes scheduled for storage.

13. The system of claim 12, wherein the control circuitry configured to store is further configured to store at least a portion of an episode of the series using a local storage device.

14. The system of claim 12, wherein the control circuitry configured to store is further configured to store at least a portion of an episode of the series using a network storage device.

15. The system of claim 12, wherein the control circuitry configured to store is further configured to store at least a portion of an episode of the series using a cloud storage device.

16. The system of claim 12, wherein:
the automatic scheduling excludes scheduling for storage episodes of a season that follows the given relevant season.

17. The system of claim 12, wherein the control circuitry is further configured to:
maintain a list of episodes of the series that have been consumed; and
determine which episodes of the episodes of the series that were consumed is the latest in the series;
wherein the indication indicates the determined episode.

18. The system of claim 12, wherein the control circuitry is further configured to:
determine whether all episodes of the relevant season that follow the episode identified by the indication are stored; and
in response to determining that all episodes of the relevant season that follow the episode identified by the indication are stored, provide a completion notification to the user.

19. The system of claim 12, wherein the control circuitry is further configured to:
determine whether any episode of the relevant season that follows the episode identified by the indication is not available for storage; and
in response to determining that at least one episode of the relevant series that follows the episode identified by the indication is not available for storage:
determine that the at least one episode of the relevant series is available for over-the-top (OTT) streaming; and
provide a notification to the user, the notification comprising a hyperlink for streaming the at least one episode of the relevant series via at least one over the top (OTT) streaming service.

20. The system of claim 19 wherein the control circuitry configured to determine that the at least one episode of the relevant series is available for OTT streaming is further configured to:
access a profile of a user to determine when the user has a subscription to the at least one OTT streaming service.

21. The system of claim 12, wherein the control circuitry is further configured to monitor a content availability schedule.

22. The system of claim 21, wherein the control circuitry configured to monitor the content availability schedule is further configured to:
access a profile of a user to determine when the user has a subscription that allows for storage of a plurality of available episodes of the series.

* * * * *